US007650646B2

(12) United States Patent
Asano et al.

(10) Patent No.: US 7,650,646 B2
(45) Date of Patent: Jan. 19, 2010

(54) INFORMATION-RECORDING APPARATUS, INFORMATION REPRODUCTION APPARATUS, INFORMATION-RECORDING METHOD, INFORMATION REPRODUCTION METHOD AND COMPUTER PROGRAM

(75) Inventors: Tomoyuki Asano, Kanagawa (JP); Masanobu Nakamura, Tokyo (JP)

(73) Assignee: Sony Corporation (JP)

( * ) Notice: Subject to any disclaimer, the term of this patent is extended or adjusted under 35 U.S.C. 154(b) by 715 days.

(21) Appl. No.: 10/398,517

(22) PCT Filed: Jul. 24, 2002

(86) PCT No.: PCT/JP02/07477

§ 371 (c)(1),
(2), (4) Date: Apr. 4, 2003

(87) PCT Pub. No.: WO03/017273

PCT Pub. Date: Feb. 27, 2003

(65) Prior Publication Data

US 2004/0030902 A1 Feb. 12, 2004

(30) Foreign Application Priority Data

Aug. 9, 2001 (JP) ............................. 2001-242041

(51) Int. Cl.
*H04L 9/00* (2006.01)
(52) U.S. Cl. ........................... 726/32; 726/26; 713/176; 713/193; 380/201; 380/277; 705/51; 705/57; 386/94; 348/554
(58) Field of Classification Search ................. 713/176, 713/193, 168; 380/30, 201; 705/51, 50, 705/57; 386/37, 94; 726/26, 27
See application file for complete search history.

(56) References Cited

U.S. PATENT DOCUMENTS

| 5,664,018 | A | | 9/1997 | Leighton |
| 5,960,081 | A | | 9/1999 | Vynne et al. |
| 6,047,103 | A | * | 4/2000 | Yamauchi et al. ............. 386/94 |
| 6,108,423 | A | | 8/2000 | Sako et al. |
| 6,118,871 | A | * | 9/2000 | Okuyama et al. ........... 380/201 |

(Continued)

FOREIGN PATENT DOCUMENTS

EP 0924930 * 6/1999

(Continued)

OTHER PUBLICATIONS

PCT Publication No. WO00/63905, Asano et al, pp. 1-39.*

*Primary Examiner*—Nasser G Moazzami
*Assistant Examiner*—Shanto M Abedin
(74) *Attorney, Agent, or Firm*—Lerner, David, Littenberg, Krumholz & Mentlik, LLP

(57) ABSTRACT

A recording or reproduction apparatus is provided which utilizes copyright information in operations to record content data onto a recording medium or reproduce content data from the recording medium. Copyright information for the contents includes information identifying an input source of the content data. The information identifying an input source is stored in the recording medium along with the content data. When the contents are reproduced from the recording medium, the input source information is acquired and used as a basis for determining whether the contents can be reproduced and output. Thus, it is possible to impose an output restriction on an operation to reproduce the contents in accordance with the input source.

26 Claims, 49 Drawing Sheets

U.S. PATENT DOCUMENTS

| | | | |
|---|---|---|---|
| 6,145,081 A | 11/2000 | Winograd et al. | |
| 6,223,285 B1 * | 4/2001 | Komuro et al. | 713/160 |
| 6,298,196 B1 * | 10/2001 | Shima et al. | 386/94 |
| 6,330,672 B1 | 12/2001 | Shur | |
| 6,370,319 B1 * | 4/2002 | Matsumoto et al. | 386/94 |
| 6,453,420 B1 | 9/2002 | Collart | |
| 6,470,135 B1 * | 10/2002 | Kim et al. | 386/68 |
| 6,480,607 B1 * | 11/2002 | Kori et al. | 380/201 |
| 6,490,355 B1 | 12/2002 | Epstein | |
| 6,523,113 B1 | 2/2003 | Wehrenberg | |
| 6,529,969 B1 * | 3/2003 | Inoue | 710/33 |
| 6,553,127 B1 | 4/2003 | Kurowski | |
| 6,584,552 B1 * | 6/2003 | Kuno et al. | 711/163 |
| 6,611,599 B2 | 8/2003 | Natarajan | |
| 6,658,527 B1 * | 12/2003 | Hiroyasu | 711/112 |
| 6,708,157 B2 * | 3/2004 | Stefik et al. | 705/59 |
| 6,731,347 B1 * | 5/2004 | Takano et al. | 348/558 |
| 6,741,795 B1 * | 5/2004 | Takehiko et al. | 386/95 |
| 6,757,025 B1 * | 6/2004 | Takano et al. | 348/554 |
| 6,834,346 B1 * | 12/2004 | Ishibashi et al. | 713/179 |
| 6,978,377 B1 * | 12/2005 | Asano et al. | 713/193 |
| 6,981,272 B1 * | 12/2005 | Morinaga et al. | 725/25 |
| 6,983,281 B1 * | 1/2006 | Utsumi | 707/101 |
| 7,000,113 B1 | 2/2006 | Linnartz et al. | |
| 7,093,128 B2 * | 8/2006 | Asano et al. | 713/171 |
| 7,178,157 B1 * | 2/2007 | Kimura et al. | 725/38 |
| 7,181,624 B2 * | 2/2007 | Asano et al. | 713/178 |
| 7,433,488 B2 * | 10/2008 | Kitani et al. | 382/100 |
| 2002/0114466 A1 * | 8/2002 | Tanaka et al. | 380/232 |
| 2003/0016826 A1 * | 1/2003 | Asano et al. | 380/277 |
| 2003/0016827 A1 * | 1/2003 | Asano et al. | 380/277 |
| 2003/0095664 A1 * | 5/2003 | Asano et al. | 380/277 |
| 2003/0159033 A1 * | 8/2003 | Ishiguro | 713/156 |
| 2004/0010468 A1 * | 1/2004 | Abe et al. | 705/50 |

FOREIGN PATENT DOCUMENTS

| | | | |
|---|---|---|---|
| EP | 1073273 | * | 1/2001 |
| JP | 5-327748 A1 | | 12/1993 |
| JP | 9-98381 A1 | | 4/1997 |
| JP | 11-308564 A1 | | 11/1999 |
| JP | 2001-36517 A1 | | 2/2001 |
| JP | 2001-94552 A1 | | 4/2001 |
| JP | 2001-125833 A1 | | 5/2001 |
| JP | 2001-229614 A1 | | 8/2001 |
| WO | WO-00/62476 A1 | | 10/2000 |

* cited by examiner

F I G. 3
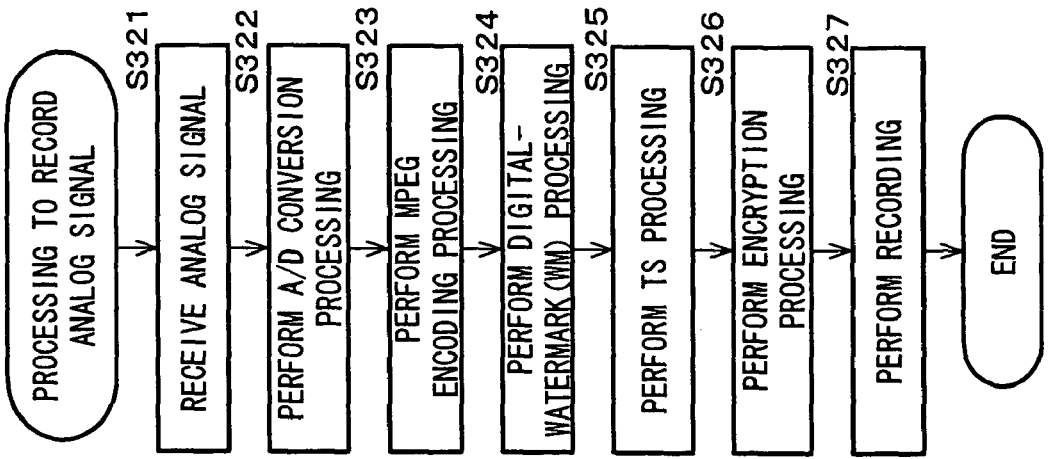
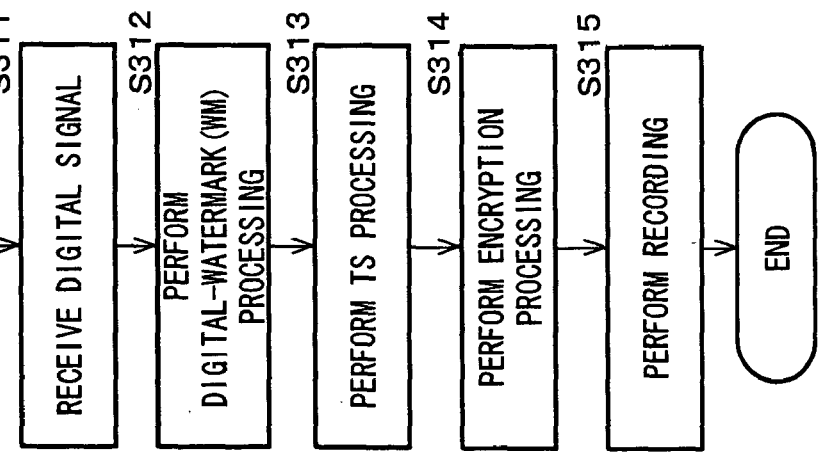
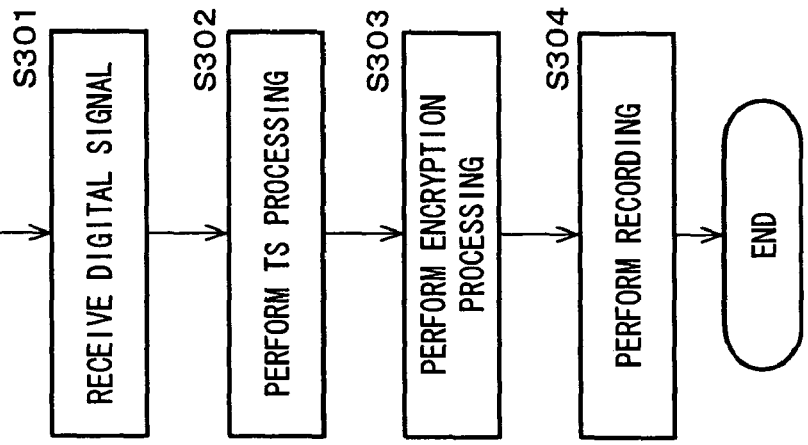

FIG. 10
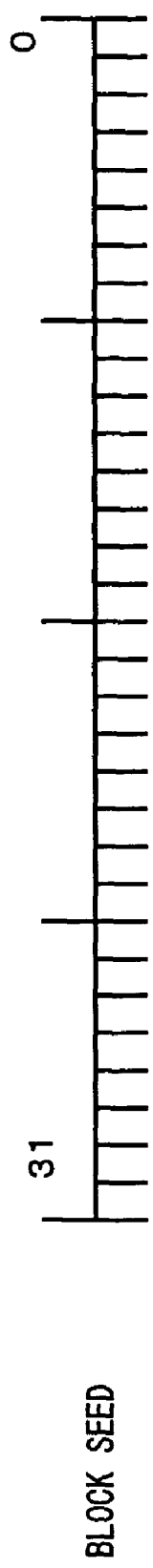
BLOCK SEED
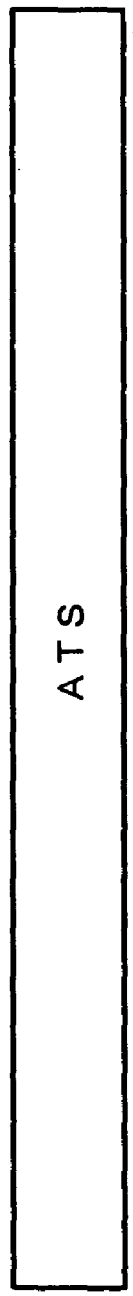
Ex.1:
ATS OF 32 BITS
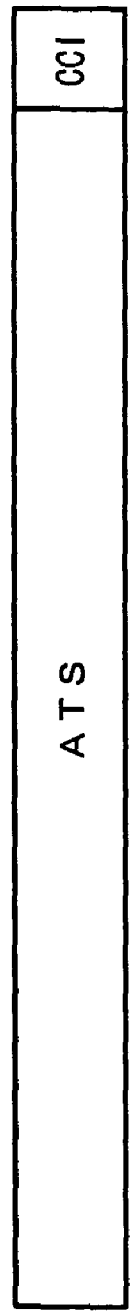
Ex.2:
ATS OF 30 BITS
AND CCI OF 2 BITS
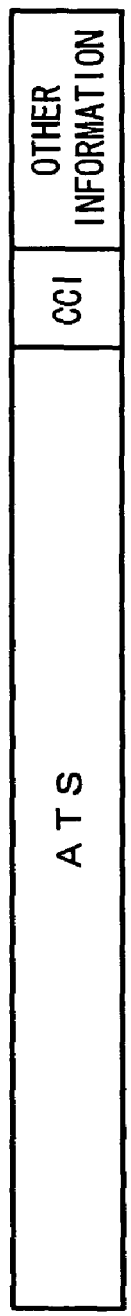
Ex.3:
ATS OF 24 BITS,
CCI OF 2 BITS AND
OTHER INFO OF 6 BITS

FIG. 11

| INPUT SOURCE | ANALOG OUTPUT | | DIGITAL OUTPUT | REMARKS |
|---|---|---|---|---|
| | HORIZONTAL RESOLUTION | COPY PROTECTION (MICROVISION ETC) | | |
| 5C | 600 OR SMALLER | REQUIRED | 5C EQUIVALENT OR BETTER | |
| BS AND CS | 800 OR SMALLER | NOT REQUIRED | PROHIBITED | |
| GROUND-WAVE DIGITAL | NO RESTRICTION | REQUIRED | 5C EQUIVALENT OR BETTER | |
| GROUND-WAVE ANALOG | NO RESTRICTION | NOT REQUIRED | PROHIBITED | |
| OTHERS | NO RESTRICTION | NOT REQUIRED | NO RESTRICTION | NO RESTRICTION FOR ALL COPY-FREE CONTENTS |

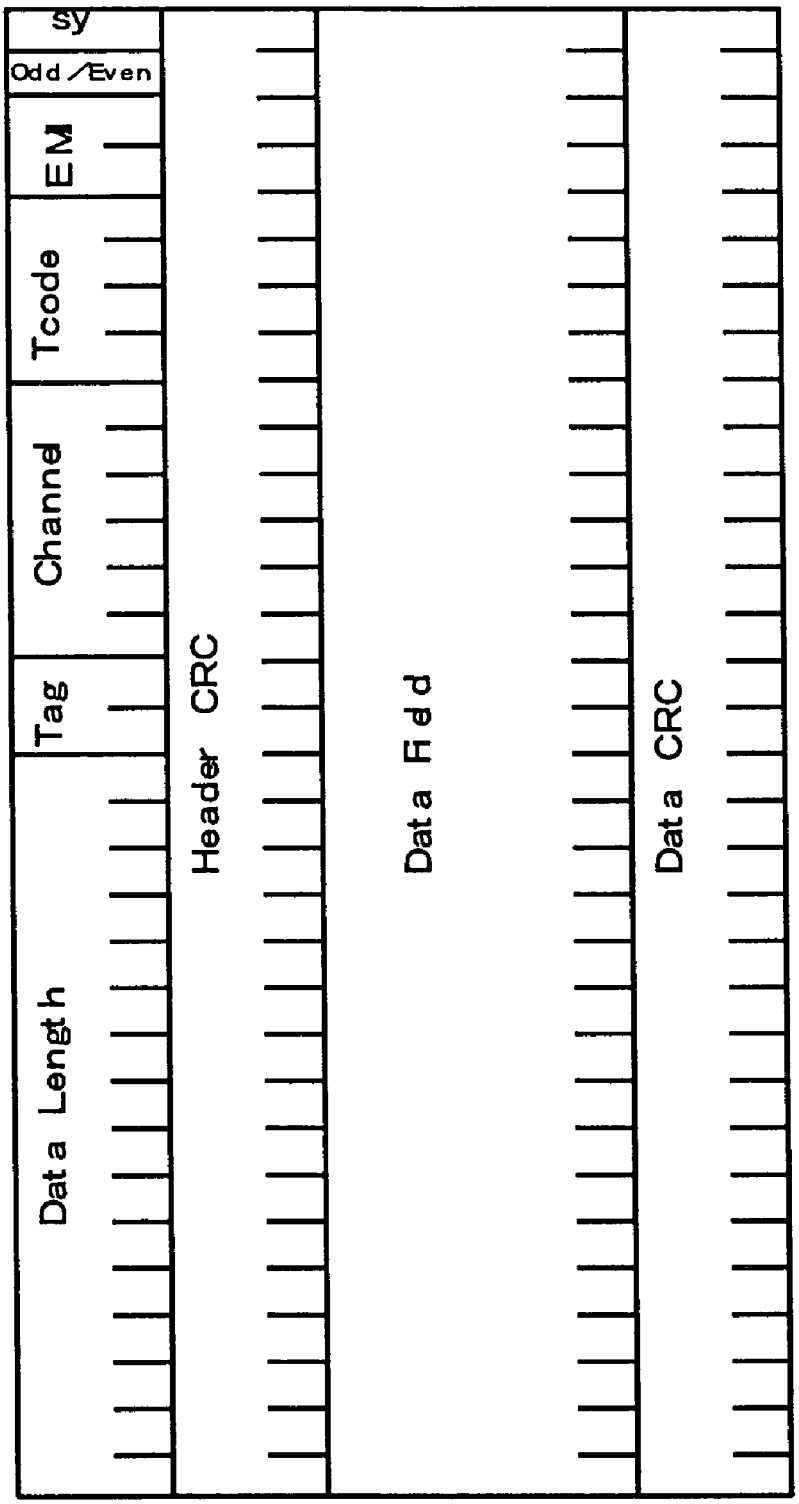

FIG. 13

| COPY CONTROL INFORMATION (2 BITS) | VARIATION POINT (TS PACKET NO.) (30 BITS) |
|---|---|
| 00(Copy Free) | 0 |
| 10(No More Copy) | 300000(0x00007530) |
| 00(Copy Free) | 100000(0x000186A0) |
| 10(No More Copy) | 1234567(0x0012D687) |

KRB (KEY RENEWAL BLOCK) EXAMPLE 1
TRANSMISSION OF ROOT KEY K(t)R OF GENERATION t TO DEVICES 0, 1, AND 2

| GENERATION: t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

(B)

KRB (KEY RENEWAL BLOCK) EXAMPLE 2
TRANSMISSION OF ROOT KEY K(t)R OF GENERATION t TO DEVICES 0, 1, AND 2

| GENERATION: t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG. 24

EXAMPLE 1:

BLOCK SEED ‖ CONSTANT (32 bits) → [64-bit BLOCK ENCRYPTION FUNCTION (KEY LENGTH OF 64 bits)] → BLOCK KEY

TITLE UNIQUE KEY ↑

EXAMPLE 2:

TITLE UNIQUE KEY ‖ BLOCK SEED → SHA-1 → [FUNCTION TO SHRINK 160-bit INPUT INTO 64-bit OUTPUT (EXAMPLE: OUTPUTTING 64 LOW-ORDER bits OF INPUT)] → BLOCK KEY

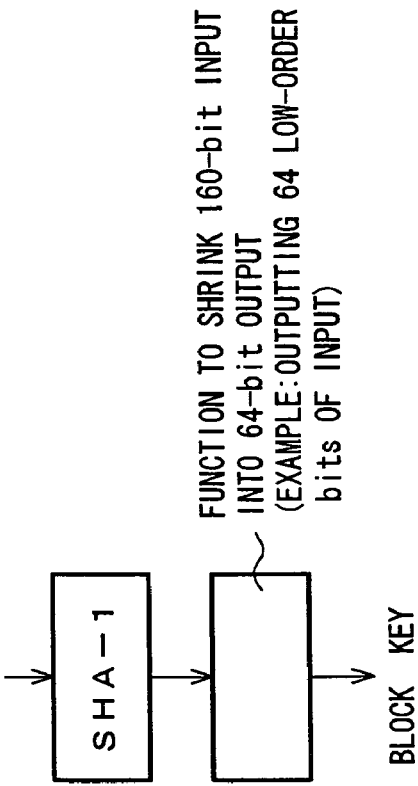

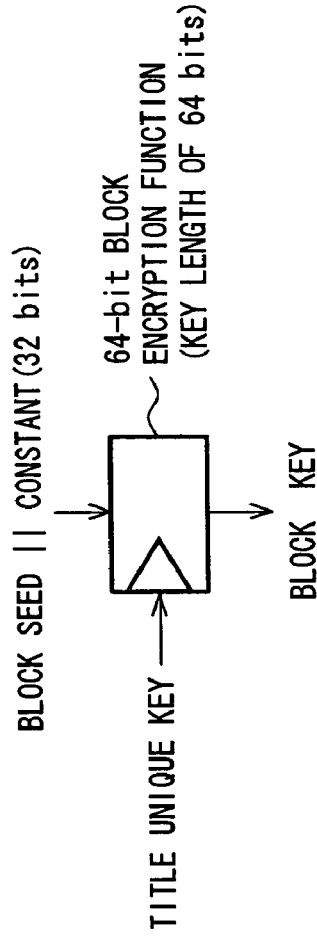

```
TYPICAL GENERATION OF BLOCK
KEY

INPUTS
   BLOCK SEED (32 bits)
   TITLE UNIQUE KEY (64 bits)
OUTPUT
   BLOCK KEY (64 bits)
```

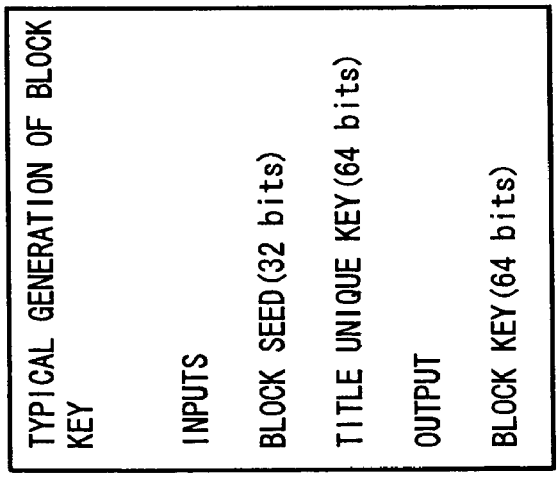

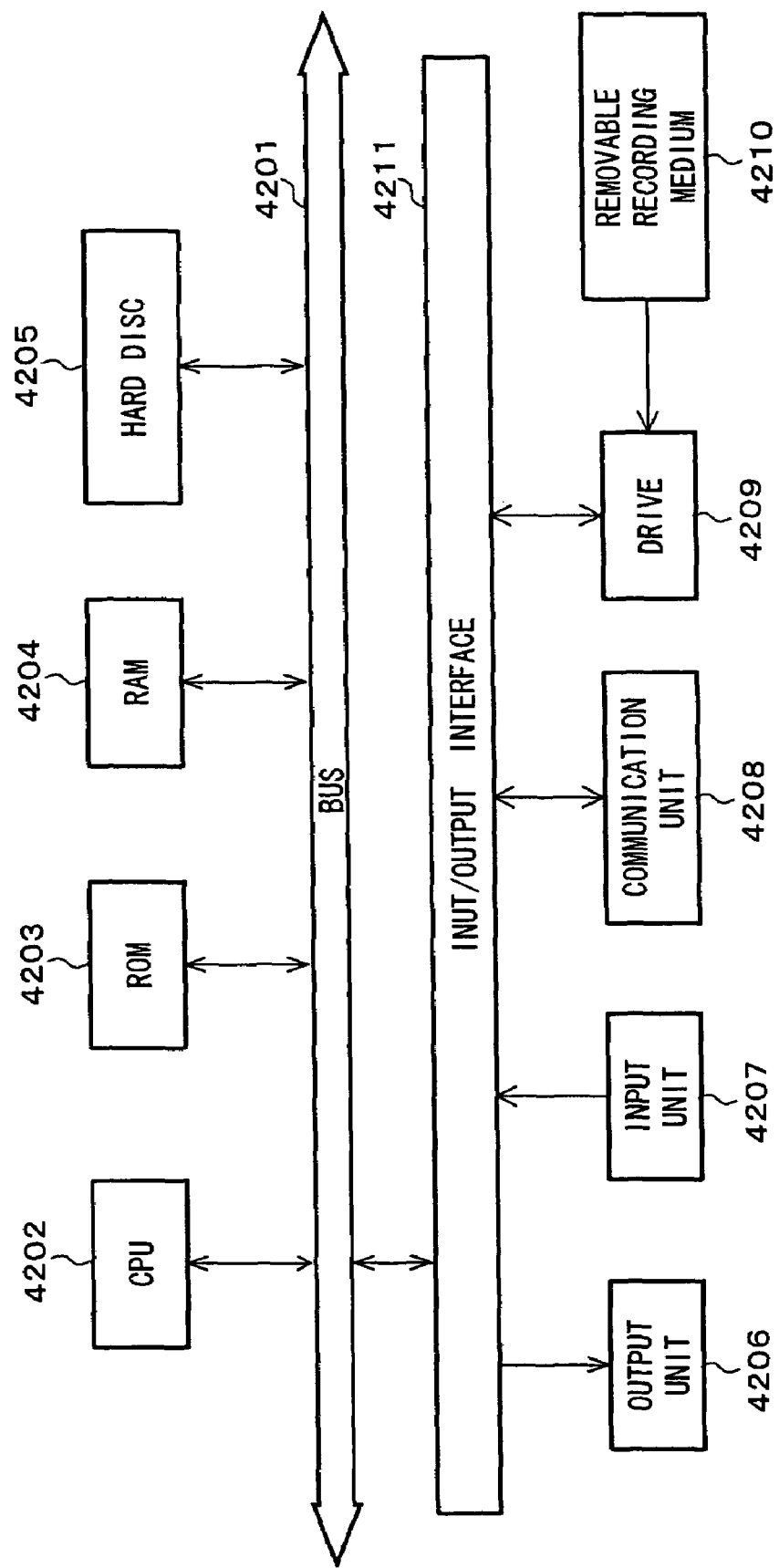

INFORMATION-RECORDING APPARATUS, INFORMATION REPRODUCTION APPARATUS, INFORMATION-RECORDING METHOD, INFORMATION REPRODUCTION METHOD AND COMPUTER PROGRAM

CROSS REFERENCE TO RELATED APPLICATIONS

The present application is a national phase entry under 35 U.S.C. §371 of International Application No. PCT/JP02/07477 filed Jul. 24, 2002, published in Japan, which claims priority from Japanese Patent Application JP2001-242041 filed Aug. 9, 2001, both of which are incorporated herein by reference.

FIELD OF THE INVENTION

In general, the present invention relates to an information-recording apparatus, an information reproduction apparatus, an information-recording method, an information reproduction method and a recording medium operable to store a computer program or other information for performing such method. More particularly, the present invention relates to an information-recording apparatus and an information-recording method involving a utilization restriction for the protection of a copyright.

BACKGROUND OF THE INVENTION

Accompanying the progress and the development of a digital-signal-processing technology, in recent years, a recording apparatus and a recording medium, which are used for digitally recording information, have been becoming popular. By using such a recording apparatus and such a recording medium, recording and reproduction processes can be carried out repeatedly without deteriorating qualities of pictures, sounds and the like. Since digital data can be copied as many times as required by sustaining its picture and sound qualities, it is quite within the bounds of possibility that a recording medium containing illegal copies is put in the market. If recording media containing illegal copies are put in the market, the interests of owners of copyrights of various contents such as music and movies and the interests of owners of marketing rights of the contents are infringed. At the present time, in order to avoid such illegal copies of digital data, there has been implemented or proposed a variety of processing systems for preventing illegal copies in digital recording apparatus and digital recording media.

In order to avoid an illegal copy of contents, copy control information provided for the contents is used. Representative examples of the copy control information are an SCMS (Serial Copy Management System) and a CGMS (Copy Generation Management System). These pieces of copy control information prescribe copy status such as Copy Free meaning that data including this copy control information can be copied without restrictions, One Generation Copy Allowed meaning that only a generation of data including this copy control information can be copied and Copy Prohibited meaning that data including this copy control information cannot be copied at all.

The CGMS applied to analog video signals is referred to as a CGMS-A. In accordance with the CGMS-A, in the case of a transmitted NTSC signal, for example, 2 bit information for copy control is included as superposed information in 20-bit additional information superposed on a valid video portion of a specific horizontal segment in a vertical blanking period of a luminance signal of the NTSC signal. The specific horizontal segment is the 20th horizontal segment of the vertical blanking period. On the other hand, the CGMS applied to digital video signals is referred to as a CGMS-D. In accordance with the CGMS-D, 2-bit information for copy control is additional information inserted into digital video data to be transmitted.

The 2-bit information for copy control in the CGMS is referred to hereafter as CGMS information having values of 00 representing Copy Free meaning that data including this copy control information can be copied without restrictions, 10 representing One Generation Copy Allowed meaning that only a generation of data including this copy control information can be copied and 11 representing Copy Prohibited meaning that data including this copy control information cannot be copied at all.

If the CGMS information added to video information has a value of 10, a recording apparatus conforming to the CGMS interprets the video information as information that can be copied and, thus, copies the video information. However, the apparatus conforming to the CGMS adds CGMS information renewed to a value of 11 to recorded video information obtained as a result of the copy operation. If the CGMS information added to video information to be copied has a value of 11, on the other hand, an apparatus conforming to the CGMS interprets the video information as information that cannot be copied at all and, thus, cancels an operation to copy the video information. There has been proposed a method for protecting a copyright by using the CGMS information of a video signal in an IEEE-1394 interface, which is used as an interface for the video signal.

In addition, in the case of an MD (trademark) apparatus where the MD is an abbreviation of a MiniDisc, as a method for preventing illegal copies, an SCMS (Serial Copy Management System) is adopted. The SCMS is a system in which an SCMS signal is output from a digital interface (DIF) of a data reproduction apparatus along with audio data and a data-recording apparatus controls a process to record the audio data on the basis of the SCMS signal received from the data reproduction apparatus.

To put it concretely, the SCMS signal is a signal revealing status of Copy Free meaning that the audio data associated with this SCMS signal can be copied any number of times, status of Copy Once Allowed meaning that the audio data associated with this SCMS signal can be copied only once or status of Copy Prohibited meaning that the audio data associated with this SCMS signal cannot be copied at all. When the data-recording apparatus receives the audio data from the DIF of the data reproduction apparatus, the data-recording apparatus detects the SCMS signal transmitted along with the audio data. If the SCMS signal reveals the status of Copy Free, the audio data and the SCMS signal are recorded onto a MiniDisc. If the SCMS signal reveals status of Copy Once Allowed, the SCMS signal is changed to indicate the status of Copy Prohibited before the audio data and the changed SCMS signal are recorded onto a MiniDisc. If the SCMS signal reveals the status of Copy Prohibited, the audio data and the SCMS signal are not recorded onto a MiniDisc. By executing the control according to the SCMS in this way, it is possible to prevent audio data protected by a copyright as indicated by an SCMS signal from being copied illegally.

As a concrete implementation of the copy control information described above, there has been provided CCI (Copy Control Information) prescribed by 5C-DTCP (5 Companies' Digital Transmission Content Protection) specifications proposed jointly by five companies including Sony Corporation, which is the applicant for a patent of the present invention.

The 5C-DTCP specifications prescribe a method of transmitting CCI (Copy Control Information) for contents transmitted through an IEEE-1394 interface, contents transmitted as a satellite digital TV broadcast, contents transmitted as a ground-wave digital TV broadcast and the like. In addition, the 5C-DTCP specifications also prescribe copy control processing in a recording/reproduction apparatus for recording and reproducing such contents.

Furthermore, besides the methods described above, there is also a system for adding copy control information to transmitted contents as a digital watermark (WM). Superposed to contents, which can be picture or audio data, a digital watermark (WM) is information difficult to see or sense in a normal reproduced state of the contents. Copy control of contents is then executed by detection of a digital watermark from the contents during typically an operation to record or reproduce the contents. Even in the case of analog contents, a digital watermark can be detected and embedded from and into the contents, widening the range of applications of the digital watermark. However, there is required a configuration used specially for detecting and embedding a digital watermark from or into the contents.

As described above, there is a number of methods for adding copy control information, which is intended for protection of a copyright of contents, to the contents. By the same token, there is a great variety of recording/reproduction apparatus including apparatus capable of processing the various kinds of copy control information described above and apparatus incapable of processing the copy control information.

In the present state of coexistence of various apparatus, there are cases in which operations to input contents from apparatus, output contents to apparatus and copy contents between apparatus entail difficulties in correctly handling copy control information of the contents. For execution of a process of contents including both additional copy control information using a digital watermark (WM) and the additional CCI (Copy Control Information) proposed by the 5C-DTCP (5 Companies' Digital Transmission Content Protection) system described above, for example, there are several types of apparatus including a contents-processing apparatus incapable of detecting a digital watermark (WM) from contents, a contents-processing apparatus capable of detecting a digital watermark (WM) from contents but incapable of embedding a digital watermark (WM) into contents and a contents-processing apparatus capable of both detecting a digital watermark (WM) from contents and embedding a digital watermark (WM) into contents. Thus, processes to fetch and renew the copy control information using a digital watermark (WM) and the CCI (Copy Control Information) are carried out in a way varying from apparatus to apparatus. In a consequence, there is resulted in a situation in which an accurate process to update the copy control information using a digital watermark (WM) and the CCI (Copy Control Information) cannot be carried out.

For example, there are an apparatus, which renews the CCI in accordance with a detected value of the digital watermark (WM), an apparatus, which merely renews the CCI without acquiring a detected value of the digital watermark (WM), and an apparatus, which renews both the CCI and the digital watermark (WM). Thus, different processes are carried out in accordance with the capability of the apparatus. As a result, there is raised a problem of a mismatch between the CCI and the WM, making it impossible to execute correct copy control.

In addition, there is also raised a demand for imposition of a restriction on the output of contents recorded on a recording medium in dependence on the original input source of the recorded contents. In such a case, if information on the input source is lost, it is impossible to accurately impose a reproduction restriction prescribed in accordance with the input source in advance. As a result, it is quite within the bounds of possibility that operations to reproduce and copy contents are carried out not in an orderly manner.

SUMMARY OF THE INVENTION

The present invention provides an information-recording apparatus, an information-recording method, an information reproduction apparatus and an information reproduction method, which are capable of executing accurate control of contents in accordance with the input source of the contents or copy control information added to the contents in a state of existence of various input sources and a state of coexistence of different apparatus handling various kinds of copy control information, as well as provide a computer program for implementing the information-recording method and the information reproduction method.

In accordance with a first aspect of the present invention, there is provided an information-recording apparatus for carrying out a process to record contents onto a recording medium, wherein copyright information including information on an input source of the contents to be recorded on the recording medium is generated, and a process to record the copyright information onto the recording medium for recording the contents is carried out.

In the above-described information-recording apparatus, preferably, data for checking falsification of the copyright information including information on an input source is generated and recorded onto the recording medium along with the copyright information.

In the above-described information-recording apparatus, preferably, the information on an input source includes information indicating whether or not the input contents contain copy control information and have been input from an IEEE-1394 interface.

In the above-described information-recording apparatus, preferably, the information on an input source includes information indicating that the input contents are digital data or analog data.

In the above-described information-recording apparatus, preferably, the information on an input source includes information indicating whether or not the input contents contain copy control information and, if the information on an input source includes information indicating that the input contents contain copy control information, the information on an input source includes information indicating whether the copy control information is added to each TS packet of digital data of the contents or added as a digital watermark.

In the above-described information-recording apparatus, preferably, node keys unique to nodes of a hierarchical tree structure having leaves corresponding to a plurality of different information-recording apparatus and leaf keys unique to the plurality of information-recording apparatus are stored; and an enabling key block (EKB) containing a node key encrypted by using keys including at least a node key on a subordinate hierarchical layer or a leaf key is subjected to a decryption process, and data for checking falsification of the copyright information including information on an input source is generated by using a key obtainable from the decryption process and recorded onto the recording medium along with the copyright information.

In the above-described information-recording apparatus, preferably, node keys unique to nodes of a hierarchical tree structure having leaves corresponding to a plurality of different information-recording apparatus and leaf keys unique to the plurality of information-recording apparatus are stored; an enabling key block (EKB) containing a node key encrypted by using keys including at least a node key on a subordinate hierarchical layer or a leaf key is subjected to a decryption process, and data for checking falsification of the copyright information including information on an input source is generated by using a key obtainable from the decryption process and recorded onto the recording medium along with the copyright information; and the enabling key block (EKB) is subjected to a decryption process, and the contents to be recorded onto the recording medium are encrypted by using a key obtained by applying a key obtainable from the decryption process prior to the process to record the contents onto the recording medium.

In accordance with a second aspect of the present invention, there is provided an information reproduction apparatus for carrying out a process to reproduce contents from a recording medium, wherein copyright information including information on an input source of the contents to be reproduced from the recording medium used for storing the contents to be reproduced is read out from the recording medium and reproduction control based on an output restriction according to the information on an input source of the contents to be reproduced is executed.

In the above-described information reproduction apparatus, preferably, data for checking falsification of the copyright information including information on an input source is generated from the copyright information read out from the recording medium used for storing the contents to be reproduced and is compared with a falsification check value already recorded on the recording medium in order to form a judgment as to whether or not the copyright information has been falsified, and the process to reproduce the contents is carried out on condition that a result of the judgment reveals that the copyright information has not been falsified.

In the above-described information reproduction apparatus, preferably, the information on an input source includes information indicating whether or not the input contents contain copy control information and have been input from an IEEE-1394 interface.

In the above-described information reproduction apparatus, preferably, the information on an input source includes information indicating that the input contents are digital data or analog data.

In the above-described information reproduction apparatus, preferably, the information on an input source includes information indicating whether or not the input contents contain copy control information and, if the information on an input source includes information indicating that the input contents contain copy control information, the information on an input source includes information indicating whether the copy control information is added to each TS packet of digital data of the contents or added as a digital watermark.

In the above-described information reproduction apparatus, preferably, node keys unique to nodes of a hierarchical tree structure having leaves corresponding to a plurality of different information reproduction apparatus and leaf keys unique to the plurality of information reproduction apparatus are stored; and an enabling key block (EKB) containing a node key encrypted by using keys including at least a node key on a subordinate hierarchical layer or a leaf key is subjected to a decryption process, and data for checking falsification of the copyright information including information on an input source is generated by using a key obtainable from the decryption process to be used for checking falsification of the copyright information.

In the above-described information reproduction apparatus, preferably, node keys unique to nodes of a hierarchical tree structure having leaves corresponding to a plurality of different information reproduction apparatus and leaf keys unique to the plurality of information reproduction apparatus are stored; an enabling key block (EKB) containing a node key encrypted by using keys including at least a node key on a subordinate hierarchical layer or a leaf key is subjected to a decryption process, and data for checking falsification of the copyright information including information on an input source is generated by using a key obtainable from the decryption process to be used for checking falsification of the copyright information; and the enabling key block (EKB) is subjected to a decryption process, and the process to reproduce the contents from the recording medium is carried out by decrypting the reproduced contents by using a key obtained by applying a key obtainable from the decryption process.

In accordance with a third aspect of the present invention, there is provided an information-recording method for carrying out a process to record contents onto a recording medium, comprising the steps of: generating copyright information including information on an input source of the contents to be recorded on the recording medium; and recording the copyright information onto the recording medium for recording the contents.

Moreover, the above-described information-recording method preferably further includes the steps of: generating data for checking falsification of the copyright information including information on an input source; and recording the data for checking falsification of the copyright information including information on an input source onto the recording medium along with the copyright information.

In the above-described information-recording method, preferably, the information on an input source includes information indicating whether or not the input contents contain copy control information and have been input from an IEEE-1394 interface.

In the above-described information-recording method, preferably, the information on an input source includes information indicating that the input contents are digital data or analog data.

In the above-described information-recording method, preferably, the information on an input source includes information indicating whether or not the input contents contain copy control information and, if the information on an input source includes information indicating that the input contents contain copy control information, the information on an input source includes information indicating whether the copy control information is added to each TS packet of digital data of the contents or added as a digital watermark.

In the above-described information-recording method, preferably, an information-recording apparatus, for executing the information-recording method, stores node keys unique to nodes of a hierarchical tree structure having leaves corresponding to a plurality of different information-recording apparatus and leaf keys unique to the plurality of information-recording apparatus, the information-recording method further comprising the steps of: subjecting an enabling key block (EKB) containing a node key encrypted by using keys including at least a node key on a subordinate hierarchical layer or a leaf key to a decryption process; and generating data for checking falsification of the copyright information including information on an input source by using a key obtainable from the decryption process and recording the data onto the recording medium along with the copyright information.

In the above-described information-recording method, preferably, an information-recording apparatus, for executing the information-recording method, stores node keys unique to nodes of a hierarchical tree structure having leaves corresponding to a plurality of different information-recording apparatus and leaf keys unique to the plurality of information-recording apparatus, the information-recording method further comprising the steps of: subjecting an enabling key block (EKB) containing a node key encrypted by using keys including at least a node key on a subordinate hierarchical layer or a leaf key to a decryption process; generating data for checking falsification of the copyright information including information on an input source by using a key obtainable from the decryption process and recording the data onto the recording medium along with the copyright information; and subjecting the enabling key block (EKB) to a decryption process, and encrypting the contents to be recorded onto the recording medium by using a key obtained by applying a key obtainable from the decryption process prior to the process to record the contents onto the recording medium.

In accordance with a fourth aspect of the present invention, there is provided an information reproduction method for carrying out a process to reproduce contents from a recording medium, comprising the steps of: reading out copyright information including information on an input source of the contents to be reproduced from the recording medium used for storing the contents; and executing reproduction control based on an output restriction according to the information on an input source of the contents to be reproduced from the recording medium.

Moreover, the above-described information reproduction method preferably further includes the steps of: generating data for checking falsification of the copyright information including information on an input source from the copyright information read out from the recording medium used for storing the contents to be reproduced; and comparing the data for checking falsification of the copyright information including information on an input source with a falsification check value already recorded on the recording medium in order to form a judgment as to whether or not the copyright information has been falsified, and carrying out the process to reproduce the contents on condition that a result of the judgment reveals that the copyright information has not been falsified.

In the above-described information reproduction method, preferably, the information on an input source includes information indicating whether or not the input contents contain copy control information and have been input from an IEEE-1394 interface.

In the above-described information reproduction method, preferably, the information on an input source includes information indicating that the input contents are digital data or analog data.

In the above-described information reproduction method, preferably, the information on an input source includes information indicating whether or not the input contents contain copy control information and, if the information on an input source includes information indicating that the input contents contain copy control information, the information on an input source includes information indicating whether the copy control information is added to each TS packet of digital data of the contents or added as a digital watermark.

In the above-described information reproduction method, preferably, an information reproduction apparatus, for executing the information reproduction method, stores node keys unique to nodes of a hierarchical tree structure having leaves corresponding to a plurality of different information reproduction apparatus and leaf keys unique to the plurality of information reproduction apparatus, the information reproduction method further comprising the steps of: subjecting an enabling key block (EKB) containing a node key encrypted by using keys including at least a node key on a subordinate hierarchical layer or a leaf key to a decryption process; and generating data for checking falsification of the copyright information including information on an input source by using a key obtainable from the decryption process to be used for checking falsification of the copyright information.

In the above-described information reproduction method, preferably, an information reproduction apparatus, for executing the information reproduction method, stores node keys unique to nodes of a hierarchical tree structure having leaves corresponding to a plurality of different information reproduction apparatus and leaf keys unique to the plurality of information reproduction apparatus, the information reproduction method further comprising the steps of: subjecting an enabling key block (EKB) containing a node key encrypted by using keys including at least a node key on a subordinate hierarchical layer or a leaf key to a decryption process; generating data for checking falsification of the copyright information including information on an input source by using a key obtainable from the decryption process to be used for checking falsification of the copyright information; and subjecting the enabling key block (EKB) to a decryption process, and carrying out the process to reproduce the contents from the recording medium by decrypting the reproduced contents by using a key obtained by applying a key obtainable from the decryption process.

In accordance with a fifth aspect of the present invention, there is provided a computer program to be executed by a computer system for carrying out a process to record contents onto a recording medium, comprising the steps of: generating copyright information including information on an input source of the contents to be recorded on the recording medium; and recording the copyright information onto the recording medium for recording the contents.

In accordance with a sixth aspect of the present invention, there is provided a computer program to be executed by a computer system for carrying out a process to reproduce contents from a recording medium, comprising the steps of: reading out copyright information including information on an input source of the contents to be reproduced from the recording medium used for storing the contents; and executing reproduction control based on an output restriction according to the information on an input source of the contents to be reproduced from the recording medium.

It is to be noted that the computer programs provided by the present invention are presented to a computer system capable of executing program code having a format that can be read by a computer. The computer programs can each be presented by using a recording medium such as a CD (Compact Disc) or an MO (Magneto-optical) disc or presented by way of a communication medium such as a network. By presenting the computer programs in a computer-readable format to the computer system, the computer system is capable of carrying out processes according to the computer programs.

The present invention's other objects and other features will become apparent from a study of the present invention's embodiments, which are explained later in more detail by referring to accompanying diagrams. It is to be noted that a technical term 'system' used in this specification means a logical set of a plurality of apparatus, which are not necessarily accommodated in the same housing.

BRIEF DESCRIPTION OF THE DRAWINGS

FIG. 3 shows flowcharts each representing a process carried out by the recording/reproduction apparatus of the present invention to record data;

FIG. 10 is a diagram showing typical configurations of block data used as additional information of block data processed by the recording/reproduction apparatus provided by the present invention;

FIG. 11 is a table showing output restrictions depending on input sources;

FIG. 12 is a diagram showing an EMI's location in a transmitted 1394 packet, which is to be processed by the recording/reproduction apparatus provided by the present invention, as defined by a 5C-DTCP specifications;

FIG. 13 is a table showing examples of copy control information, which is included in copyright information processed by the recording/reproduction apparatus provided by the present invention, at variation points;

FIG. 15 is a diagram showing enabling key blocks (EKBs) used for distribution of keys such as a master key and a media key to the recording/reproduction apparatus provided by the present invention;

FIG. 24 is an explanatory block diagram showing methods adopted by the recording/reproduction apparatus of the present invention to generate a block key;

FIG. 49 is a block diagram showing the configuration of a processing means employed in an information-recording/reproduction apparatus provided by the present invention.

DETAILED DESCRIPTION

Best Mode for Carrying Out the Invention

Preferred embodiments of the present invention are described below. The embodiments are explained in paragraphs arranged in the following order:

1: Configuration of Recording/Reproduction Apparatus

2: Recording/Reproduction Processing

3: Processing of Transport Stream (TS)

4: Processing of Digital Watermark (WM)

5: Copyright Information

6: Tree Structure in Distribution of Keys

Figure 1:
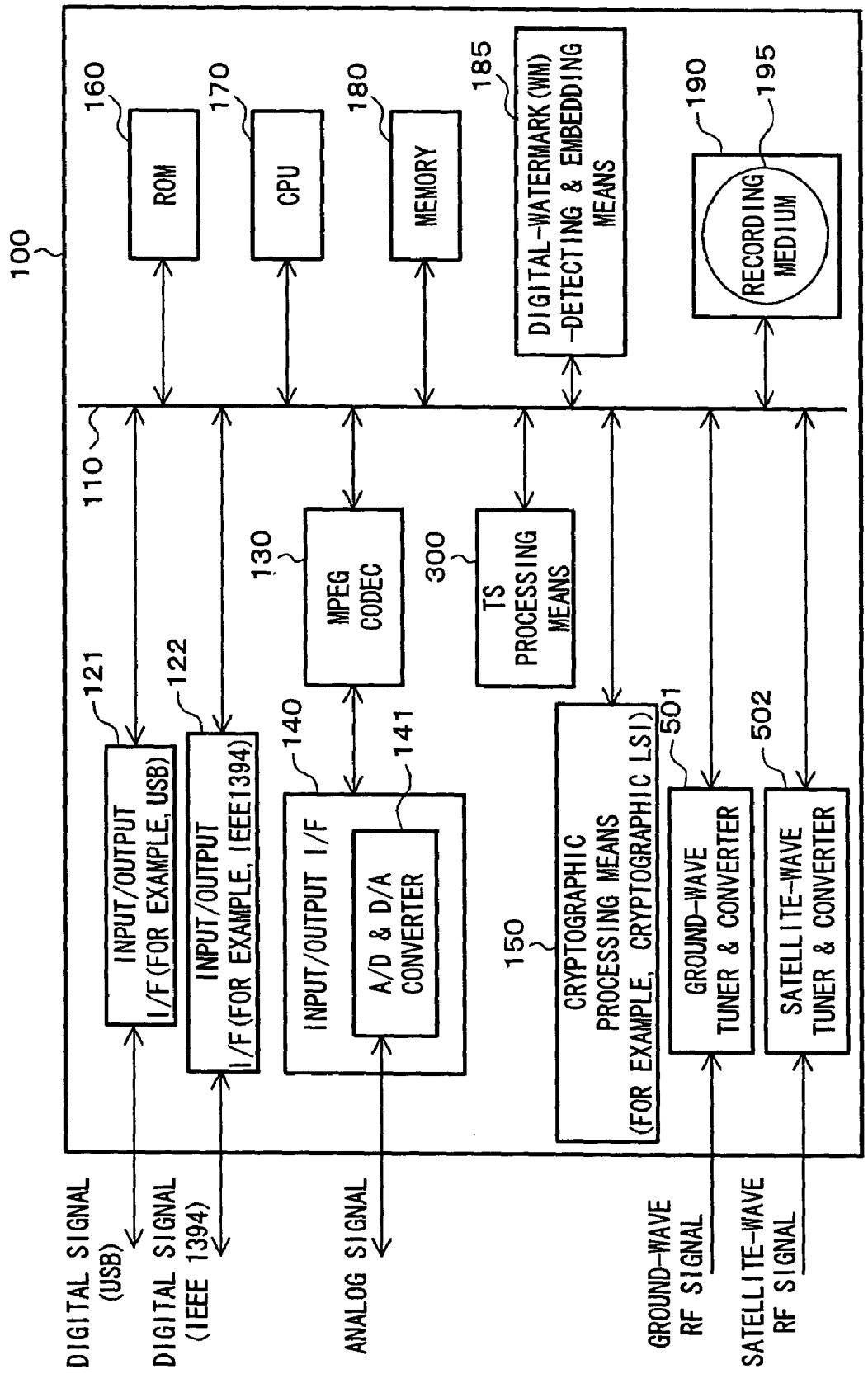
FIG. 1 is a block diagram showing a first typical configuration of a recording/reproduction apparatus provided by the present invention.

7: Recording and Reproduction of Contents by Cryptographic Processing Using Master Key 8: Recording and Reproduction of Contents by Cryptographic Processing by Using Media Key 9: Hardware Configuration of Recording/Reproduction Apparatus 1: Configuration of Recording/Reproduction Apparatus FIG. 1 is a block diagram showing the configuration of an embodiment implementing a recording/reproduction apparatus 100 serving as an information-processing apparatus provided by the present invention. An example of the recording/reproduction apparatus 100 is a DVR system for storing data onto a RAM disc mounted thereon. The DVR system is allowed to record and reproduce data onto and from the RAM disc. Another example of the recording/reproduction apparatus 100 is an HDR system for storing and reproducing data onto and from a hard disc mounted thereon. The HDR system is allowed to record and reproduce data onto and from the hard disc. A further example of the recording/reproduction apparatus 100 is an apparatus for recording and reproducing digital data onto and from a recording medium, which data can be recorded onto and reproduced from. Examples of such a recording medium are an optical disc such as a DVD and a CD, a magneto-optical disc, a magnetic disc such as an HD, a magnetic tape and a semiconductor memory such as a RAM.

The recording/reproduction apparatus 100 has input/output interface units including a USB input/output interface 121, an IEEE-1394 input/output interface 122 and an analog-data input/output interface 140, which comprises an A/D & D/A converter 141. The input/output interface 140 operates in conjunction with an MPEG codec 130. In addition, the recording/reproduction apparatus 100 also includes a ROM (Read-Only Memory) 160, a CPU (Central Processing Unit) 170, a memory 180, a drive 190 for a recording medium 195, a digital-watermark (WM)-detecting & embedding means 185, a ground-wave tuner & converter 501 for receiving a ground-wave RF signal, a satellite-wave tuner & converter 502 for receiving a satellite-wave RF signal, a cryptographic processing means 150 and a TS-processing means 300. The input/output interface 121, the input/output interface 122, the MPEG codec 130, the ROM 160, the CPU 170, the memory 180, the drive 190, the digital-watermark-detecting & embedding means 185, the ground-wave tuner & converter 501, the satellite-wave tuner & converter 502, the cryptographic processing means 150 and the TS-processing means 300 are connected to each other by a bus 110.

The input/output interface 121 and the input/output interface 122 each receive a digital signal from an external source through respectively USB and IEEE-1394 buses, supplying the digital signal to the bus 110. The digital signal represents a variety of contents such as pictures, sounds and programs. On the other hand, the input/output interface 121 and the input/output interface 122 also each receive a digital signal from the bus 110, passing on the signal to an external destination by way of the USB and IEEE-1394 buses respectively.

The MPEG codec 130 receives data completing an MPEG encoding process from the bus 110 and carries out an MPEG decoding process on the data, outputting the result of the MPEG decoding process to the input/output interface 140. On the other hand, the MPEG codec 130 receives a digital signal from the input/output interface 140 and carries out an MPEG encoding process on the signal, outputting the result of the MPEG encoding process to the bus 110. As described earlier, the input/output interface 140 includes the A/D & D/A converter 141. The input/output interface 140 receives an analog signal representing contents from an external source and converts the analog signal by using the A/D & D/A converter 141 into a digital signal in an A/D conversion process. The input/output interface 140 then outputs the digital signal to the MPEG codec 130. On the other hand, the input/output interface 140 converts a digital signal received from the MPEG codec 130 by using the A/D & D/A converter 141 into an analog signal in a D/A conversion process, and then outputs the analog signal to an external destination.

The cryptographic processing means 150 is typically a single-chip LSI (Large Scale Integrated Circuit) for encrypting or decrypting contents received from the bus 110 as a digital signal and outputting a result of encryption or a result of decryption back to the bus 110. It is to be noted, however, that implementations of the cryptographic processing means 150 are not limited to a single-chip LSI. That is to say, the cryptographic processing means 150 can be implemented into a configuration comprising a combination of various kinds of software and various kinds of hardware. The configuration of the cryptographic processing means 150 based on software will be described later.

The ROM 160 is used for storing a leaf key used as a device key typically unique to this recording/reproduction apparatus 100 or unique to a group comprising a plurality of recording/reproduction apparatus including this recording/reproduction apparatus 100. The ROM 160 is also used for storing node keys each used as a device key common to a plurality of recording/reproduction apparatus including this recording/reproduction apparatus 100 or a plurality of groups each comprising a plurality of recording/reproduction apparatus and including this recording/reproduction apparatus 100. In addition, the ROM 160 is used for storing information on a generation of a digital watermark of the recording/reproduction apparatus 100. Details of the information on a generation of a digital watermark will be described later.

The CPU 170 executes programs stored in the memory 180 in order to control other components such as the MPEG codec 130 and the cryptographic processing means 150. In conjunction with the cryptographic processing means 150, the CPU 170 also carries out a process to generate copyright information to be described later.

The memory 180 is typically a non-volatile memory for storing programs to be executed by the CPU 170 and storing data required in operations carried out by the CPU 170. In addition, the memory 180 is also used for storing output restriction rule data according to an input source to be described later.

The drive 190 drives the recording medium 195, which digital data can be recorded onto and reproduced from, in order to read out or reproduce digital data from the recording medium 195 to be output to the bus 110, and to supply digital data received from the bus 110 to be recorded onto the recording medium 195.

A program can also be stored in the ROM 160 while a device key may also be stored in the memory 180.

The recording medium 195 is a recording medium that can be used for storing digital data. Examples of such a recording medium are an optical disc such as a DVD and a CD, a magneto-optical disc, a magnetic disc such as an HD, a magnetic tape and a semiconductor memory such as a RAM. In this embodiment, the recording medium 195 can be mounted onto and dismounted from the drive 190. However, the recording medium 195 can also be embedded in the recording/reproduction apparatus 100.

Details of the TS-processing means 300 will be described later by referring to diagrams. In a word, the TS-processing means 300 carries out data processing to, for example, extract transport packets for a specific TV program (or contents) from a transport stream comprising a plurality of multiplexed TV programs (or contents) and store appearance-timing information of the extracted transport stream onto the recording medium 195 along with the transport packets themselves. In addition, the TS-processing means 300 also carries out processing to control appearance timings at a time of reproduction of packets from the recording medium 195.

In a transport stream, there are set ATS (Arrival Time Stamps) as appearance-timing information of transport packets. These timings are determined in an encoding process so as not to ruin a T-STD (Transport-stream System Target Decoder), which is a virtual decoder prescribed in MPEG2 specifications. In an operation to reproduce a transport stream, appearance timings can be put under control in accordance with ATS added to transport packets of the transport stream. These kinds of control are executed by the TS-processing means 300. For example, transport packets are recorded onto the recording medium 195 as source packets densely packed to close gaps between the source packets. By storing appearance timings of the extracted transport packets onto the recording medium 195 along with the transport packets themselves, however, output timings of the transport packets can be controlled at a reproduction time. In a data-recording operation, the TS-processing means 300 records transport packets onto the recording medium 195 such a DVD by adding an ATS (Arrival Time Stamp) representing an input timing of every transport packet to each of the transport packets.

In the recording/reproduction apparatus 100 provided by the present invention, the cryptographic processing means 150 carries out a process to encrypt contents composed of a transport stream including additional ATS described above. Then, the encrypted contents can be recorded onto the recording medium 195. On the other hand, the cryptographic processing means 150 carries out a process to decrypt encrypted contents reproduced from the recording medium 195. These processes will be described later in detail.

The digital-watermark-detecting & embedding means 185 carries out a process to embed copy control information as a digital watermark into contents to be stored onto the recording medium 195 or contents reproduced from the recording medium 195 and a process to detect an embedded digital watermark from such contents. It is to be noted that the digital-watermark-detecting & embedding means 185 also carries out the process to embed copy control information as a process to renew the copy control information. These processes will also be described later in detail.

The recording medium 195 is also used for storing various kinds of identification data and various kinds of secret information such as cryptographic-processing keys. The stored identification data includes a stamper ID set for each stamper at a disc manufacturing time, a disc ID varying from disc to disc, contents ID varying from contents to contents and a key for a cryptographic process.

If the secret information stored in the recording medium 195 is encrypted information, the secret information is decrypted by the cryptographic processing means 150. The decrypted information is then used for generating a cryptographic-processing key to be used in operations to record and reproduce contents onto and from the recording medium 195. The secret information can only be used by the cryptographic processing means 150 to generate a contents encryption key and has a configuration preventing the secret information from being leaked out to another party.

In order to make the cryptographic processing means 150, the TS-processing means 300 and the digital-watermark-detecting & embedding means 185 easy to understand, the cryptographic processing means 150, the TS-processing means 300 and the digital-watermark-detecting & embedding means 185 are each shown as a separate block in FIG. 1. It is to be noted, however, that the cryptographic processing means 150, the TS-processing means 300 and the digital-watermark-detecting & embedding means 185 can also be implemented as one LSI or a plurality of LSIs for carrying out functions of the cryptographic processing means 150, the TS-processing means 300 and the digital-watermark-detecting & embedding means 185. As an alternative, some of the functions can also be implemented by a combination of software and hardware.

Figure 2:
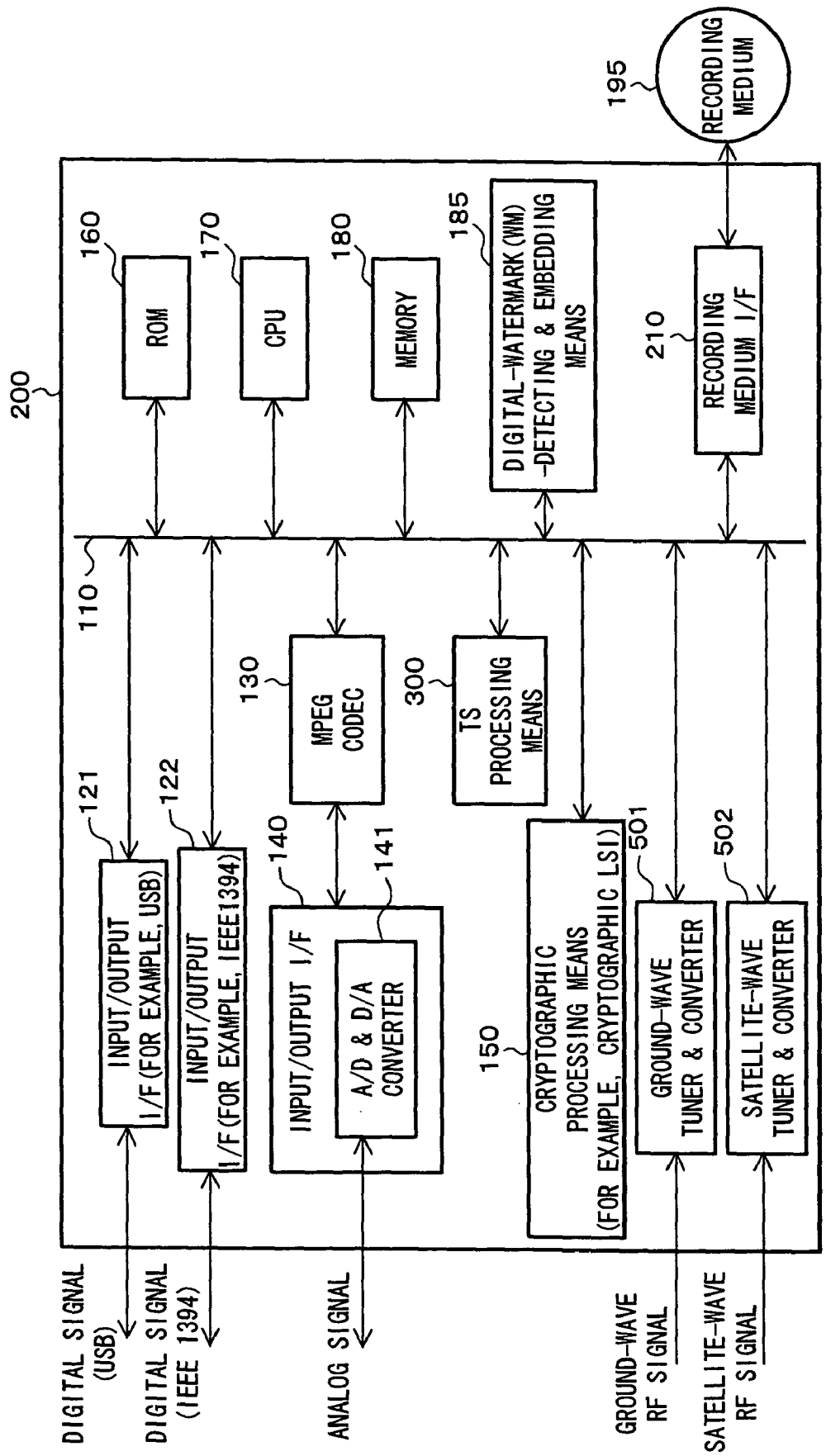
FIG. 2 is a block diagram showing a second typical configuration of the recording/reproduction apparatus provided by the present invention.

As a typical configuration of the recording/reproduction apparatus provided by the present invention, FIG. 2 shows a configuration in addition to that shown in FIG. 1. In the recording/reproduction apparatus 200 shown in FIG. 2, a recording medium 205 can be mounted on and dismounted from a recording medium interface (I/F) 210, which functions as a drive unit. Thus, the recording medium 205 can be mounted on another recording/reproduction apparatus for reading out and writing data from and onto the recording medium 205.

2: Recording/Reproduction Processing

Figure 4:
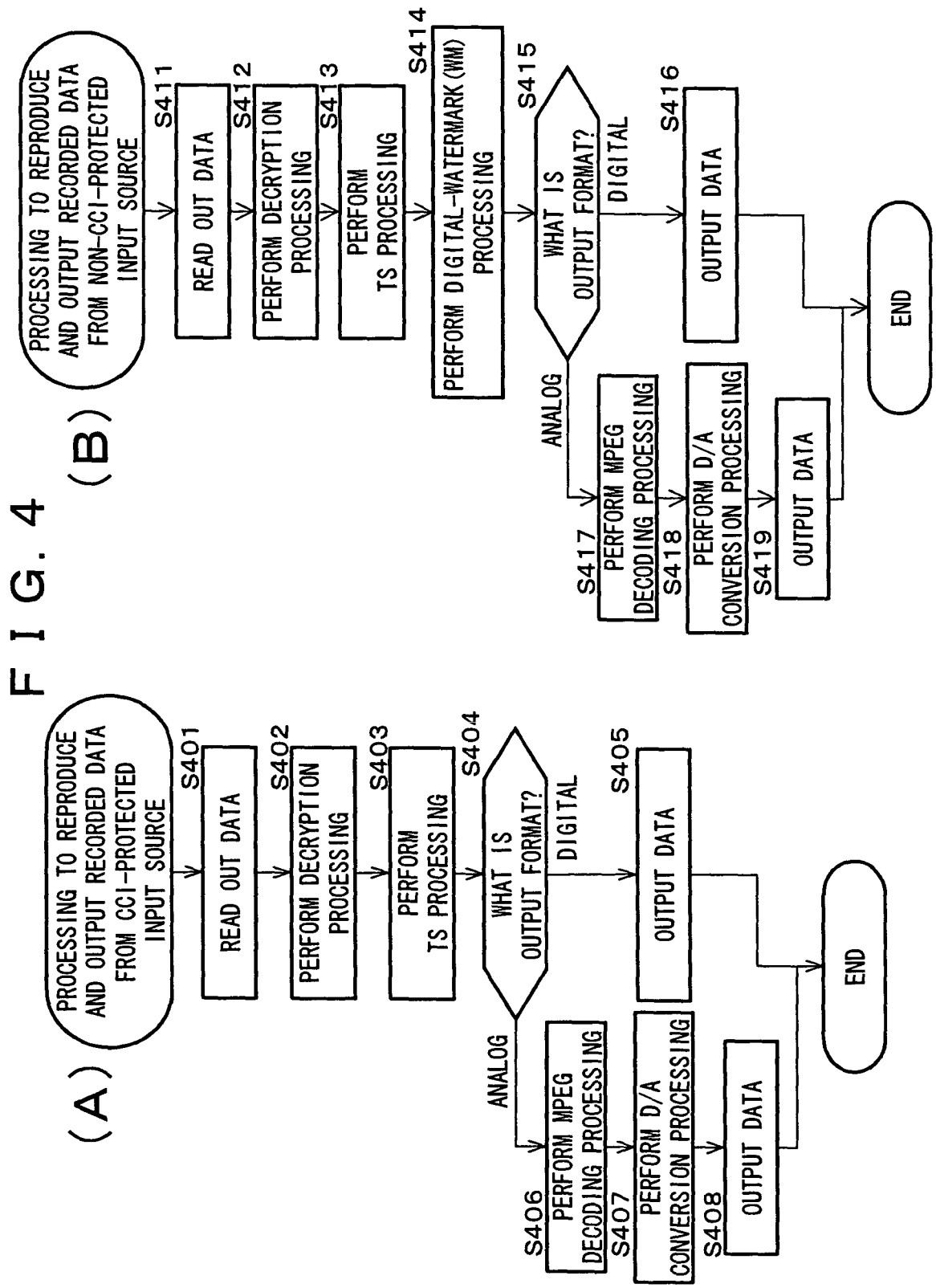
FIG. 4 shows flowcharts each representing a process carried out by the recording/reproduction apparatus of the present invention to reproduce data.

By referring to flowcharts shown in FIGS. 3 and 4, the following description explains processing to record data and reproduce data onto and from a recording medium mounted on the recording/reproduction apparatus shown in FIG. 1 or 2. Contents represented by a digital signal received from an external source are recorded onto the recording medium 195 in a recording process represented by the flowchart shown in FIG. 3(A) or 3(B). The flowchart shown in FIG. 3(A) represents a process to record a digital signal protected by CCI (Copy Control Information) provided by a 5C-DTCP (Five-Company Digital Transmission Content Protection) system. On the other hand, the flowchart shown in FIG. 3(B) represents a process to record a digital signal not protected by the CCI.

First of all, the flowchart shown in FIG. 3(A) is explained. When contents represented by a digital signal are received by the input/output I/F 122 from an IEEE (Institute of Electrical and Electronics Engineer)-1394 serial bus, the input/output I/F 120 passes on the contents to the TS-processing means 300 by way of the bus 110 at a step S301. Contents represented by a digital signal are also referred to hereafter as digital contents.

Then, at the next step S302, the TS-processing means 300 generates block data by adding an ATS (Arrival Time Stamp) to each of packets composing a transport stream of the digital contents, and supplies the block data to the cryptographic processing means 150 by way of the bus 110.

Subsequently, at the next step S303, the cryptographic processing means 150 carries out a process to encrypt the received digital contents, and outputs encrypted contents obtained as a result of the encryption process to the drive 190 or the recording-medium I/F 210 by way of the bus 110. Finally, at the next step S304, the drive 190 or the recording-medium I/F 210 stores the encrypted contents onto the recording medium 195 respectively and the execution of this recording process is ended. It is to be noted that the encryption processing carried out by the cryptographic processing means 150 will be described later.

It is worth noting that the 5C-DTCP (Five-Company Digital Transmission Content Protection) standard prescribes specifications for protecting digital contents transmitted between apparatus connected to each other by an IEEE-1394 bus. In accordance with this DTCP standard, when non-copy-free digital contents are transmitted between such transmitting and receiving apparatus, prior to the transmission of the digital contents, the apparatus carry out a mutual authentication process for determining whether or not copy control information (CCI) for controlling a copy operation is being used correctly. If the result of the mutual authentication process is OK, the transmitting apparatus encrypts the digital contents and transmits the encrypted digital contents to the receiving apparatus. Then, the receiving apparatus decrypts the encrypted digital contents referred to hereafter simply as encrypted contents and carries out a process according to the copy control information (CCI) as well as a process to update the copy control information (CCI).

The copy control information (CCI) prescribed by the DTCP standard typically includes information with a length of 2 bits for a transport packet. The information typically indicates Copy Free, One Generation Copy Allowed or Copy Prohibited. Copy Free indicates that the data including this additional information can be copied without any restriction. One Generation Copy Allowed indicates that the data including this additional information can be copied to produce only one generation. Copy Prohibited indicates that the data including this additional information cannot be copied at all. To put it concretely, in the case of a CGMS system, the 2-bit information set at 00, 10 or 11 indicates Copy Free, One Generation Copy Allowed or Copy Prohibited respectively.

In the case of a recording/reproduction apparatus conforming to the DTCP standard, the CCI included in input information is examined to form a judgment as to whether or not the contents can be recorded or copied and a process is carried out in accordance with the result of the judgment. Assume for example that the CCI for input contents is set at 11 indicating Copy Prohibited. In this case, no processing can be carried out to store the contents onto a recording medium. If the CCI for input contents is set at 10 indicating One Generation Copy Allowed, in an operation to record the contents onto the recording medium, the CCI is updated to 11 indicating Copy Prohibited.

In a data exchange based on the DTCP standard, at the step S301, the input/output I/F 122 employed in the receiving apparatus receives encrypted contents from the IEEE-1394 serial bus and decrypts the encrypted contents in conformity with the DTCP standard to produce a clear text to be supplied to the cryptographic processing means 150.

In accordance with the DTCP standard, contents are encrypted by using a generated key, which varies with the lapse of time. The encrypted digital contents are then transmitted through the IEEE-1394 serial bus by including the key used in the process to encrypt the contents in the transmitted encrypted contents. The receiving apparatus decrypts the encrypted contents by using the key included in the transmitted encrypted contents.

It is to be noted that, in accordance with the DTCP standard, speaking accurately, the transmitted encrypted contents include an initial value of the key used in the process to encrypt the contents and a flag representing timings to change the key. Then, the receiving apparatus generates a key to be used in the process to decrypt the received encrypted contents by changing the key's initial value included in the received contents with a timing represented by the flag also included in the received contents, and uses the generated key to decrypt the received encrypted contents. Thus, the received encrypted contents can be considered to be equivalent to contents including a key to be used in a process to decrypt the contents. In the following description, received encrypted contents are considered to be contents including a key to be used in a process to decrypt the contents. Information outlining the DTCP standard is disclosed for example on a web page with a URL (Uniform Resource Locator) of http://www.dtcp.com.

Next, the flowchart shown in FIG. 3(B) is explained. The flowchart shown in FIG. 3(B) represents a process carried out on a digital signal not protected by the copy control information (CCI) provided by the 5C-DTCP system. When digital contents, that is, contents represented by a digital signal, are received by the input/output I/F 121 or the input/output I/F 122 from the USB bus or the IEEE1394 bus respectively, the digital contents are passed on to the digital-watermark-detecting & embedding means 185 by way of the bus 110 at a step S311.

The digital-watermark-detecting & embedding means 185 detects a digital watermark embedded in the input contents to be used as copy control information, and carries out a process in accordance with the copy control information. The digital watermark is a primary mark, which was embedded in the contents as initial information on copy operations executable on the contents when the contents were created. Typically, the primary mark is 2 bit information having a value of 00, 10 or 11 indicating Copy Free, One Generation Copy Allowed or Copy Prohibited respectively. Assume that contents have an embedded primary mark of 10. In this case, when a recording apparatus makes a copy of the contents, 1-bit information having a value of 1 is added to the primary mark. That is to say, a digital watermark having a value of 101 is re-embedded into the resulting contents to indicate that the resulting contents are a copy. The 1-bit information added to the primary mark is referred to as a copy mark. In the case of contents having a digital watermark of 00 indicating Copy Free, it is not necessary to add a copy mark. A recording apparatus is not capable of making a copy of contents having a digital watermark of 11 indicating Copy Prohibited. As described above, contents are recorded onto a recording medium in accordance with copy control information embedded in the contents as a digital watermark.

However, there are apparatus capable of processing a digital watermark and apparatus incapable of processing a digital watermark. These apparatus are classified typically into the following three generations.

First generation: apparatus not capable of detecting and embedding a digital watermark.

Second generation: apparatus capable of only detecting a digital watermark. To be more specific, an apparatus of the second generation is capable of detecting a primary mark but incapable of carrying out a process to add a copy mark.

Third generation: apparatus capable of detecting and embedding a digital watermark. To be more specific, an apparatus of the third generation is capable of detecting a primary mark and carrying out a process to add a copy mark.

The processing carried out by these apparatus varies from generation to generation. The processing will be described concretely later.

The explanation of the flowchart shown in FIG. 3(B) is continued as follows. At a step S312, the digital watermark is processed. Then, at the next step S313, a result of the digital-watermark processing is supplied to the TS-processing means 300.

The TS-processing means 300 sets copy control information (CCI) in the data of a transport stream to be recorded in the recording medium. However, the input data of the processing represented by the flowchart shown in FIG. 3(B) is a digital signal not controlled by using CCI. Thus, it is quite within the bounds of possibility that the CCI added to the input data is unreliable. For this reason, new CCI is set in the data of a transport stream to be recorded in the recording medium. The new CCI is created from copy control information based on a digital watermark detected in the digital-watermark process carried out at the step S312.

That is to say, in the case of input data not protected by CCI, a digital watermark included in input information is examined to form a judgment as to whether or not the contents can be recorded onto (copied to) the recording medium. Then, a process is carried out in accordance with the result of the judgment. If the digital watermark embedded in the input data has a value of 11 indicating Copy Prohibited, for example, the processing to store the contents represented by the input data onto the recording medium is not carried out. If the digital watermark embedded in the input data has a value of 10 indicating One Generation Copy Allowed, on the other hand, the processing to store the contents represented by the input data onto the recording medium is carried out and the TS-processing means 300 sets the CCI at 11 indicating Copy Prohibited in the processing to store the contents onto the recording medium.

As described above, in the process of data not protected by CCI, CCI based on a digital watermark is set in the transport stream containing the data.

Processes carried out at subsequent steps S314 and S315 are the same as those performed at respectively the steps S303 and S304 of the flowchart shown in FIG. 3(A). In the case of an apparatus capable of embedding a digital watermark, the updated copy control information is embedded in the contents before the contents are recorded onto the recording medium.

Next, the flowchart shown in FIG. 3(C) is explained. The flowchart shown in FIG. 3(C) represents a process carried out to record an analog signal onto the recording medium 195. The flowchart begins with a step S321 at which the input/output interface 140 receives analog contents. Analog contents are defined as contents represented by an analog signal. Then, at the next step S322, the analog contents are subjected to an A/D conversion process in the A/D & D/A converter 141 to generate digital contents, which are contents represented by a digital signal as described above.

The digital contents are supplied to the MPEG codec 130. At a step S323, the digital contents are subjected to an MPEG encoding process, which is an encoding process based on MPEG compression, before being supplied to the cryptographic processing means 150 by way of the bus 110.

Processes carried out at subsequent steps S324, S325 and S326 are the same as those performed at respectively the steps S312, S313 and S314 of the flowchart shown in FIG. 3(B). That is to say, the digital-watermark-detecting & embedding means 185 detects and updates a digital watermark. Then, the TS-processing means 300 adds an ATS to each transport packet and adds CCI (Copy Control Information) based on the detected digital watermark to the contents. Subsequently, the cryptographic processing means 150 encrypts the contents before the encrypted contents obtained as a result of the encryption processing is recorded onto the recording medium 195. Finally, the execution of the process to record the contents onto the recording medium 195 is ended.

As described above, the process to record contents onto a recording medium is carried out by a recording/reproduction apparatus functioning as an information-processing apparatus provided by the present invention in a way dependent on the input source supplying the contents. In the case of contents input from an IEEE-1394 bus conforming to the 5C-DTCP specifications, contents input as a satellite/ground-wave digital television broadcast or the like, a method of transmitting copy control information (CCI) of the contents is prescribed. In addition, if the contents are protected by the copy control information, the CCI is examined to determine a way in which the contents are to be protected in the operation to record the contents onto the recording medium. In the case of contents input from an IEEE-1394 bus and not protected by using CCI in conformity with the 5C-DTCP specifications and in the case of analog contents, it is necessary to monitor a digital watermark of the input contents during the entire recording process in order to determine CCI for the contents. As a result, a process to terminate the recording processing may be carried out in some cases in dependence on CCI indicated by the detected digital watermark. If the copy control information fetched from the detected digital watermark is Copy Prohibited, for example, the contents are not recorded onto a recording medium.

It is to be noted that, in an operation carried out by a recording/reproduction apparatus provided by the present invention to record contents onto a recording medium, copyright information for the recorded contents is also recorded onto the recording medium, being associated with the recorded contents. Examples of the copyright information are information on an input source, information on the digital-watermark generation of the recording apparatus, information on a recording mode to be described later, strictest copy control information or copy control information at a variation point or a packet number corresponding to the variation point. One or more of the information on an input source, the information on the digital-watermark generation of the recording apparatus, the information on a recording mode, the strictest copy control information and the copy control information at a variation point or a packet number corresponding to the variation point are recorded on the recording medium as copyright information. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents. The examples of the copyright information and typical processes to store them will be described in detail later.

First of all, the strictest copy control information provided for each title is explained. In general, various kinds of data exist in contents. For example, contents include data with 'Copy Prohibited' copy control information, data with 'Copy Free' copy control information and data with 'One Generation Copy Allowed' copy control information. The strictest one among these pieces of copy control information is selected as the strictest copy control information for each title and stored in the recording medium, being associated with the contents. It is to be noted that, in a recording/reproduction apparatus provided by the present invention, a title key is generated as a cryptographic-processing key for each title of contents to be recorded in the recording medium and is recorded in the recording medium, being associated with the contents. The title key is used in a cryptographic process. The process will be described later.

It is to be noted that the typical restrictions imposed by the copy control information as described above are arranged in the order of strictness as follows: Copy Prohibited, One Generation Copy Allowed and Copy Free. Assume for example that contents recorded in the recording medium, being associated with a title key include the two restrictions 'One Generation Copy Allowed' and 'Copy Free' as copy control information. In this case, as copy control information provided for a title, the restriction 'One Generation Copy Allowed' is set. The restriction 'Copy Prohibited' is set as copy control information, if the contents include 'Copy Prohibited'. The restriction 'Copy Free' is set as copy control information provided for a title only if the contents recorded in the recording medium, being associated with a title key include only the restriction 'Copy Free'.

By referring to flowcharts shown in FIG. 4, the following description explains processes to reproduce contents from the recording medium 195 and output the reproduced contents as digital or analog contents. The reproduction process is carried out in a way, which varies in dependence on the information on an input source and in dependence on existence of recorded copy control information provided for each title. The information on an input source and the copy control information provided for each title are recorded in the recording medium as copyright information associated with the contents to be reproduced. The information on an input source is information indicating what input source the contents were received from.

First of all, if the recorded copy control information provided for each title exists, the process is evaluated on the basis of the information to form a judgment as to whether or not reproduction of the contents is allowed. If the recorded copy control information provided for each title does not exist, on the other hand, the apparatus carries out a reproduction process while detecting a digital watermark and, in dependence on the result of watermark detection, the apparatus forms a judgment as to whether or not the reproduction of the contents is indeed allowed. If the reproduction of the contents is allowed, the contents are output in a form conforming to a rule set by the input source originally generating the contents. In general, contents other than Copy Free contents need protection in the output operation. In the case of digital contents, the apparatus outputs the contents while setting CCI in a transport stream in conformity with typically the 5CDTDP standard. In the case of analog contents, on the other hand, the apparatus outputs the contents while adding typically a macrovision signal to the contents. In the case of a video signal, the apparatus outputs the signal while adding an AGC pulse signal by utilizing typically additional information of a CGMS system and/or differences of an AGC technique. The additional information of a CGMS system is referred to hereafter as CGMS information. The AGC pulse signal is added in order to disable normal utilization of a copied video signal. The AGC pulse signal is a pseudo synchronization signal provided by a macrovision technique to prevent copy operations.

The processing flowchart shown in FIG. 4(A) represents a procedure of a process to reproduce recorded data originally received from an input source applying CCI protection from the recording medium and output the reproduced data.

The flowchart begins with a step S401 at which encrypted contents and copyright information associated with the contents are read out by the drive 190 or the recording-medium I/F 210 from the recording medium 195 respectively. As described above, the copyright information includes at least one of the information on an input source, the information on the digital-watermark generation of the recording apparatus, the information on a recording mode to be described later, the strictest copy control information and the copy control information at a variation point or a packet number corresponding to the variation point. Provided for each title, the strictest copy control information is strictest CCI among pieces of copy control information obtained from the contents as described above. Also as described above, the copy control information at a variation point or a packet number corresponding to the variation point shows a variation of the copy control information in the contents. These pieces of information are used for forming a judgment as to whether or not the operations to reproduce and output the contents are allowed. Details of these processes will be described later. If the operations to reproduce and output the contents are allowed, the encrypted contents are supplied to the cryptographic processing means 150 by way of the bus 110.

At a step S402, the cryptographic processing means 150 carries out a process to decrypt the encrypted contents received from the drive 190 or the recording-medium I/F 210. Data obtained as a result of the decryption process is supplied to the TS-processing means 300 by way of the 110.

Then, at the next step S403, the TS-processing means 300 forms a judgment on an output timing from an ATS added to each of transport packets composing a transport stream of the contents, and executes control according to the ATS. The TS-processing means 300 then outputs the transport stream of the contents to the input/output I/F 120 by way of the bus 110. In addition, the TS-processing means 300 also detects copy control information (CCI) included in the transport stream, and executes control based on the detected CCI.

Subsequently, the flow of the procedure goes on to a step S404 to form a judgment as to whether the contents from the TS-processing means 300 is to be output in an analog or digital form. If the contents from the TS-processing means 300 is to be output in a digital form, the flow of the procedure goes on to a step S405 at which the TS-processing means 300 outputs the contents to an external destination by way of the input/output I/F 121 or the input/output I/F 122. Finally, the execution of this procedure is ended. It is to be noted that details of the processing carried out by the TS-processing means 300 and details of the processing carried out by the cryptographic processing means 150 will be described later.

It is worth noting that, if the TS-processing means 300 outputs the digital contents to an external destination by way of the input/output I/F 120 and the IEEE-1394 serial bus at the step S405, the input/output I/F 120 carries out an authentication process with the partner apparatus at the external destination in conformity with the DTCP standard as described earlier. If the result of the authentication process is OK, the digital contents are encrypted before being transmitted.

If the contents from the TS-processing means 300 is to be output in an analog form, on the other hand, the flow of the procedure goes on to a step S406 at which the digital contents obtained as a result of the decryption process carried out by the cryptographic processing means 150 is supplied to the MPEG codec 130 by way of the bus 110.

At the step S406, the digital contents are subjected to an MPEG decoding process, that is, a decompression process, in the MPEG codec 130 before being supplied to the input/output interface 140. Then, at the next step S407, the A/D & D/A converter 141 embedded in the input/output interface 140 carries out a D/A conversion process (S425) to convert the digital contents into analog contents. Subsequently, at the next step S408, the input/output interface 140 outputs the analog contents to an external destination. Finally, the execution of this procedure is ended.

On the other hand, the processing flowchart shown in FIG. 4(B) represents a procedure of a process to reproduce recorded data originally received from an input source not applying CCI protection from the recording medium and output the reproduced data. In this case, the reproduction processing is controlled on the basis of copy control information acquired from a detected digital watermark of the contents represented by the data instead of CCI added to block data in the transport stream of the contents.

The processing represented by the flowchart shown in FIG. 4(B) is different from the processing represented by the flowchart shown in FIG. 4(A) in that the processing represented by the flowchart shown in FIG. 4(B) includes a digital-watermark (WM) process carried out at a step S414 after the TS process performed at a step S413. The digital-watermark (WM) process is a process to detect a digital watermark from the data of contents being reproduced, fetch copy control information from the detected digital watermark and control the reproduction processing on the basis of the fetched copy control information. Assume for example that the copy control information fetched from the detected digital watermark is Copy Prohibited. In this case, control is executed to prevent an operation to output the reproduced contents from accompanying the reproduction processing.

In the recording/reproduction apparatus provided by the present invention, as described earlier, copyright information for contents is recorded onto a recording medium, being associated with the contents in an operation to record the contents onto the recording medium. In an operation to reproduce the contents, the copyright information for the contents is acquired and control is executed in accordance with various kinds of data included in the copyright information. These processes will be described later.

3: Processing of Transport Stream (TS)

Figure 5:
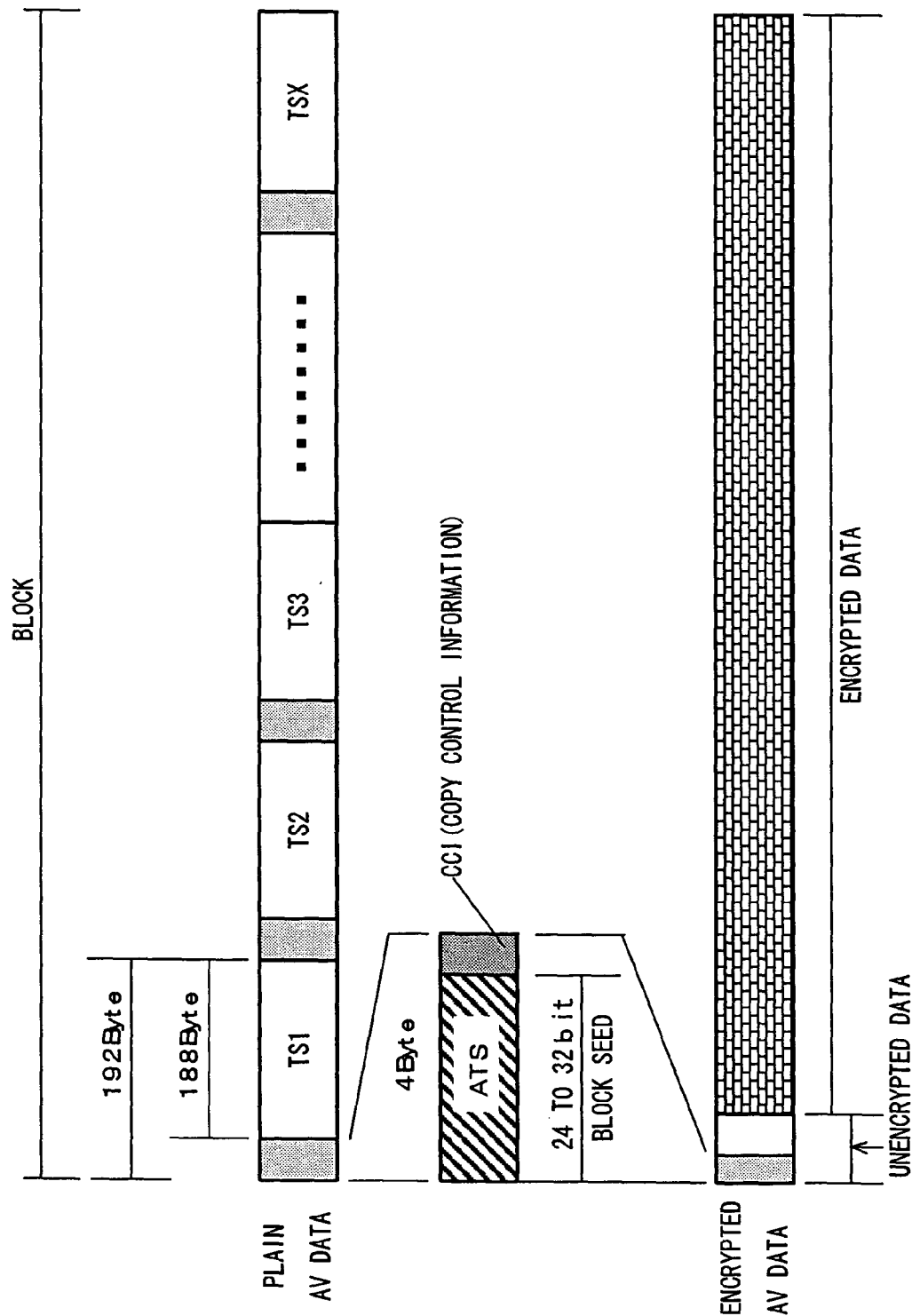
FIG. 5 is a diagram showing formats of data processed by the recording/reproduction apparatus provided by the present invention.

Next, by referring to FIG. 5 and subsequent figures, the following description explains a data format on a recording medium provided by the present invention. The data format explained in the following description is a format of data stored in a recording medium of typically a DVR system. In the following description, a block is a minimum unit used in operations to read out and write data from and onto a recording medium. The size of the block is 192*X bytes where X is typically 32.

In the present invention, an ATS is added to an MPEG2 TS (transport stream) packet having a size of 188 bytes to produce a 192-byte packet. X such packets are collected to form 1 block. An ATS having a size of 24 to 32 bits is data indicating an arrival time. As described earlier, the ATS is an abbreviation of the arrival time stamp. The ATS added to a packet is data having a characteristic of randomness according to the arrival time of the packet. X TS (transport stream) packets each having an additional ATS are recorded as a block or sector in a recording medium. In the configuration of the present invention, a block key for encrypting the data of a block (or a sector) composing a transport stream is created by using an ATS added to the first TS packet of the block.

By using an ATS, which exhibits a characteristic of randomness, to generate a block key for encrypting the data of a block, the resulting block key is unique to the block and varies from block to block. The block key generated for a block is used for carrying out a process to encrypt the block. Since a block key can be generated by using an ATS, there is no need to provide an area for storing a block key to be used as an encryption key in the recording medium, making it possible to utilize a main-data area with a high degree of efficiency. In addition, since it is also unnecessary to make an access to data outside the main-data area during the recording and reproduction operations, the processing can be carried out with a high degree of efficiency.

It is to be noted that a block seed shown in FIG. 5 is additional information including an ATS. The block seed also includes CCI (copy control information). In this case, a block key is generated by using the ATS and the CCI.

It is also worth noting that the CCI (copy control information) included in the block seed is the CCI (copy control information) provided by the 5C-DTCP (Digital Transmission Content Protection) system mentioned earlier. There are two kinds of CCI in accordance with the device capability, namely, information reflecting an EMI (Encryption Mode Indicator) and information reflecting embedded CCI, which is embedded in the contents and applied to a format allocating a field for transmitting copy control information in advance.

It is to be noted that, in an operation to store contents onto a recording medium such as a DVD in the configuration provided by the present invention, most data of the contents are encrypted. As shown at the bottom of FIG. 5, however, the first m bytes of the block are recorded in a state of being unencrypted as it is, where m is typically represents a typical value of 8 or 16. The rest of the block, that is, the (m+1)th and subsequent bytes, are encrypted before being recorded. The value of m is set at a multiple of 8 imposing a restriction on the length of data to be encrypted because the encryption process is a process carried out in 8-byte units. If the encryption process can be carried out in 1 byte units, for example, the remaining portion after the block seed can be encrypted with the value of m set at 4.

Next, functions of the ATS are described in detail. As described earlier, the ATS is an arrival time stamp added to a transport packet of an input transport stream in order to hold the appearance timing of the transport packet.

When one or more TV programs (or contents) are fetched from a transport stream comprising a plurality of multiplexed TV programs (or contents), transport packets composing the TV programs fetched from the transport stream appear at irregular intervals as shown in FIG. 7(a). The appearance timings of transport packets composing the transport stream each have a significant meaning. These appearance timings are determined at an encoding time at such values that a T-STD (Transport stream System Target Decoder) is not ruined. The T-STD is a virtual decoder prescribed in MPEG2 specifications (ISO/IEC 13818-1).

In an operation to reproduce a transport stream, appearance timings of transport packets composing the transport stream are controlled by using an ATS added to each of the transport packets. Thus, when a transport packet is recorded onto a recording medium, it is necessary to save the input timing of the transport packet. To put it concretely, when a transport packet is recorded onto a recording medium such as a DVD, an ATS showing the input timing of the transport packet is also recorded onto the DVD, being associated with the packet.

Figure 6:
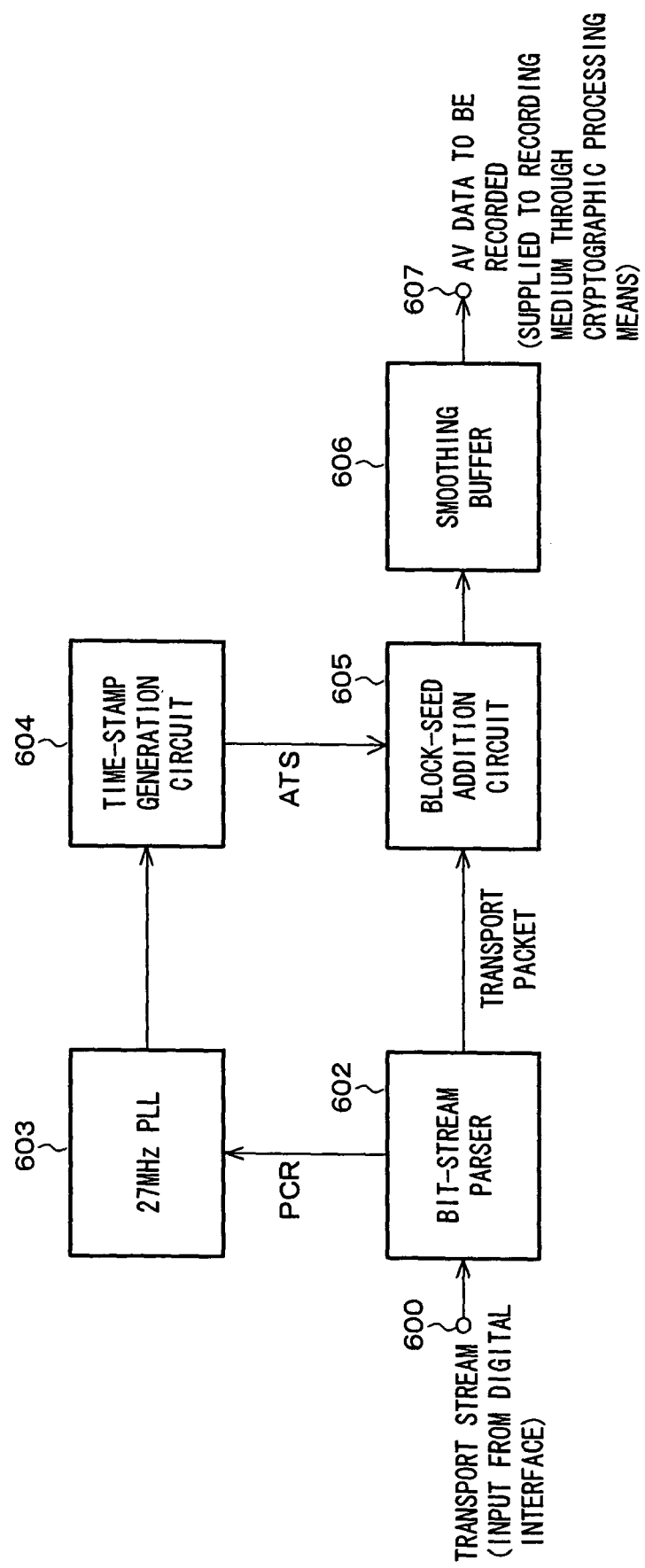
FIG. 6 is a block diagram showing a configuration of a TS (transport stream)-processing means employed in the recording/reproduction apparatus provided by the present invention.

FIG. 6 is an explanatory block diagram showing components for carrying out processes in the TS-processing means 300 to record a transport stream input through a digital interface onto a recording medium such as a DVD used as storage media. A transport stream is input through an input terminal 600 as digital data originated by a digital broadcasting station or the like. In the recording/reproduction apparatus shown in FIG. 1 or 2. The transport stream input to the input terminal 600 is received from the input/output I/F 120, or the input/output interface 140 by way of the MPEG codec 130.

The transport stream is passed on to a bit-stream parser 602. The bit-stream parser 602 detects a PCR (Program Clock Reference) packet included in the input transport stream. A PCR packet is a packet including an encoded code of a PCR prescribed by the MPEG2 specifications. PCR packets each including an encoded PCR are placed in the transport packet at time intervals each not exceeding 100 msec. The PCR expresses a time, at which a transport packet arrives at the receiver side, with a resolution of 27 MHz.

At a 27-MHz PLL 603, a 27-MHz clock signal of the recording/reproduction apparatus is locked to the PCRs of the transport stream. A time-stamp generation circuit 604 generates a time stamp based on a count value obtained as a result of counting the number of clock pulses in the 27-MHz clock signal. A block-seed addition circuit 605 adds an ATS to a transport packet. The ATS is a time stamp at which the first byte of the transport packet is supplied to a smoothing buffer 606.

The transport packet including the additional ATS is read out from the smoothing buffer 606 and supplied to the cryptographic processing means 150 by way of an output terminal 607. After completing a cryptographic process to be described later, the transport packet is recorded by the drive 190 onto the recording medium 195 used as the storage media in the case of the recording/reproduction apparatus shown in FIG. 1 or recorded by the recording-medium I/F 210 onto the recording medium 195 used as the storage media in the case of the recording/reproduction apparatus shown in FIG. 2.

Figure 7:
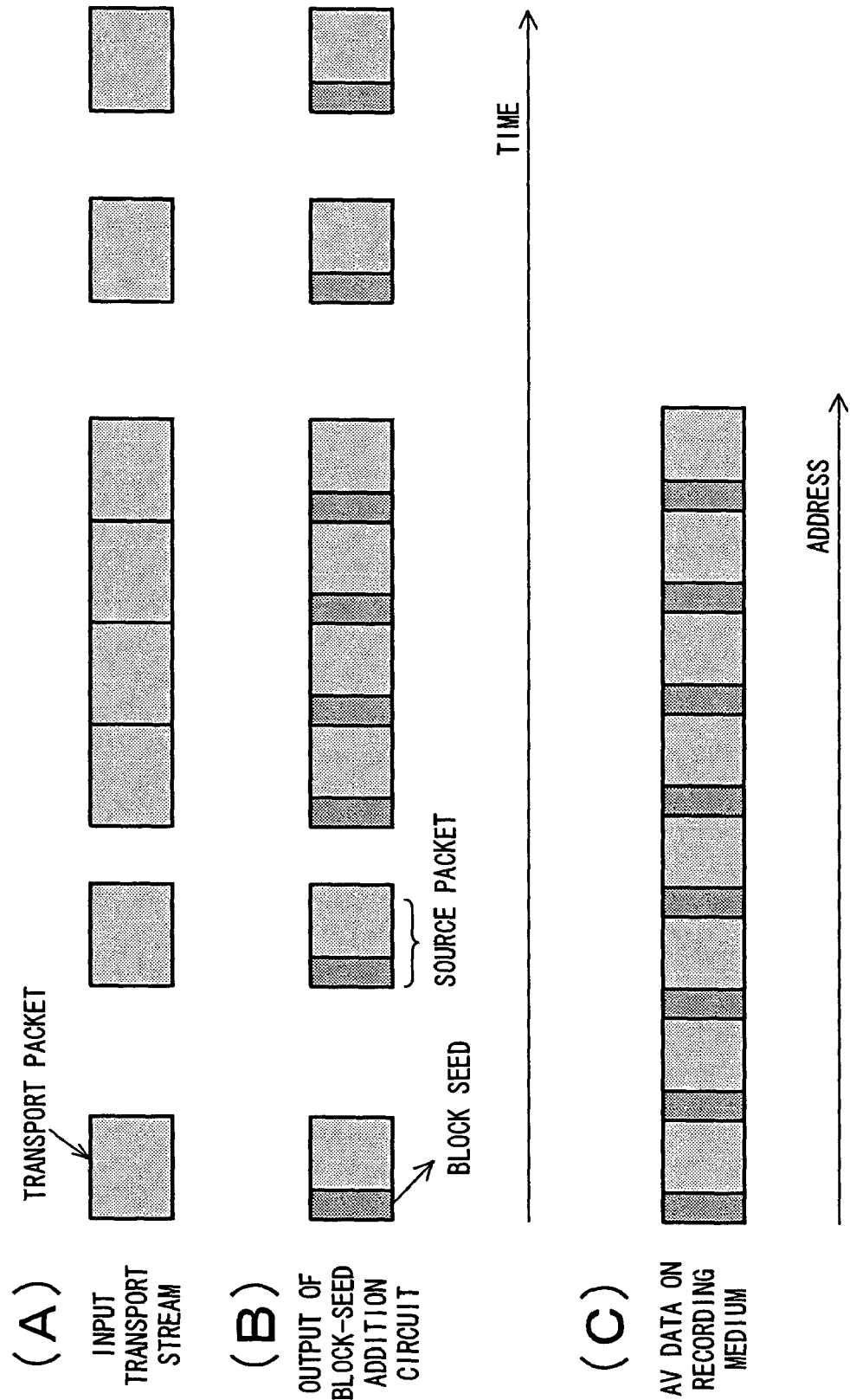
FIG. 7 is an explanation diagram showing the configuration of a transport stream processed by the recording/reproduction apparatus provided by the present invention.

FIG. 7 is a diagram showing a typical process to record an input transport stream onto a recording medium. To be more specific, FIG. 7(a) shows input transport packets composing a specific program (contents). The horizontal axis is the time axis representing times along the stream. In this example, transport packets are input at irregular time intervals as shown in FIG. 7(a).

FIG. 7(b) shows the output of the block-seed addition circuit 605. The block-seed addition circuit 605 adds a block seed including an ATS showing a transport packet's time on the stream to the transport packet to generate a source packet for each transport packet of the stream. FIG. 7(c) shows source packets recorded on the recording medium. As shown in FIG. 7(c), source packets are recorded onto the recording medium in a state of being densely packed to close gaps between the source packets. By recording source packets onto the recording medium in a state of being densely packed to close gaps between the source packets, the recording area of the recording medium can be used with a high degree of efficiency.

Figure 8:
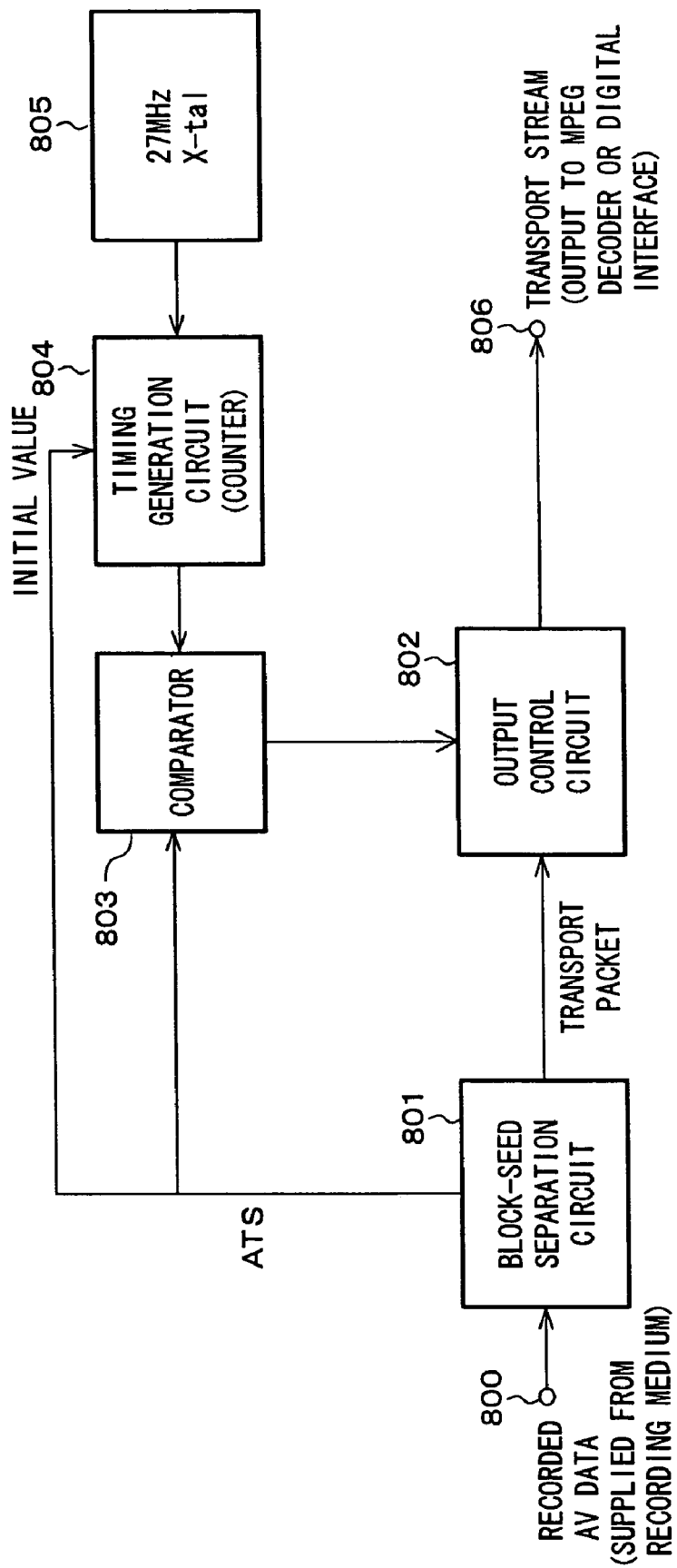
FIG. 8 is a block diagram showing another configuration of the TS (transport stream)-processing means employed in the recording/reproduction apparatus provided by the present invention.

FIG. 8 is an explanatory block diagram showing components for carrying out processes in the TS-processing means 300 to reproduce a transport stream from the recording medium 195. A transport packet including an ATS received from an input terminal 800 is passed on to a block-seed separation circuit 801. The transport packet including an ATS has been decrypted by the cryptographic processing means 150 to be explained later. The block-seed separation circuit 801 separates the ATS from the transport packet. A timing generation circuit 804 measures a time based on a count value obtained as a result of counting a 27-MHz clock signal 805 of the reproduction apparatus.

It is to be noted that, at the start time of the reproduction processing, the timing generation circuit 804 is set at an initial value indicated by a first ATS. A comparator 803 compares an ATS of a transport packet with the present time received from the timing generation circuit 804. When an ATS of a transport packet is found equal to the present time received from the timing generation circuit 804, an output control circuit 802 outputs the transport packet to the MPEG codec 130 or the input/output I/F 120.

Figure 9:
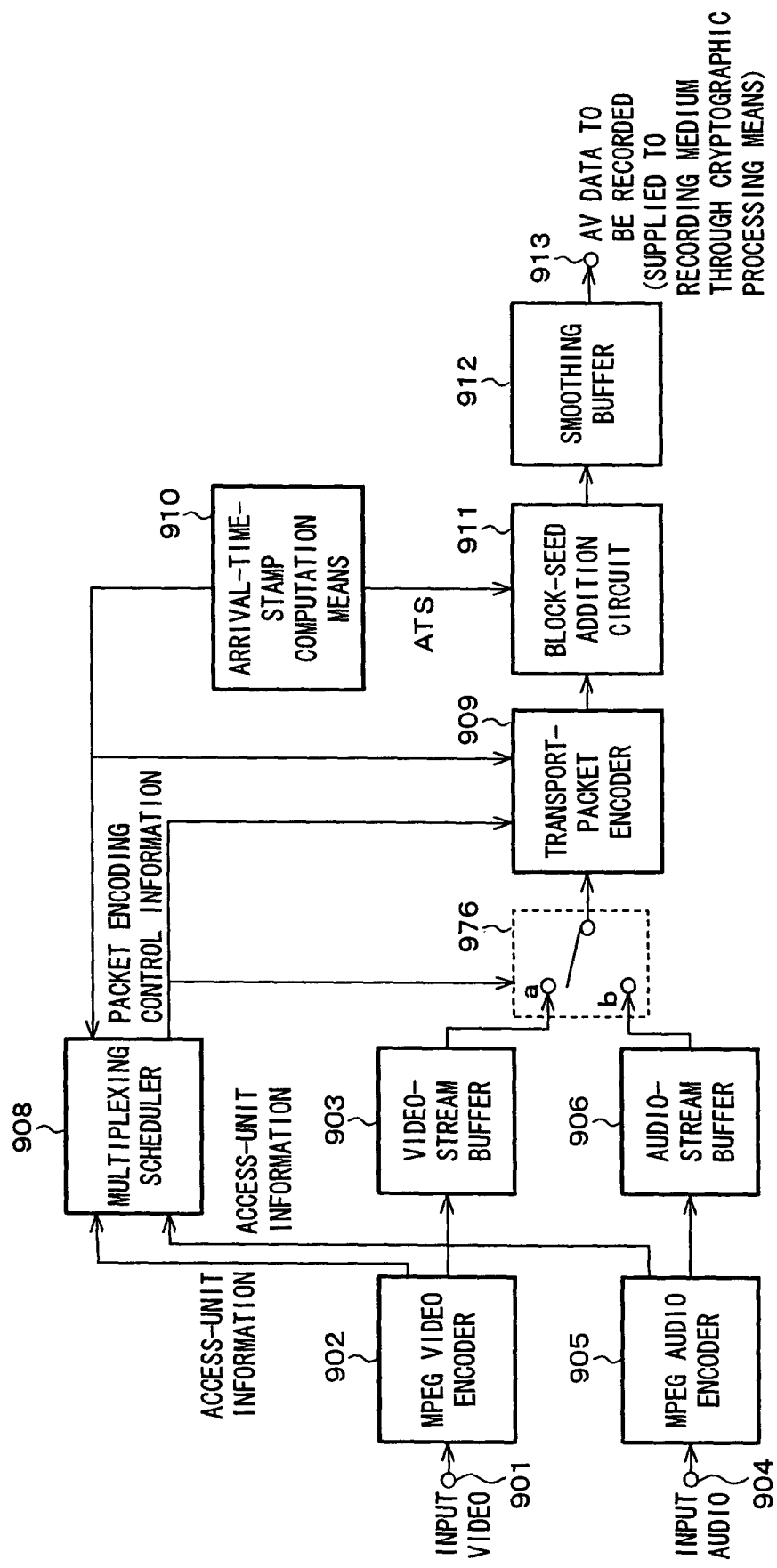
FIG. 9 is a block diagram showing a further configuration of the TS (transport stream)-processing means employed in the recording/reproduction apparatus provided by the present invention.

FIG. 9 is an explanatory block diagram showing components for carrying out MPEG encoding processes on an input AV signal in the MPEG codec 130 employed in the recording/reproduction apparatus 100 and components for carrying out processes to encode a transport stream in the TS-processing means 300 also employed in the recording/reproduction apparatus 100. That is to say, FIG. 9 is an explanatory block diagram showing components employed in both the MPEG codec 130 and the TS-processing means 300 of the recording/reproduction apparatus 100 shown in FIG. 1 or 2. A video signal is input from an input terminal 901 and passed on to an MPEG video encoder 902.

The MPEG video encoder 902 encodes an input video signal into an MPEG video stream and outputs the MPEG video stream to a buffer video-stream buffer 903. In addition, the MPEG video encoder 902 outputs information on an access unit for the MPEG video stream to a multiplexing scheduler 908. The access unit of a video stream is a picture and the information on the access unit includes a type of the picture, an encoding bit quantity and a decode time stamp. The type of a picture can be I, P or B. The decode time stamp is information prescribed by the MPEG2 specifications.

An audio signal input from an input terminal 904 is passed on to an MPEG audio encoder 905. The MPEG audio encoder 905 encodes the input audio signal into an MPEG audio stream and outputs the encoded MPEG audio stream to an audio-stream buffer 906. In addition, the MPEG audio encoder 905 outputs information on an access unit for the MPEG audio stream to the multiplexing scheduler 908. The access unit of an audio stream is an audio frame and the information on the access unit includes an encoding bit quantity of each audio frame and a decode time stamp.

The multiplexing scheduler 908 receives the information on the video access unit and the information on the audio access unit. The multiplexing scheduler 908 controls a method of encoding the video and audio streams into transport packets on the basis of the information on the video access unit and the information on the audio access unit respectively. The multiplexing scheduler 908 has an internal clock signal for generating a reference time having a resolution of 27 MHz. The multiplexing scheduler 908 determines packet encoding control information of transport packets so as to satisfy the T-STD, which is a virtual decoder model prescribed by the MPEG2 specifications as described above. The packet encoding control information includes the type of a stream to be encoded and the length of the stream.

If the packet encoding control information requests a video packet, a switch 976 is set on the 'a' side. In this case, video data of a payload data length specified by the packet encoding control information is read out from the video-stream buffer 903 and supplied to a transport-packet encoder 909.

If the packet encoding control information requests an audio packet, on the other hand, the switch 976 is set on the 'b' side. In this case, video data of a payload data length specified by the packet encoding control information is read out from the audio-stream buffer 906 and supplied to the transport-packet encoder 909.

If the packet encoding control information requests a PCR packet, the transport-packet encoder 909 fetches a PCR from the multiplexing scheduler 908 and outputs the PCR packet. If the packet encoding control information requests no packet encoding, nothing is supplied to the transport-packet encoder 909.

The transport-packet encoder 909 does not output a transport packet if the packet encoding control information requests no packet encoding. Otherwise, the transport-packet encoder 909 generates a transport packet in accordance with the packet encoding control information and outputs the generated transport packet. Thus, the transport-packet encoder 909 outputs transport packets intermittently. An arrival-time-stamp computation means 910 computes an ATS showing a time, at which the first byte of the transport packet arrives at the receiver side, on the basis of a PCR received from the multiplexing scheduler 908.

The PCR received from the multiplexing scheduler 908 shows a time at which the 10th byte of the transport packet prescribed by the MPEG2 specifications arrives at the receiver side. Thus, the value of the ATS shows a time, at which a byte preceding the time of the PCR by 10 bytes arrives at the receiver side.

A block-seed addition circuit 911 adds the ATS to the transport packet output by the transport-packet encoder 909. The transport packet including the additional ATS output by the block-seed addition circuit 911 is supplied to the cryptographic processing means 150 by way of a smoothing buffer 912. The transport packet is subjected to a cryptographic process to be described later in the cryptographic processing means 150 before being recorded onto the recording medium 195 used as storage media.

Before being subjected to the encryption process prior to the operation to record the transport packets each including an ATS onto the recording medium 195, the transport packets are densely packed to close gaps between the packets as shown in FIG. 7(*c*). The encrypted transport packets are then recorded onto the recording medium 195 with the transport packets densely packed to close gaps between the packets. Even if the transport packets are recorded on the recording medium 195 in a state of being densely packed to close gaps between the packets, input times of the packets to the receiver side can be put under controlled by referring to the ATS.

By the way, the size of an ATS is not necessarily fixed at 32 bits. It can also be in the range 24 to 31 bits. The larger the number of bits included in an ATS, the longer the cycle of an ATS time counter. If the ATS time counter has a resolution of 27 MHz, for example, the cycle of an ATS having a size of 24 bits is about 0.6 seconds. This time interval is sufficiently long for an ordinary transport time. This is because a gap between two consecutive packets in a transport stream is set at a value not exceeding 0.1 seconds in accordance with the MPEG2 specifications. In order to provide an adequate margin, nevertheless, the size of an ATS can be set at a value equal to or greater than 24 bits.

With the ATS set at a variety of lengths as described above, it is possible to provide several configurations of the block seed to be added to block data. Typical configurations of the block seed are shown in FIG. 10. In the first configuration example shown in FIG. 10, the size of the ATS is set at 32 bits. In the second configuration example shown in FIG. 10, the size of the ATS is set at 30 bits. The remaining 2 bits are allocated to the copy control information (CCI). As described above, the copy control information is information showing a state of copy control for data to which the copy control information is added. Well known examples of the copy control information include a SCMS (Serial Copy Management System) and a CGMS (Copy Generation Management System). These kinds of copy control information indicate Copy Free, One Generation Copy Allowed or Copy Prohibited for data to which the copy control information is added. As described above, Copy Free indicates that the data including this additional information can be copied without any restriction. One Generation Copy Allowed indicates that the data including this additional information can be copied to produce only one generation. Copy Prohibited indicates that the data including this additional information cannot be copied at all.

In the third configuration example shown in FIG. 10, the size of the ATS is set at 24 bits. The remaining 2 bits are allocated to the copy control information (CCI) and the other remaining 6 bits are allocated to various kinds of other information. An example of the other information is information indicating an on or off state of a macrovision, which is a copy control mechanism of analog video data in the case of data output as an analog signal.

4: Processing of Digital Watermark (WM)

The following description explains a copy control process using a digital watermark. A digital watermark (WM) is a pattern embedded in contents. It is possible to determine whether or not the pattern of a digital watermark matches the pattern of another digital watermark on the basis of a correlation value between the patterns, and to obtain bit information from a result of watermark detection. The obtained bit information indicates that the copy status of the contents containing the detected digital watermark is Copy Free, One Generation Copy Allowed, Copy Prohibited or other status. The information indicating the copy status of contents by using a digital watermark can be embedded in an analog area and subjected to a D/A and/or A/D conversion process in the course of processing to propagate the copy status.

A process to set copy control information using a digital watermark is explained as follows. First of all, when contents are created, a primary mark is embedded in the contents as initial copy control information of the contents. Typically, the primary mark has a size of 2 bits, which can have a value of 00 indicating the copy control information of Copy Free, 10 indicating the copy control information of One Generation Copy Allowed or 11 indicating the copy control information of Copy Prohibited. Assume that contents have an embedded primary mark having a value of 10 indicating the copy control information of One Generation Copy Allowed. Then, when a recording apparatus makes a copy of the contents including the embedded primary mark and records the copy onto a recording medium, a 1-bit value of 1 is added to the embedded primary mark having a value of 10 to result in a value of 101. A digital watermark representing the value of 101 is re-embedded into the contents before the contents are recorded onto the recording medium. The added 1-bit value is referred to as a copy mark. In the case of contents having a digital watermark of 00 indicating the copy control information of Copy Free, it is not necessary to add a copy mark. A recording apparatus is not capable of making a copy of contents having a digital watermark of 11 indicating the copy control information of Copy Prohibited.

In addition, a digital watermark can be used not only for restricting copy operations as described above, but also for restricting reproduction processes. For example, if contents including an embedded digital watermark having a value of 11 indicating the copy control information of Copy Prohibited from the beginning have been recorded on a user-writable disc, it is possible to impose a restriction for prohibiting an operation to reproduce the contents from the disc. In an operation to record contents including an embedded digital watermark having an initial value of 10 indicating the copy control information of One Generation Copy Allowed onto a user-writable disc, a 1-bit copy mark of 1 will be normally added to the embedded digital watermark having the value of 10 to result in a value of 101 which will be then re-embedded into the contents as a new digital watermark showing information on the copy status of the contents as described above. In other words, if contents including an embedded digital watermark having a value of 10 indicating the copy control information of One Generation Copy Allowed from the beginning have been recorded on a user-writable disc, it is possible to impose a restriction for prohibiting an operation to reproduce the contents from the disc. It is to be noted, however, that this policy may vary in dependence on the service system.

As a method of handling copy control information represented by digital watermarks, however, there has been proposed a variety of techniques depending on the type of the contents. There is even a large number of techniques for moving-picture contents only. At the present time, there is no de-facto standardization covering a wide range of contents types. If we take a lesson from the current trend in the industry, we will conceive that, initially, a de-facto standard is established only for the primary mark. Later on, the copy mark is also included. That is to say, over a period starting from the present time to the future, products are predicted to be sent to the market accompanying a process to determine a digital-watermark system.

In other words, as described above, with respect to handling of digital watermarks (WMs), recording/reproduction apparatus are classified typically into the following three generations.

First generation: apparatus not capable of detecting and embedding a digital watermark.

Second generation: apparatus capable of only detecting a digital watermark. To be more specific, an apparatus of the second generation is capable of detecting a primary mark but incapable of carrying out an addition process.

In an apparatus of the second generation, concrete control operations described below are executed in an operation to record data. A digital watermark is detected from contents to be recorded. Then, an operation is carried out in dependence on the value of the detected digital watermark as follows:

For a digital watermark of 11 indicating the copy control information of Copy Prohibited, the contents are not recorded.

For a digital watermark of 10 indicating the copy control information of One Generation Copy Allowed, the contents are recorded and the digital watermark is not updated but kept as it is.

For a digital watermark of 00 indicating the copy control information of Copy Free, the contents are recorded and the digital watermark is not updated but kept as it is.

In an apparatus of the second generation, concrete control operations described below are executed in an operation to reproduce data from a user-writable disc. A digital watermark is detected from contents to be reproduced from the user-writable disc. Then, an operation is carried out in dependence on the value of the detected digital watermark as follows:

For a digital watermark of 11 indicating the copy control information of Copy Prohibited, the contents are not reproduced from the user-writable disc.

For a digital watermark of 10 indicating the copy control information of One Generation Copy Allowed, the contents are reproduced from the user-writable disc.

For a digital watermark of 00 indicating the copy control information of Copy Free, the contents are reproduced from the user-writable disc.

Third generation: apparatus capable of detecting and embedding a digital watermark. To be more specific, an apparatus of the third generation is capable of detecting a primary mark and carrying out a process to add a copy mark.

In an apparatus of the third generation, concrete control operations described below are executed in an operation to record data. A digital watermark is detected from contents to be recorded. Then, an operation is carried out in dependence on the value of the detected digital watermark as follows:

For a digital watermark of 11 indicating the copy control information of Copy Prohibited, the contents are not recorded.

For a digital watermark of 10 indicating the copy control information of One Generation Copy Allowed, the contents are recorded and the digital watermark is updated to 101 indicating that no more copies can be produced. The updated digital watermark is re-embedded into the contents.

For a digital watermark of 00 indicating the copy control information of Copy Free, the contents are recorded and the digital watermark is not updated but kept as it is.

For a digital watermark of 101 indicating that no more copies can be produced, the contents are not recorded.

In an apparatus of the third generation, concrete control operations described below are executed in an operation to reproduce data from a user-writable disc. A digital watermark is detected from contents to be reproduced from the user-writable disc. Then, an operation is carried out in dependence on the value of the detected digital watermark as follows:

For a digital watermark of 11 indicating the copy control information of Copy Prohibited, the contents are not reproduced from the user-writable disc.

For a digital watermark of 10 indicating the copy control information of One Generation Copy Allowed, the contents are reproduced from the user-writable disc.

For a digital watermark of 00 indicating the copy control information of Copy Free, the contents are reproduced from the user-writable disc.

For a digital watermark of 101 indicating that no more copies can be produced, the contents are reproduced from the user-writable disc.

The basic rules of the recording and reproduction operations carried out by recording/reproduction apparatus of different generations have been described above. In accordance with the rules of the recording and reproduction operations described above, however, an apparatus of a particular generation may make an attempt to reproduce contents recorded by an apparatus of a generation different from the particular one. In this case, it is quite within the bounds of possibility that an accurate reproduction operation according to copy control information recorded as a digital watermark cannot be carried out. To put it concretely, when an apparatus of the third generation makes an attempt to reproduce contents, which has a primary mark of 10 indicating the copy control information of One Generation Copy Allowed and was recorded by an apparatus of the second generation, the apparatus of the third generation is not capable of reproducing the contents in accordance with the reproduction rules of apparatus of the third generation.

5: Copyright Information

The present invention avoids an incorrect copy control process such as the problem described above. In an operation to store contents onto a recording medium, copyright information is also recorded onto the medium, being associated with the recorded contents. At a reproduction time, the copyright information is referred to and control is executed in accordance with various kinds of data included in the copyright information. Examples of the copyright information are information on an input source, information on the digital-watermark generation of the recording apparatus, information on a recording mode, strictest copy control information or copy control information at a variation point or a packet number corresponding to the variation point. One or more of the information on an input source, the information on the digital-watermark generation of the recording apparatus, the information on a recording mode, the strictest copy control information and the copy control information at a variation point or a packet number corresponding to the variation point are recorded on the recording medium as copyright information. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents. In order to make copyright information difficult to falsify, a MAC (Message Authentication Code) is added as a validity inspection code and recorded onto the recording medium. In a recording/reproduction apparatus functioning as an information-processing apparatus provided by the present invention, in an operation to store contents onto a recording medium, copyright information is generated and also recorded onto the medium, being associated with the recorded contents. At a reproduction time, the content's copyright information recorded on the recording medium by being associated with the contents is subjected to a MAC authentication process. If a result of the MAC authentication process confirms that the copyright information has not been falsified, processes to control reproduction and output operations are carried out in accordance with the copyright information.

(1): Digital-Watermark Generation Information

Various kinds of information included in the copyright information are explained. Generation information of the digital watermark is information on the first, second and third generations described above. The generation information of the digital watermark is recorded in a ROM employed in the recording apparatus recording the contents including the digital watermark. In a process to generate copyright information, the generation information of the digital watermark is read out from the ROM and included in the copyright information.

In an operation to reproduce the contents, the generation information of the digital watermark is acquired from the copyright information and, by verifying the generation of the recording apparatus, it is possible to prevent incorrect copy control from being executed at a data output time. To put it concretely, assume for example that an apparatus of the third generation makes an attempt to reproduce contents, which has a primary mark of 10 indicating the copy control information of One Generation Copy Allowed and was recorded by an apparatus of the second generation. In this case, the apparatus of the third generation reads out copyright information for the contents to be reproduced from the recording medium and, on the basis of a digital watermark's generation information included in the copyright information read out from the recording medium, confirms that the contents to be reproduced is contents recorded by an apparatus of the second generation. The apparatus of the third generation also confirms that, since an apparatus of the second generation is not capable of recording a digital watermark, the primary mark of 10 remains as it is as a digital watermark. Thus, in this reproduction operation carried out by the apparatus of the third generation, the digital-watermark control information of 10 included in the contents are determined to be equivalent to a control code of 101 for the apparatus of the third generation. It is therefore possible to reproduce the contents in accordance with the reproduction rules for apparatus of the third generation. By including the information on the digital-watermark generation of the contents-recording apparatus as copyright information at contents-recording time as described above, a correct process according to the generation of the contents-recording apparatus can be carried out in an operation to reproduce the contents.

(2) Input-Source Information

Next, input-source information recorded as copyright information is explained. Information on an input source indicates an input source originating contents to be recorded. The information on an input source thus reveals that contents to be recorded are contents originated by an input source conforming to the 5C-DTCP specifications, satellite-distributed contents such as BS or CS contents, ground-wave digital contents, ground-wave analog contents or other contents.

The information on an input source also includes information indicating whether or not the input contents are contents input from an IEEE-1394 interface and provided with copy control information and information indicating whether the input contents are digital or analog contents. These kinds of information can be recognized by the input interface receiving the input contents. In addition, it is desirable to provide input-source information that includes information indicating whether or not the input contents have copy control information conforming to the 5C-DTCP specifications or, to put it concretely, whether or not the input contents have copy control information added to each digital-data TS packet, or information indicating whether or not the input contents have copy control information added as a digital watermark. That is to say, it is desirable to provide input-source information that includes information allowing the copy control information set in the input contents to be recognized. In the case of a digital data input conforming to the 5C-DTCP specifications or in the case of satellite-distributed contents such as BS or CS contents, a configuration for distributing copy control information as information added to the contents is implemented or being studied so that a recording/reproduction apparatus is capable of acquiring details of copy control information from such additional information.

The following description explains a reason why information on an input source is stored as copyright information. Information on an input source is stored as copyright information because, in some cases, the rule for handling contents varies in dependence on an input source supplying the contents. In an operation to reproduce contents, information on a source generating the contents is acquired and used to determine a format, in which the contents are to be reproduced, and used as information on restrictions imposed on the reproduction process. In the case of the contents protection method prescribed by the 5C-DTCP specifications, for example, an apparatus receiving contents protected in accordance with this contents protection method determines a format, in which the contents are to be reproduced.

FIG. 11 is a table showing typical output restrictions imposed on input sources. If the input source is a source, which generates input data to be recorded in conformity with the 5C-DTCP specifications, the restrictions on the reproduction output are described on the first line with the input source marked as 5C. In this case, if the output must be generated as an analog signal, the number of horizontal lines must not exceed 500 and an operation to output the analog signal is permitted if a macrovision signal for preventing an analog copy is added to the analog signal. If the output must be generated as a digital signal, on the other hand, an operation to output the digital signal is permitted only if the contents represented by the digital signal are protected by the contents protection method prescribed by the 5C-DTCP specifications. In addition to the input source conforming to the 5C-DTCP specifications, there are also BS/CS input sources, ground-wave digital/analog input sources and a variety of other input sources, which generate input data to be recorded. The recorded data originated from these input sources is then reproduced and output as an analog or digital signal. The table of FIG. 11 shows only typical restrictions, which may not necessarily agree with actual restrictions.

The prescription of the output restrictions varies in dependence on the protection method. Thus, if an attempt is made to handle data uniformly, the strictest restriction must be adopted. If possible, however, it is desired to provide the user with a higher picture quality and a higher sound quality. Thus, the reproduction apparatus is provided with a capability of knowing the input source of each of contents recorded on a recording medium employed in the reproduction apparatus. Then, by referring to output prescriptions to be followed for the contents originated from the input source, one of the output prescriptions can be selected. By including information on an input source in copyright information to be stored in a recording medium for contents, it is possible to reproduce and output the contents in accordance with restrictions set for a reproduction process. The operations to reproduce and output contents will be described later.

(3): Copy Control Information Provided for Each Title

Next, copy control information provided for each title is explained. Consider an operation to copy contents recorded on a recording medium from a source apparatus to a destination apparatus at a high speed. The contents have been recorded onto the recording medium in an encrypted state. Since processes to decrypt and re-encrypt the contents are required, it is desirable to copy the contents at a high speed in the encrypted state as it is. If the contents have the copy control information of Copy Prohibited, however, the copy operation cannot be carried out. That is to say, only contents or a portion with the copy control information of Copy Free can be subjected to a copy operation. In addition, contents are protected by a mechanism in which a correct decryption process of the contents cannot be carried out if copy control information (CCI) is falsified. Copy control information is provided for each block used as contents recording unit.

If contents are copied without decrypting the contents, however, it is feared that correct copy control based on the copy control information cannot be executed. That is to say, for contents including a block having the copy control information of Copy Prohibited, an unauthorized user is capable of executing the procedural steps of:

1): rewriting the CCI of the block into the copy control information of Copy Free.

2): performing a copy process at a high speed, and

3): rewriting the CCI of the block of the copy source and the CCI of the block of the copy destination into the copy control information of Copy Prohibited.

Thus, a copy of contents including a block having the copy control information of Copy Prohibited can be made. That is to say, it is quite within the bounds of possibility that an illegal copy operation can be carried out.

In order to execute effective copy control in a copy operation without carrying out a decryption process, copy control information provided for each title is also recorded in the recording medium, being linked to the contents. It is to be noted that, as will be described later, in a recording/reproduction apparatus provided by the present invention, contents to be recorded onto a recording medium are associated with a title key used as a cryptographic-processing key. The copy control information provided for each title is strictest copy control information imposing a strictest restriction. This strictest copy control information is selected among pieces of CCI of blocks included in the contents to be recorded onto a recording medium. Assume for example that, as copy control information of contents to be recorded onto a recording medium, the copy control information of One Generation Copy Allowed and the copy control information of Copy Free. In this case, as the copy control information provided for each title, the copy control information of Copy Prohibited is recorded. The copy control information of Copy Prohibited indicates status after the contents including the copy control information of One Generation Copy Allowed are copied. By doing so, at least, for contents with the copy control information of Copy Free, any copy control information included in the contents is known also to have status of Copy Free. Thus, a decision can be made to transmit the contents without decrypting the contents in order to carry out the copy operation at a high speed. As a result, the amount of processing can also be reduced.

Next, a recording mode included in the copyright information is explained. A recording mode is data indicating whether the contents were recorded in a cognizant or non-cognizant mode.

The provider of contents specifies a condition, under which the contents can be copied, in advance. It is thus necessary to correctly notify a partner apparatus of the condition when a network connection is established between the provider and the partner apparatus. In accordance with the 5C-DTCP (Digital Transmission Content Protection) specifications set jointly by five companies, there is a method for solving this notification problem by using copy control information (CCI). The copy control information (CCI) can be prescribed by using one of two types of propagation method to be adopted in dependence on the power of the device.

In accordance with one of the methods, an EMI (Encryption Mode Indicator) is used. An EMI is a mechanism for transmitting copy control information (CCI) by using 2 high-order bits of Sy bits included in a packet header. By using such bits, the receiving apparatus is capable of making an access to the EMI with ease. In addition, since the value of the EMI has an effect on a key for encrypting the contents, the EMI can be transmitted with a high degree of safety.

To put it in detail, the EMI indicates an encryption mode of the packet. That is to say, the EMI specifies a mode for generating an encryption/decryption key. By placing the EMI in the IEEE-1394 packet header, the receiving apparatus is capable of easily knowing a mode, in which the contents have been encrypted, without for example the need to fetch embedded copy control information (embedded CCI) included in an MPEG transport stream. The embedded copy control information will be described later.

FIG. 12 is a diagram showing the format of an IEEE-1394 packet. A data field of the format is used for storing a variety of contents such as music data and moving-picture data. An encryption mode indicator (EMI) used as the copy control information (CCI) is set in 2 high-order bits of Sy bits.

The EMI set as the 2-bit information has a value prescribing one of different ways to handle contents. To put it concretely, a value of 00 indicates that the contents are in the status of Copy Free meaning that the contents can be copied with a high degree of freedom requiring neither authentication nor encryption. A value of 01 indicates that the contents are in the status of Copy One Generation meaning only one generation copy can be made. A value of 10 indicates that the contents are in the status of No More Copies prohibiting an operation to further recopy contents recorded as a result of once copying contents with the status of Copy One Generation. A value of 11 indicates that the contents are in the status of Never Copy meaning that an operation to copy the contents is prohibited from the beginning since the release of the contents.

A non-cognizant mode is a recording method whereby, at a recording time, it is not necessary to update the embedded CCI but necessary only to update the EMI. An example of an operation to update the embedded CCI is an operation to change the copy status from Copy One Generation to No More Copies as described above. The non-cognizant mode is provided so that even a bit-stream recorder carrying out no operation of recognizing the format of data recorded onto a recording medium such as a D-VHS or a hard disc is capable of handling a work correctly.

With a format including a field allocated in advance to transmission of such copy control information (CCI), on the other hand, the CCI can be transmitted as a portion of the contents. An example of such a format is a DV format. Copy control information (CCI) embedded in contents as a portion of the contents are referred to as embedded CCI. Normally, in a process to encrypt and transmit contents, the embedded CCI is also encrypted and transmitted along with the contents. Thus, it is difficult to deliberately change the embedded CCI.

In the case of contents having both the 2-bit copy control information implemented by the EMI described above and the embedded CCI, an apparatus for recording the contents updates both the 2-bit copy control information implemented by the EMI and the embedded CCI. In the case of a recording apparatus having no capability of analyzing embedded CCI, however, the EMI is updated but the embedded CCI is not.

A cognizant mode is a recording method whereby, at contents-recording time, a recording apparatus updates embedded CCI received as a portion of contents and records the updated embedded CCI along with the contents. Unlike the cognizant mode, in accordance with the non-cognizant mode, it is not necessary to update the embedded CCI so that the processing load can be reduced and the non-cognizant mode is easy to implement. However, the 5C-DTCP specifications sets a rule requiring that an apparatus for carrying out an MPEG decoding process on contents and displaying a video signal of the contents from an analog terminal shall be an apparatus operating in the cognizant mode. That is to say, it is necessary to provide an apparatus having the decoding/displaying function with a function for executing the cognizant mode.

In order to execute the cognizant mode, however, it is necessary to completely know the position and the meaning of the embedded CCI included in the contents as a portion of the contents. Assume for example that, after an apparatus is put in the market, a new data format is introduced or an existing data format is updated. In this case, it is quite within the bounds of possibility that an old apparatus will have many difficulties in executing the cognizant mode.

Consequently, it is considerable that an apparatus to record contents executes both the cognizant mode and the non-cognizant mode. For example, the apparatus executes the cognizant mode when the contents have a particular data format or when the apparatus implements a particular function, or the apparatus executes, on the other hand, the non-cognizant mode when the contents have another data format.

In addition, there is also an apparatus that does not carry out a non-cognizant mode for all contents. On the other hand, there is also an apparatus that carries out only cognizant mode. An apparatus carrying out only cognizant mode is an apparatus that processes only contents having a format including comprehensible embedded CCI.

In a situation wherein there are two types of copy control information, namely, the EMI and the embedded CCI and, in addition, apparatus carrying out recording operations in the cognizant mode coexist with apparatus carrying out recording operations in the non-cognizant mode as described above, it is desirable to distinguish contents recorded in the cognizant mode and contents recorded in the non-cognizant mode from each other.

To put it in detail, in the case of contents recorded in the cognizant mode, both the copy control information of the EMI and the copy control information of the embedded CCI are updated. In the case of contents recorded in the non-cognizant mode, on the other hand, only the copy control information of the EMI is updated and the copy control information of the embedded CCI is not. As a result, on the recording medium, the copy control information of the EMI does not match the copy control information of the embedded CCI. If the copy control information of the EMI not matching the copy control information of the embedded CCI coexists with the copy control information of the embedded CCI, there will be confusion. Thus, in order to avoid a mismatch between the two kinds of copy control information, namely, the copy control information of the EMI and the copy control information of the embedded CCI, it is necessary to provide a configuration in which recording and reproduction operations are carried out in the cognizant mode for contents recorded in the cognizant mode while recording and reproduction operations are carried out in the non-cognizant mode for contents recorded in the non-cognizant mode.

For the reason described above, there has been a proposal to treat the cognizant mode and the non-cognizant mode as modes completely separated from each other. In this case, however, in order to selectively implement both the modes in an apparatus, it is necessary to provide the apparatus with a processing configuration for executing both the modes. An apparatus with a processing configuration for executing both the modes raises a problem of a high cost though.

In order to solve the above problem, the recording/reproduction apparatus implemented by the present invention is provided with a configuration for generating and using different contents-cryptographic-processing keys for the two mode, namely, contents-cryptographic-processing key for the cognizant mode and contents-cryptographic-processing key for the non-cognizant mode. The different contents-cryptographic-processing keys are thus a means for clearly distinguishing the two mode or the two types of apparatus from each other so that it is possible to avoid a state of confusion in which the two mode coexists in an uncontrolled manner. It is therefore possible to implement contents-processing configuration based on a uniform mode according to either one of the apparatus types or either one of the modes without increasing the implementation size of the apparatus and increasing the processing load.

To put it concretely, there are provided a configuration in which a cognizant key is presented only to a cognizant-mode apparatus to be stored in the cognizant-mode apparatus and a configuration in which a non-cognizant key is presented only to a non-cognizant-mode apparatus to be stored in the non-cognizant-mode apparatus. A cognizant key is a key for generating an encryption/decryption-processing key to be used as secret information for recording and reproduction operations carried out in the cognizant mode. A cognizant-mode apparatus is an apparatus that has only a function to carry out recording and reproduction operations in the cognizant mode. On the other hand, a non-cognizant key is a key for generating an encryption/decryption-processing key to be used as secret information for recording and reproduction operations carried out in the non-cognizant mode. A non-cognizant-mode apparatus is an apparatus that has only a function to carry out recording and reproduction operations in the non-cognizant mode.

By including a recording mode in the copyright information, it is possible to prevent an apparatus from carrying out an incorrect recording or reproduction operation mistakenly due to a bug, falsification of data, incorrect redesign of a recording/reproduction program or the like. For example, it possible to prevent an apparatus having only a function to carry out recording and reproduction operations in the non-cognizant mode from carrying out an incorrect operation mistakenly to reproduce contents recorded in the cognizant mode.

(4): Copy Control Information Variation Points

The following description explains copy control information at a variation point or a packet number corresponding to the variation point, which are used as information showing a variation of copy control information in copyright information included in contents. In general, contents include various kinds of data mixed with each other. For example, contents include mixed portions with copy status of 'Copy Prohibited', 'Copy Free' and 'One Generation Copy Allowed'. Variation points of detected copy control information of such different types are recorded in the copyright information along with the various kinds of copy control information.

A variation point is concretely represented by a packet number, which is an identifier of each of TS packets composing a transport stream of the contents. FIG. 13 is a table showing typical variation points of copy control information included in copyright information. In the example shown in FIG. 13, contents include mixed portions with copy status varying as follows. For a TS-packet number of 00, the copy control information is 00 meaning the control status of Copy Free. Thereafter, as a TS-packet number of 30000 is extracted, the copy control information changes to 10 meaning the control status of No More Copies. Then, at a TS-packet number of 100000, the copy control information is changed back to 00 meaning the control status of Copy Free. Finally, as a TS-packet number of 1234567 is extracted, the copy control information again changes to 10 meaning the control status of No More Copies.

By including variation points of copy control information in copyright information as described above, it is possible to efficiently carry out for example a process to extract only portions with copy status of 'Copy Free' and copy the portions by recording them onto a recording medium. In particular, the recorded variation points are effective for a high-speed copy process.

As described above, copy control information includes information on an input source, information on the digital-watermark generation of the recording apparatus, information on a recording mode, strictest copy control information or copy control information at a variation point or a packet number corresponding to the variation point. One or more of the information on an input source, the information on the digital-watermark generation of the recording apparatus, the information on a recording mode, the strictest copy control information and the copy control information at a variation point or a packet number corresponding to the variation point are recorded on the recording medium as copyright information. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents. One or more of the information on an input source, the information on the digital-watermark generation of the recording apparatus, the information on a recording mode, the strictest copy control information and the copy control information at a variation point or a packet number corresponding to the variation point are set as copyright information to generate a MAC (Message Authentication Code) to be added to the contents and recorded onto the recording medium. Processes to store and utilize these pieces of copyright information will be again explained in detail in a later description of processing to record and reproduce contents.

6: Tree Structure in Distribution of Keys

The recording/reproduction apparatus provided by the present invention has a configuration capable of carrying out processes to encrypt contents and store the encrypted contents onto a recording medium. A tree structure is used in a key distribution configuration for distributing keys to be applied directly or indirectly to the cryptographic process for contents with a high degree of safety to only recording/reproduction apparatus each having a proper license. This key distribution configuration is described as follows.

Figure 14:
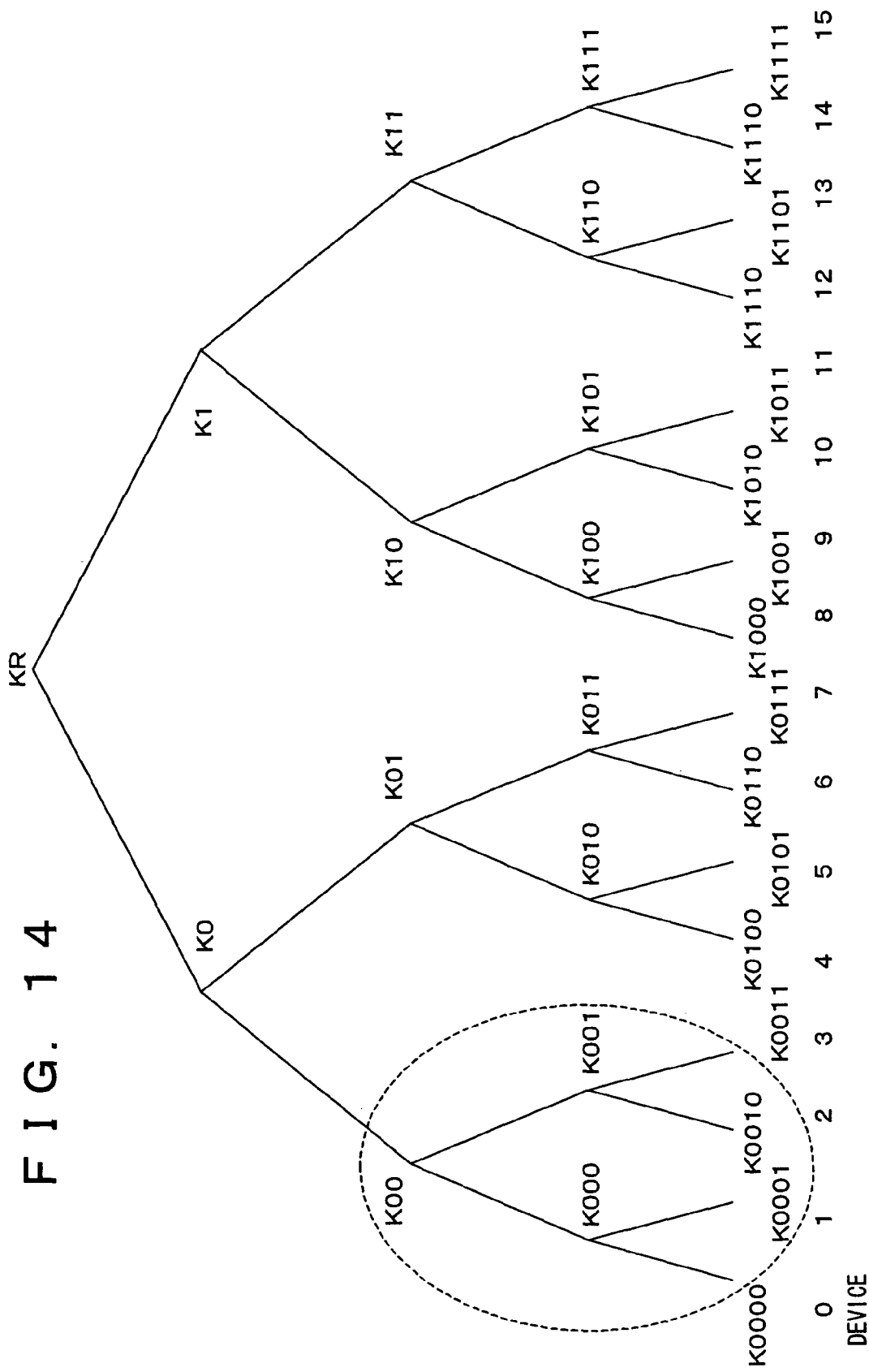
FIG. 14 is a diagram showing a tree structure of keys used in a process carried out by the recording/reproduction apparatus of the present invention to encrypt keys such as a master key and a media key.

To be more specific, the following description explains a configuration for distributing a master key to recording/reproduction apparatus. The master key is required in processes carried out by the recording/reproduction apparatus shown in FIG. 1 or 2 to record data onto a recording medium or to reproduce data from the recording medium. FIG. 14 is an explanatory diagram showing a configuration for distributing a key to recording/reproduction apparatus in a recording system adopting a distribution technique provided by the present invention. Reference numerals 0 to 15 at the bottom layer of the hierarchical tree structure shown in FIG. 14 each denote a recording/reproduction apparatus. Thus, each leaf of the hierarchical tree structure shown in FIG. 14 corresponds to such a recording/reproduction apparatus.

Each of the devices 0 to 15 is given a set of keys at a manufacturing time or at a shipping time in advance. Stored in a memory employed in each of the devices, the set of keys given to a device comprises a leaf key assigned to a leaf representing the device in the hierarchical tree structure shown in FIG. 14 and node keys each assigned to a node between the leaf and the root in the hierarchical tree structure. K0000 to K1111 at the bottom layer of the hierarchical tree structure shown in FIG. 14 are leaf keys given to the devices 0 to 15 respectively. KR is the node key assigned to the root on the top of the hierarchical tree structure. K000 to K111 are node keys assigned to nodes on a second hierarchical layer from the bottom layer.

In the hierarchical tree structure shown in FIG. 14, keys given to the device 0 are a leaf key K0000, node keys K000, K00, K0 and KR. By the same token, keys given to the device 5 are a leaf key K0101, node keys K010, K01, K0 and KR. In the same way, keys given to the device 15 are a leaf key K1111, node keys K111, K11, K1 and KR. It is to be noted that, while only 16 devices 0 to 15 are shown in the tree structure shown in FIG. 14 and the tree structure is designed as a balanced right-left symmetrical structure having four hierarchical layers, the tree structure may include more devices and has a configuration with a layer count varying from portion to portion.

In addition, a variety of recording/reproduction apparatus included in the tree structure shown in FIG. 14 has a variety of recording media. The recording/reproduction apparatus have recording media such as a DVD, a CD, an MD, an HD and a memory stick (trademark). In addition, it is assumed that a variety of application services are rendered by the recording/reproduction apparatus. The tree structure shown in FIG. 14 is used for distributing keys to a variety of devices carrying out a variety of applications.

In a system wherein these devices and applications exist, let a group be set to include the devices 0, 1, 2 and 3 using the same recording medium. In the tree structure shown in FIG. 14, the devices group is enclosed by a dashed line. Assume for example that, for all the devices, a contents provider encrypts contents to be transmitted to the devices pertaining to the group enclosed by the dashed line to be used as contents common to the devices. In this case, the contents provider also transmits a master key to the devices to be used by the devices as a key common to the devices. Other processing in the system includes transmission of encrypted payment data of contents fees from the devices to the contents provider, a financial settlement institution or another enterprise. The enterprise such as the contents provider or the financial settlement institution carries out processing to transmit collectively data to the devices enclosed by the dashed line in the tree structure shown in FIG. 14, namely, the devices 0, 1, 2 and 3. The enterprise exchanges data with the devices, which form the aforementioned group. A plurality of such groups exists in the tree structure shown in FIG. 14.

It is to be noted that that node keys and leaf keys can also be managed by a single key management center in an integrated manner. As an alternative, the keys can also be managed by the contents provider, a financial settlement institution or another enterprise, which exchanges various kinds of data with the groups cited above, with each of the group used as a management unit. A node key and/or a leaf key are renewed when one of them has been leaked. Processing to renew keys is carried out by a key management center, a contents provider, a financial settlement institution or another enterprise.

As is obvious from FIG. 14, in this tree structure, the four devices, namely, the devices 0, 1, 2 and 3, which are included in the group, have common keys: node keys K00, K0 and KR. By assigning these node keys to the devices 0, 1, 2 and 3 in the group as keys common to these devices, for example, a common master key can be provided to only these devices. By setting the shared node key K00 itself as a master key, for example, a master key common to the devices 0, 1, 2 and 3 can be set for only the devices without transmitting a new key. As an alternative, a new master key Kmaster is encrypted by using the node key K00 to produce an encrypted value Enc (K00, Kmaster), which is then distributed to the devices 0, 1, 2 and 3 by way of a network, or by using a recording medium for recording the encrypted new master key Enc(K00, Kmaster) and supplying the medium to the devices. In this way, only the devices 0, 1, 2 and 3 are capable of decrypting the encrypted new master key Enc(K00, Kmaster) by using the node key K00 shared thereby as a common key to produce the master key Kmaster. It is to be noted that notation Enc(Ka, Kb) is encrypted Kb obtained as a result of encrypting Kb by using Ka.

Assume that it is discovered at a time t that keys K0011, K001, K00, K0 and KR, which are owned by the device 3, have been analyzed by a hacker and hence exposed to the hacker. In this case, it is necessary to detach the device 3 from the system or, specifically, the group consisting of the devices 0, 1, 2 and 3, in order to protect data exchanged with the system thereafter.

In addition, it is also necessary to renew the node keys K001, K00, K0 and KR to keys K(t)001, K(t)00, K(t)0 and K(t)R respectively and to transmit the renewed keys K(t)001, K(t)00, K(t)0 and K(t)R to the devices 0, 1 and 2. It is to be noted that notation K(t)aaa denotes a key Kaaa's renewed key of a 't' generation.

Next, processing to distribute renewed keys is explained. Renewed keys are organized and transmitted by using a table like one shown in FIG. 15(A). The table is transmitted to a device by way of a network, or by storing the table in a recording medium and providing the medium to the device. The table contains a block data called an EKB (Enabling Key Block). If the device 3 is detached from the system as described above, for example, the EKB is supplied to the devices 0, 1 and 2.

The EKB (Enabling Key Block) shown in FIG. 15(A) comprises block data including the configuration of data which can be renewed by only devices requiring new node keys. The typical EKBs shown in FIGS. 15(A) and 15(B) are each blocked data created for the purpose of distributing renewed node keys of generation t to the devices 0, 1 and 2 of the tree structure shown in FIG. 14. As is obvious from the tree structure shown in FIG. 14, the devices 0 and 1 require the new node keys K(t)00, K(t)0 and K(t)R whereas the device 2 requires the new node key K(t)001 in addition to the new node keys K(t)00, K(t)0 and K(t)R.

As shown in FIG. 15(A), the EKB includes a plurality of encrypted keys. An encrypted key at the bottom of the EKB is Enc(K0010, K(t)001), which is a result of encrypting a renewed node key K(t)001 by using the leaf key K0010 owned by the device 2. Thus, the device 2 is capable of decrypting the encrypted key Enc(K0010, K(t)001) by using the leaf key owned by the device 2 itself to get the renewed node key K(t)001. In addition, an encrypted key Enc(K(t)001, K(t)00) on the second line from the bottom of the EKB shown in FIG. 15(A) can be decrypted by using the renewed node key K(t)001 to get a renewed node key K(t)00. Then, an encrypted key Enc(K(t)00, K(t)0) on the second line from the top of the EKB shown in FIG. 15(A) can be decrypted by using the renewed node key K(t)00 to get a renewed node key K(t)0. Finally, an encrypted key Enc(K(t)0, K(t)R) on the top line of the EKB shown in FIG. 15(A) can be decrypted by using the renewed node key K(t)0 to get a renewed key K(t)R.

As for the devices 0 and 1, the node key K000 is not renewed. Thus, only the renewed keys K(t)00, K(t)0 and K(t)R are needed. Therefore, in the case of the devices 0 and 1, an encrypted key Enc(K000, K(t)00) on the third line from the top of the EKB shown in FIG. 15(A) can be decrypted to get a key K(t)00. Then, an encrypted key Enc(K(t)00, K(t)0) on the second line from the top of the EKB shown in FIG. 15(A) can be decrypted by using the renewed node key K(t)00 to get a renewed node key K(t)0. Finally, an encrypted key Enc(K(t)0, K(t)R) on the top line of the EKB shown in FIG. 15(A) can be decrypted by using the renewed node key K(t)0 to get a key K(t)R.

As described above, the devices 0, 1 and 2 are capable of obtaining the renewed key K(t)R. It is to be noted that indexes included in the EKB shown in FIG. 15(A) are each an absolute address of a leaf or a node key used as a decryption key for decrypting an encrypted key on the same line as the index.

As another example, assume that the renewed node keys K0 and KR on the high hierarchical layer of the tree structure shown in FIG. 14 are not required, and only the node key K00 needs to be renewed. In this case, the EKB shown in FIG. 15(B) can be used for distributing a renewed node key K(t)00 to the devices 0, 1 and 2.

To be more specific, the EKB shown in FIG. 15(B) can be used typically for distributing a new master key common to devices pertaining to a specific group. To put it concretely, the devices 0, 1, 2 and 3 pertaining to the group enclosed by the dashed line in FIG. 14 share a recording medium and need a new common master key K(t)master. In this case, encrypted data Enc(K(t), K(t)master) and the EKB shown in FIG. 15(B) are transmitted to the devices 0, 1, 2 and 3. The encrypted data Enc(K(t)00, K(t)master) is a result of encrypting the new common master key K(t)master by using a renewed node key K(t)00, which is a result of renewing the node key K00 common to the devices 0, 1, 2 and 3.

By distributing only the encrypted data Enc(K(t)00, K(t)master) and the EKB, no data can be decrypted by other devices such as the device 4 pertaining to other groups.

Figure 16:
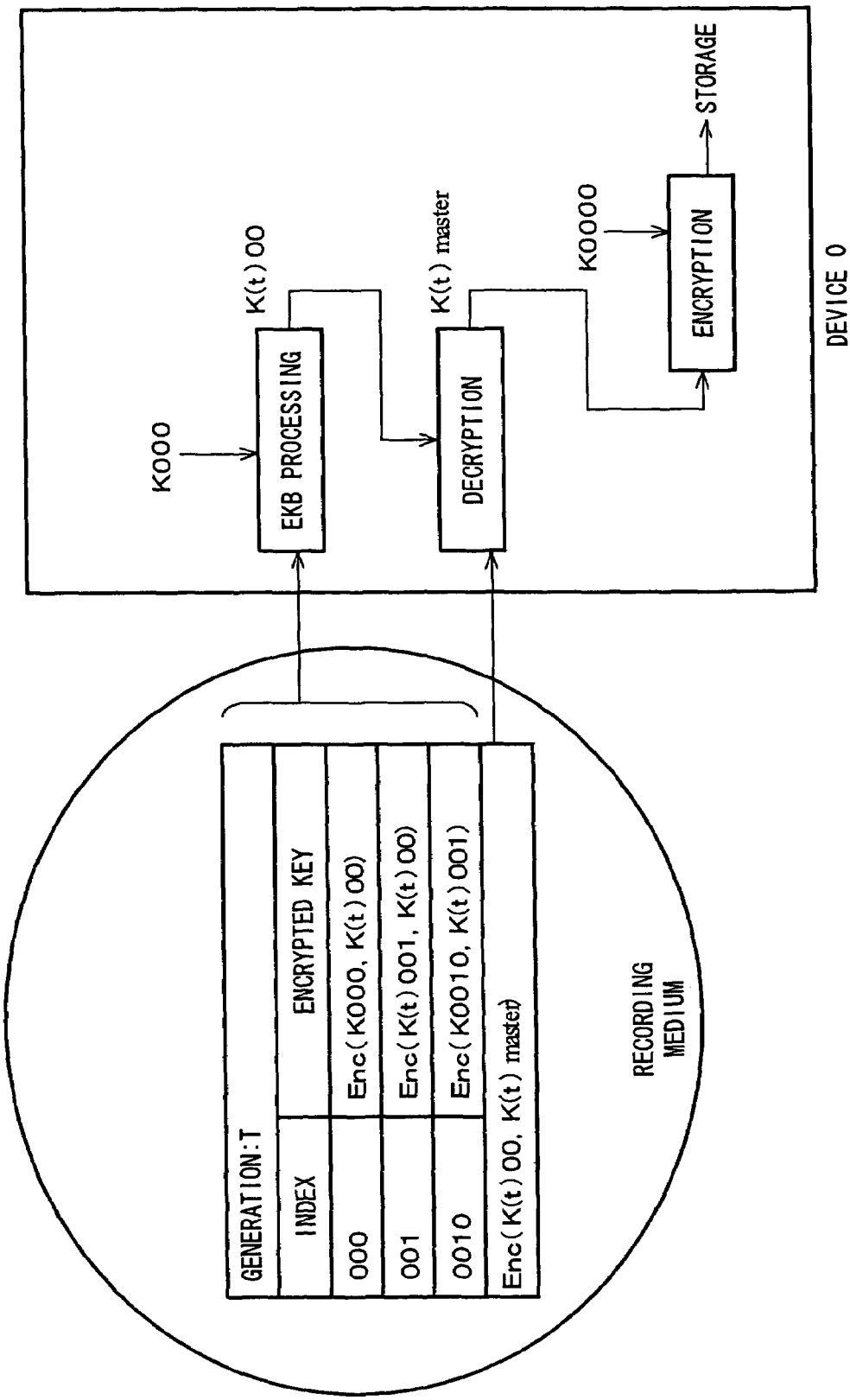
FIG. 16 is a diagram showing an example of a distributed enabling key block (EKB) used for distribution of a master key to the recording/reproduction apparatus provided by the present invention and showing a process carried out by the recording/reproduction apparatus to decrypt the master key.

The devices 0, 1 and 2 process the EKB to get the renewed node key K(t)00 which is used for decrypting the encrypted data Enc(K(t)00, K(t)master) to obtain the new common master key K(t)master of the t generation. Distribution of Master Key by Using EKB FIG. 16 is a diagram showing a process carried out by the device 0, which has received a recording medium containing the encrypted data Enc(K(t)00, K(t)master) and the EKB shown in FIG. 15(B), in order to obtain the new common master key K(t)master of the t generation. As described above, the encrypted data Enc(K(t)00, K(t)master) is a result of encrypting the new common master key K(t)master by using a renewed node key K(t)00.

As shown in FIG. 16, the device 0 carries out an EKB process by using the t-generation EKB recorded in the received recording medium and the node key K000 stored in the device 0 itself in advance to produce the node key K(t)00. Then, the device 0 decrypts the encrypted data Enc(K(t)00, K(t)master) by using the node key K(t)00 to result in the new master key K(t)master. Finally, the device 0 encrypts the new master key K(t)master by using the leaf key K0000 owned only by the device 0 and stores the encrypted master key for later use. It is to be noted that, if the new master key K(t)master can be stored in the device 0 with a high degree of security, it is not necessary to encrypt the new master key K(t)master by using the leaf key K0000.

Figure 17:
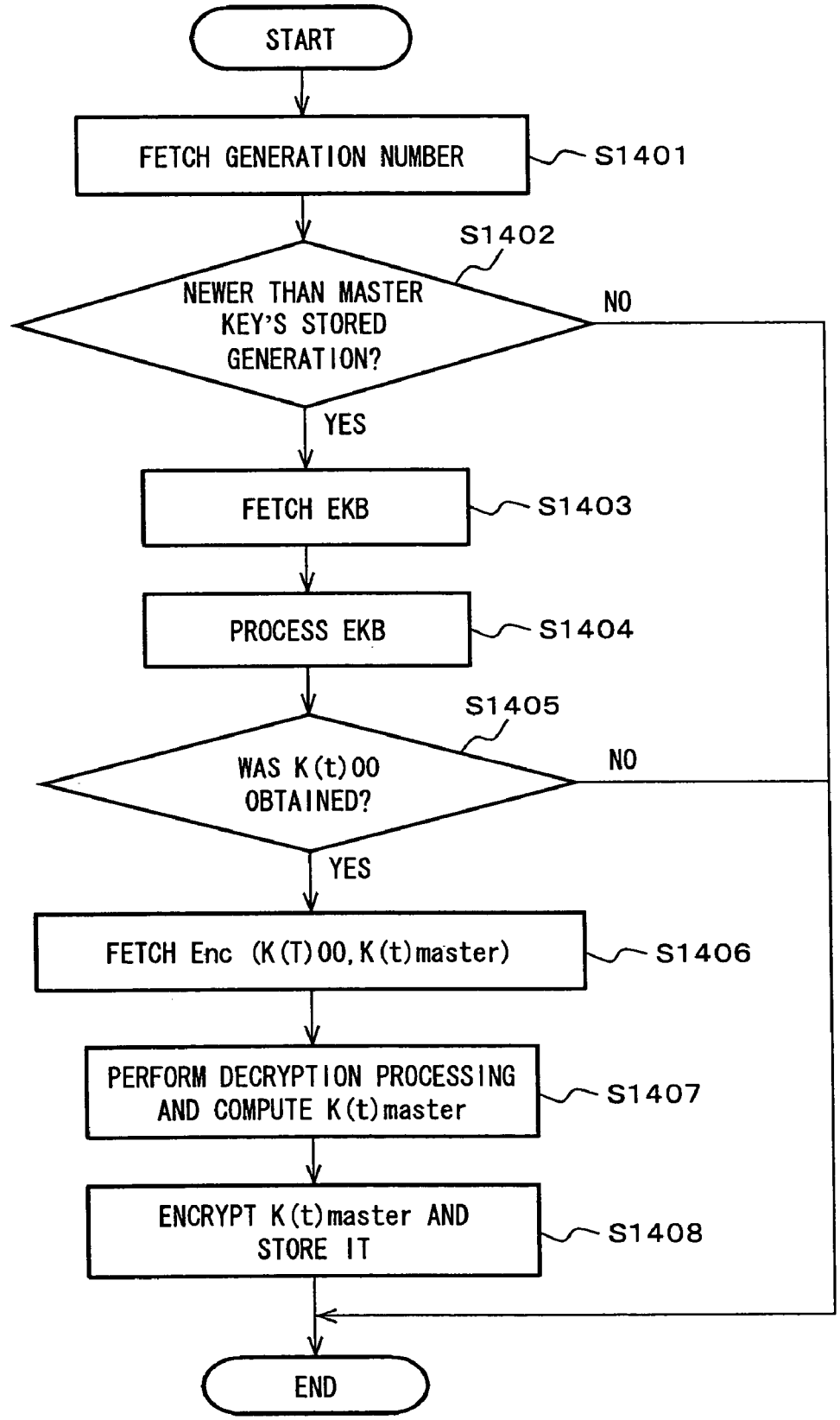
FIG. 17 shows a flowchart representing a process carried out by the recording/reproduction apparatus of the present invention to decrypt a master key by using an enabling key block (EKB)

The process carried out by the recording/reproduction apparatus (device) in order to obtain the new master key K(t)master as described above is explained by referring to a flowchart shown in FIG. 17. It is to be noted that, at the shipping time, a master key K(c)master most recent at the point of time is given to the recording/reproduction apparatus and stored in a memory owned by the recording/reproduction apparatus itself with a high degree of security. To put it concretely, the master key K(c)master is stored in the memory in a state of being encrypted by using the leaf key K0000 owned only by the recording/reproduction apparatus.

When a recording medium containing an encrypted new master key K(n)master and an EKB is mounted on a recording/reproduction apparatus, the flowchart shown in FIG. 17 begins with a step S1401 at which the recording/reproduction apparatus reads out the generation number n of the new master key K(n)master stored in the recording medium from the recording medium. The generation number n is referred to as pre-recording generation information (or generation #n). The generation number n of the new master key K(n)master has been stored in the recording medium in advance. The recording/reproduction apparatus also reads out an encrypted master key C, which is held by the recording/reproduction apparatus itself. Then, at the next step S1402, the generation number c of the encrypted master key C is compared with the pre-recording generation information (or generation #n).

If the result of comparison obtained at the step S1402 indicates that the pre-recording generation information (or generation #n) of the new master key K(n)master stored in the recording medium is not later or not more recent than the generation number c of the encrypted master key C stored in the recording/reproduction apparatus's own memory, that is, if the generation number c of the encrypted master key C stored in the recording/reproduction apparatus's own memory is the same as or later or more recent than the pre-recording generation information (or generation #n) of the new master key K(n)master stored in the recording medium, the processing to update the master key is ended by skipping processes of steps S1403 to S1408. That is to say, since it is not necessary to renew the master key K(c)master (or the encrypted master key C), the execution of the processing is terminated.

If the result of comparison obtained at the step S1402 indicates that the pre-recording generation information (or generation #n) of the new master key K(n)master stored in the recording medium is later or more recent than the generation number c of the encrypted master key C stored in the recording/reproduction apparatus's own memory, that is, if the generation number c of the encrypted master key C stored in the recording/reproduction apparatus's own memory is earlier or less recent than the pre-recording generation information (or generation #n) of the new master key K(n)master stored in the recording medium, on the other hand, the flow of the processing goes on to the step S1403 at which the recording/reproduction apparatus reads out the EKB (Enabling Key Block) from the recording medium.

Then, at the next step S1404, the recording/reproduction apparatus uses the EKB read out at the step S1403, a leaf key (K0000 of the device 0 in FIG. 14) and node keys (K000 and so on, of the device 0 in FIG. 14) to produce a key K(t)00, which is a renewed key of the node key K00. The leaf key and node keys are stored in the memory of the apparatus. The renewed key K(t)00 is a key of generation t shown in FIG. 16 of a key of pre-recording generation information (or generation #n) cited above.

Then, the flow of the processing goes on to a step S1405 to form a judgment as to whether or not the renewed key K(t)00 was obtained at the step S1404. If the renewed key K(t)00 was not obtained, the execution of the processing to update the master key is ended by skipping processes of steps 1406 to S1408. This is because the failure to obtain the renewed key K(t)00 means that the recording/reproduction apparatus has been revoked from the group involved in the distribution of the new master key K(t)master in the tree structure at that point of time.

If the renewed key K(t)00 was obtained at the step S1404, on the other hand, the flow of the processing goes on to a step S1406 to read out an encrypted new master key K(t)master Enc(K(t)00, K(t)master) obtained as a result of encrypting the new master key K(t)master of generation t by using the renewed key K(t)00 from the recording medium. Then, at the next step S1407, the encrypted new master key K(t)master Enc(K(t)00, K(t)master) is decrypted by using the renewed key K(t)00 to produce the new master key K(t)master.

Subsequently, at the next step S1408, the new master key K(t)master is encrypted by using a leaf key K0000 (owned by the device 0 as shown in FIG. 14) and stored in a memory employed in the recording/reproduction apparatus. Then, the execution of the processing to update the master key is ended.

By the way, the master key is used by upgrading the generation number thereof in an increasing order starting with a generation number of 0. It is desirable, however, to provide each recording/reproduction apparatus in the system with a configuration that allows a master key of a less recent generation to be computed from a master key of a more recent generation. In such a configuration, a master key of a specific generation can be computed from a master key of a generation immediately succeeding the specific generation by applying a unidirectional function f as follows:

Master key of specific generation=f (Master key of immediately succeeding generation)

In general, a master key of a less recent generation can be computed from a master key of a more recent generation by applying the unidirectional function f as many times as the difference in generation number between the master key of the less recent generation and the master key of the more recent generation.

To put it concretely, assume for example that the generation number of a master key MK of a more recent generation is (i+1) and the generation number of a master key MK of a less recent generation is (i−1) to give a difference of 2 in generation number between the master key of the less recent generation and the master key of the more recent generation. In this case, the master key of the less recent generation (i−1) is found from the master key of the more recent generation (i+1) by applying the unidirectional function f to the master key of the more recent generation (i+1) 2 times as follows:

$K(i-1)\text{master}=f(f(K(i+1)\text{master}))$ where notation K(i−1)master denotes the maser key of the less recent generation (i−1) and notation K(i+1)master denotes the master key of the more recent generation (i+1).

By the same token, a master key of the less recent generation (i−2) can be found from the master key of the more recent generation is (i+1) by applying the unidirectional function f 3 times as follows:

$K(i-2)\text{master}=f(f(f(K(i+1)\text{master})))$ where notation K(i−2)master denotes the maser key of the less recent generation (i−2).

An example of the unidirectional function f is the so-called hash function. To put it concretely, functions known as MD5 (Message Digest 5) and SHA-1 (Secure Hash Algorithm-1) can be adopted.

An institution for issuing master keys generates K(0)master, K(1)master, K(2)master, . . . , and K(N)master by using the unidirectional function one key after another starting with K(N)master in advance. That is to say, K(N)master is set initially and then key (N−1)master is found by applying the unidirectional function once to K(N)master. Subsequently, K(N−2)master is found by applying the unidirectional function once to K(N−1)master. This process is carried out repeatedly till K(0)master is found by applying the unidirectional function once to K(1)master. Then, K(0)master, K(1)master, K(2)master, . . . , and K(N)master are used one key after another starting with K(0)master. It is to be noted that the unidirectional function used by a recording/reproduction apparatus for finding a master key of a less recent generation from a master key of a more recent generation is stored in a memory employed in the recording/reproduction apparatus.

In addition, as a unidirectional function, an encryption technology using a public key can also be adopted. In this case, the key-issuing institution has a private key of the encryption technology and the public key for the private key is distributed to all reproduction apparatus in advance. Then, the key-issuing institution sets K(0)master and uses it as a start master key. That is to say, when the master key K(i) master becomes necessary, it is generated by conversion of the master key K(i−1)master by using the private key. It this case, the key-issuing institution does not have to generate master keys for N generations in advance by using a unidirectional function. In addition, in accordance with this method of adopting the encryption technology using a public key, theoretically, master keys can be generated for an unlimited number of generations. It is to be noted that, if a recording/reproduction apparatus has a master key of a specific generation, a master key of a generation preceding the specific generation can be obtained by conversion of the master key of a specific generation by using the public key.

7: Recording and Reproduction of Contents by Cryptographic Processing Using Master Key The following description explains contents-recording/reproducing processes based on cryptographic processing using a master key. The description begins with an explanation of operations, which are carried out by a recording/reproduction apparatus to form a judgment on a master key as a part of processing to record contents onto the recording/reproduction apparatus's own recording medium, with reference to a flowchart shown in FIG. 18. The contents have been encrypted by a contents provider by using the master key of a specific generation and transmitted by the contents provider to the recording/reproduction apparatus by way of a network or through recording media provided to the recording/reproduction apparatus.

Figure 18:
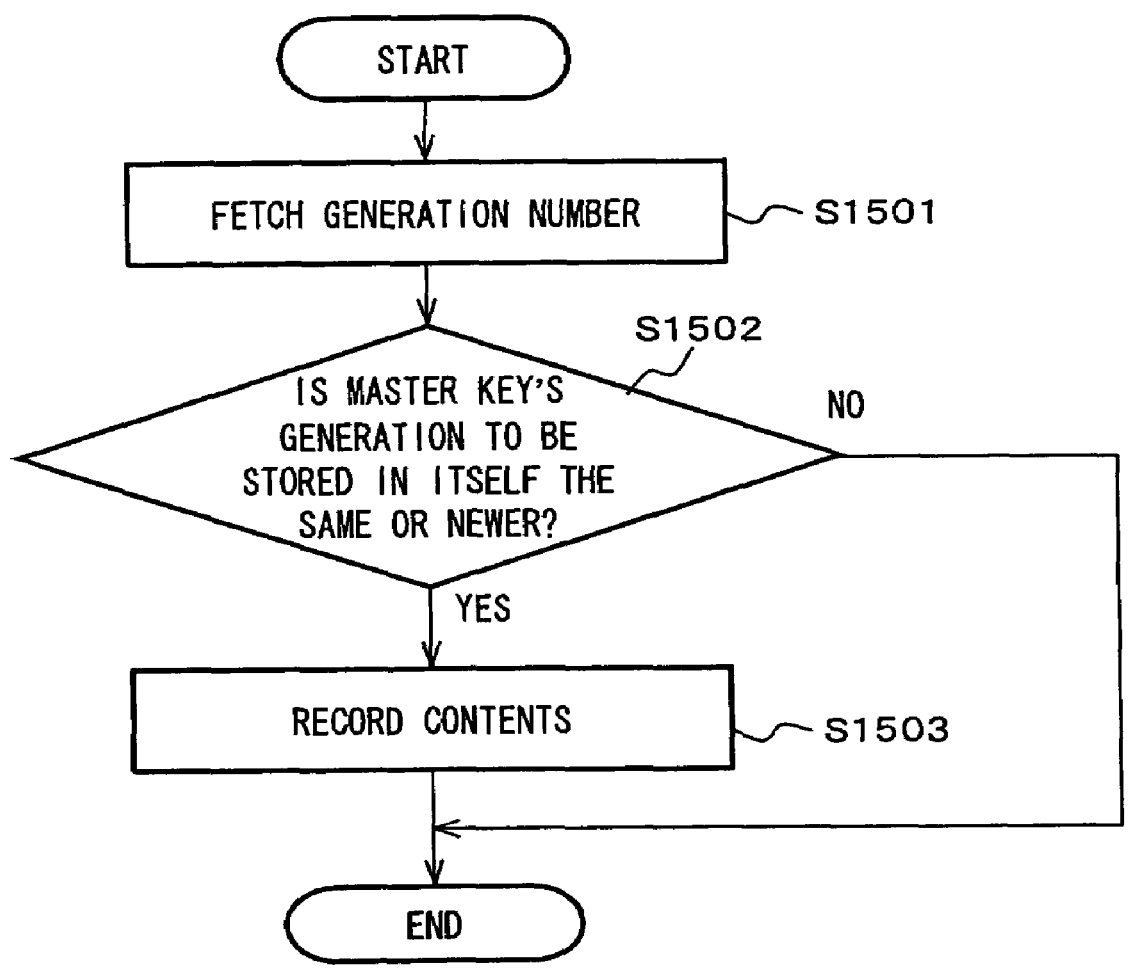
FIG. 18 shows a flowchart representing a process to compare generations of a master key in processing carried out by the recording/reproduction apparatus of the present invention.

As shown in FIG. 18, the flowchart begins with a step S1501 at which the recording/reproduction apparatus reads out pre-recording generation information (generation #n) of a master key from the recording media if the contents are supplied to the recording/reproduction apparatus through the recording media. The recording/reproduction apparatus also reads out the generation number c of an encrypted master key C, which is held in the recording/reproduction apparatus's own memory. Then, at the next step S1502, the generation number c of the encrypted master key C is compared with the pre-recording generation information (generation #n).

If the result of comparison obtained at the step S1502 indicates that the pre-recording generation information (or generation #n) of the master key stored in the recording media is more recent than the generation number c of the encrypted master key C stored in the recording/reproduction apparatus's own memory, that is, if the generation number c of the encrypted master key C stored in the recording/reproduction apparatus's own memory is less recent than the pre-recording generation information (generation #n) of the master key stored in the recording media, the processing to record the contents onto the recording/reproduction apparatus's own recording medium is ended by skipping a process of a step S1503. That is to say, the execution of the processing is terminated without recording the contents onto the recording/reproduction apparatus's own recording medium.

If the result of comparison obtained at the step S1502 indicates that the pre-recording generation information (or generation #n) of the master key stored in the recording media is the same as or less recent than the generation number c of the encrypted master key C stored in the recording/reproduction apparatus's own memory, that is, if the generation number c of the encrypted master key C stored in the recording/reproduction apparatus's own memory is the same as or more recent than the pre-recording generation information (or generation #n) of the master key stored in the recording media, on the other hand, the flow of the processing goes on to the step S1503 at which the recording/reproduction apparatus records the contents onto the recording/reproduction apparatus's own recording medium.

As described earlier, in a process carried out by a recording/reproduction apparatus to record contents onto a recording medium, processes to detect and embed a digital watermark are carried out in accordance with the way of performing digital-watermark processing for the recording/reproduction apparatus. That is to say, the processing to process a digital watermark is carried out in accordance with whether the recording/reproduction apparatus is an apparatus of the first, second or third generation. To be more specific, a recording/reproduction apparatus of the first generation does not carry out both the processes to detect and embed a digital watermark, whereas a recording/reproduction apparatus of the second generation carries out only the process to detect a digital watermark. On the other hand, a recording/reproduction apparatus of the third generation does carry out both the processes to detect and embed a digital watermark. In addition, information on the digital-watermark generation of a recording apparatus is included in copyright information generated for contents.

In parallel to these processes of a digital watermark, a process to encrypt contents to be recorded onto a recording medium is carried out. The following description explains details of a process to encrypt contents by using a master key. It is to be noted that a master key is a key subjected to generation management described above. To be more specific, the following description explains a process in which, for data of a transport stream described earlier, block keys are each generated by using a master key subjected to the generation management and used for encrypting the contents to be recorded onto the recording medium.

Figure 19:
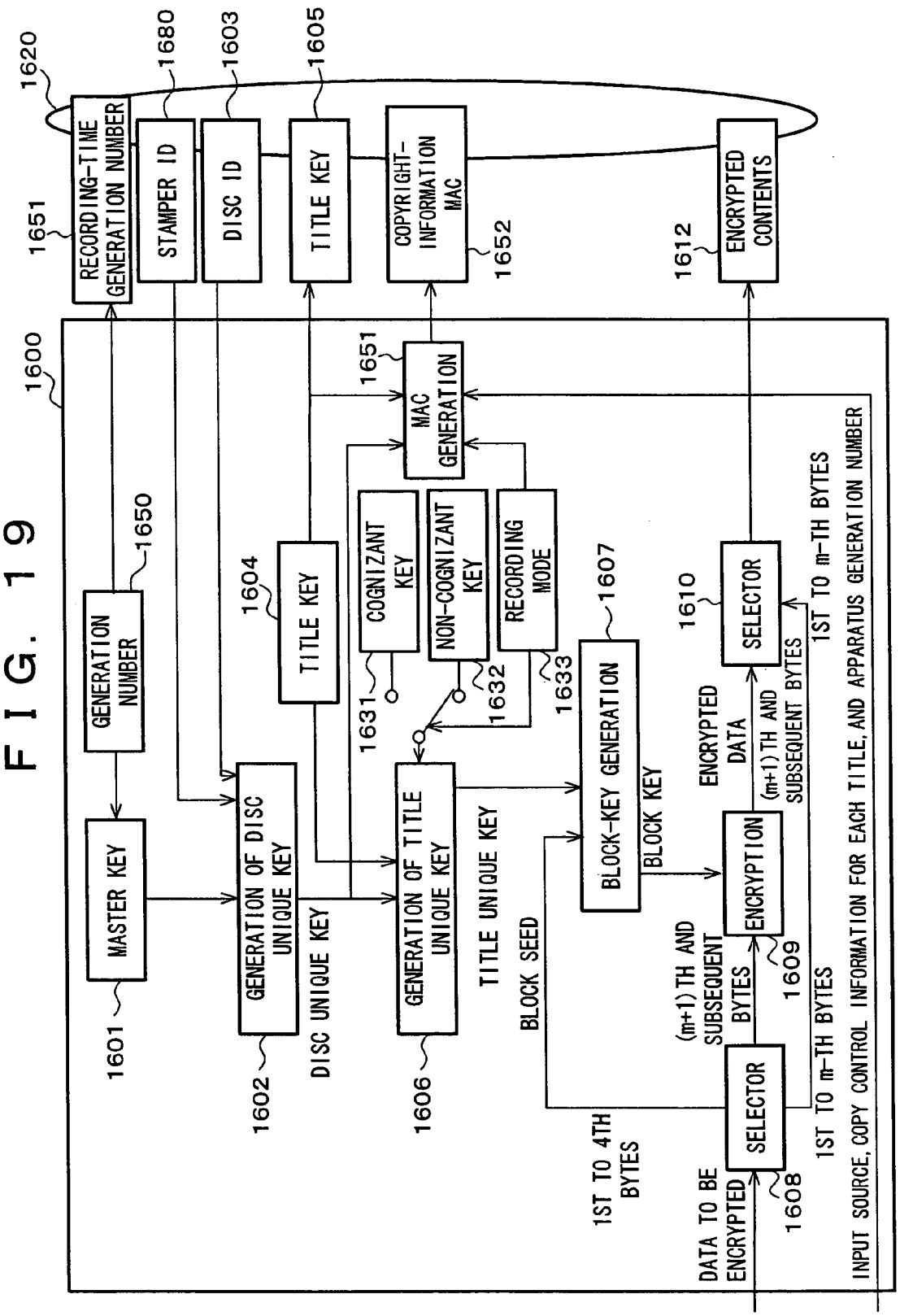
FIG. 19 is an explanatory block diagram showing first encryption processing carried out by the recording/reproduction apparatus of the present invention to record data.
Figure 20:
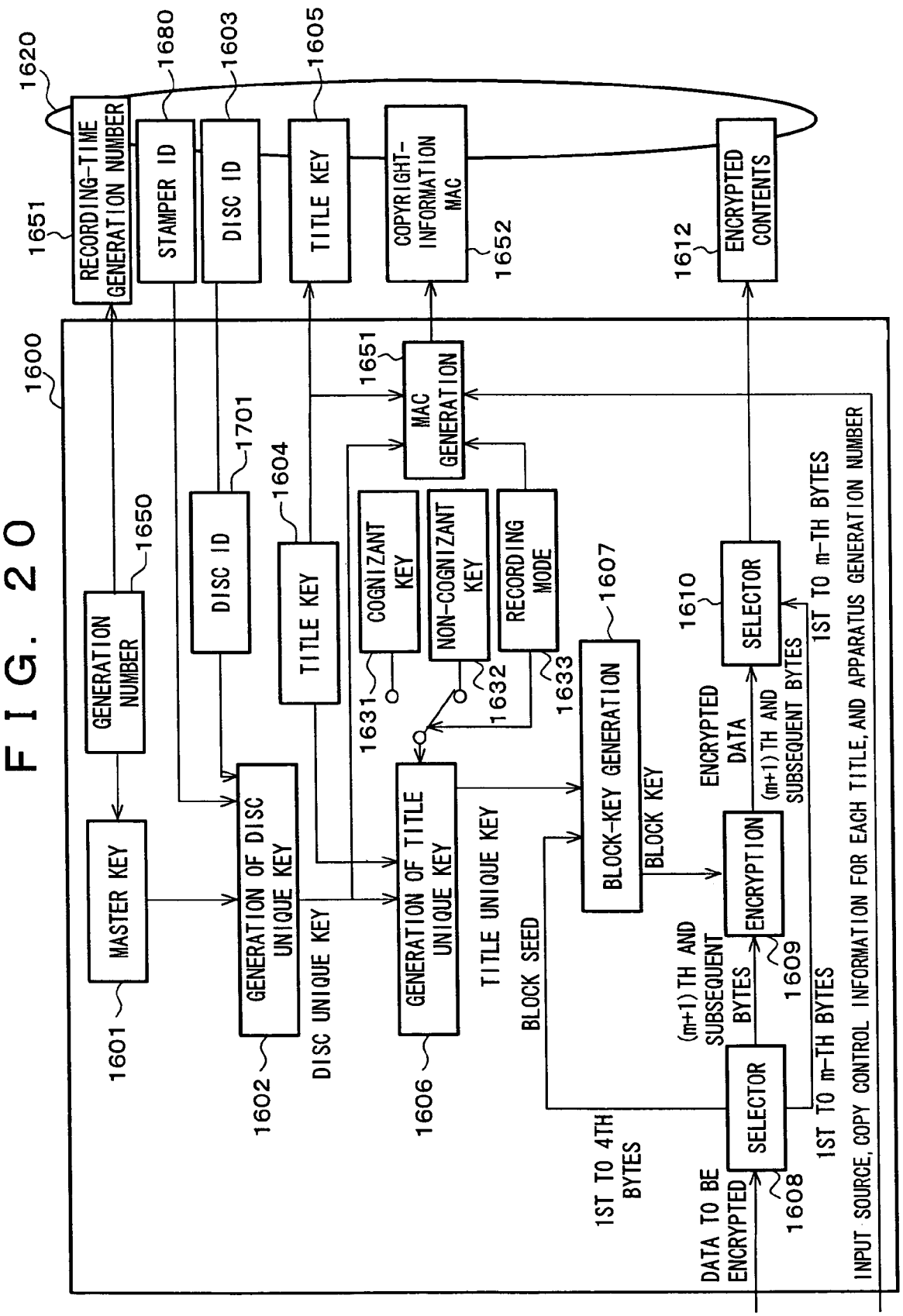
FIG. 20 is an explanatory block diagram showing second encryption processing carried out by the recording/reproduction apparatus of the present invention to record data.

The process is explained by referring to block diagrams of FIGS. 19 and 20. FIGS. 19 and 20 each show pieces of data and processing blocks. The data and the processing blocks are used for explaining processes carried out by the cryptographic processing means 150. It is to be noted that, in these processes, an optical disc is employed as the recording medium. In order to prevent a bit-by-bit copy operation from being carried out on contents recorded on the recording medium in this embodiment, a disc ID serving as identification information unique to the recording medium is used as information having an effect on a key for encrypting the contents.

The recording/reproduction apparatus 1600 reads out a master key 1601 and a cognizant key 1631 or a non-cognizant key 1632 from a memory 180 shown in FIG. 1 or 2.

The master key 1601 is a secret key stored in the memory 180 employed in the recording/reproduction apparatus 1600 in a process represented by the flowchart shown in FIG. 17 as explained earlier. As described before, the master key is subjected to generation management using generation numbers assigned thereto. The master key is a key common to a plurality of recording/reproduction apparatus pertaining to a group such as the one enclosed by a dashed line shown in FIG. 14. A device ID is an identifier of the recording/reproduction apparatus 1600. Typically, the device ID is a manufacturing number stored in the recording/reproduction apparatus 1600 in advance. The device ID may be disclosed to the public. The cognizant key 1631 and the non-cognizant key 1632 are each a key corresponding to a recording mode. The cognizant key 1631 and the non-cognizant key 1632 are each a key common to a plurality of recording/reproduction apparatus. These keys have been stored in the memory 180 employed in the recording/reproduction apparatus 1600 in advance.

The recording/reproduction apparatus 1600 checks the optical disc serving as the recording medium 1620 to form a judgment as to whether or not the disc ID 1603 has already been stored in the recording medium 1620 as identification information. If the disc ID 1603 has already been stored in the recording medium 1620, the recording/reproduction apparatus 1600 reads out the disc ID 1603 from the recording medium 1620 in a process shown in FIG. 19. If the disc ID 1603 has not been stored in the recording medium 1620, on the other hand, a disc ID 1701 is generated at random or by adopting a predetermined technique such as a random-number generation method and recorded onto the recording medium 1620 in a process shown in FIG. 20. Since the recording medium 1620 requires only one disc ID 1603, the disc ID 1603 is stored typically in a lead-in area or the like.

Next, the recording/reproduction apparatus 1600 generates a disc unique key in a process 1602 by using the master key 1601, a stamper ID 1680 and the disc ID 1603. The stamper ID 1680 has been recorded on the recording medium 1620 in advance as secret information, which can be fetched from the recording medium 1620 only by adopting a special fetching technique.

Figure 21:
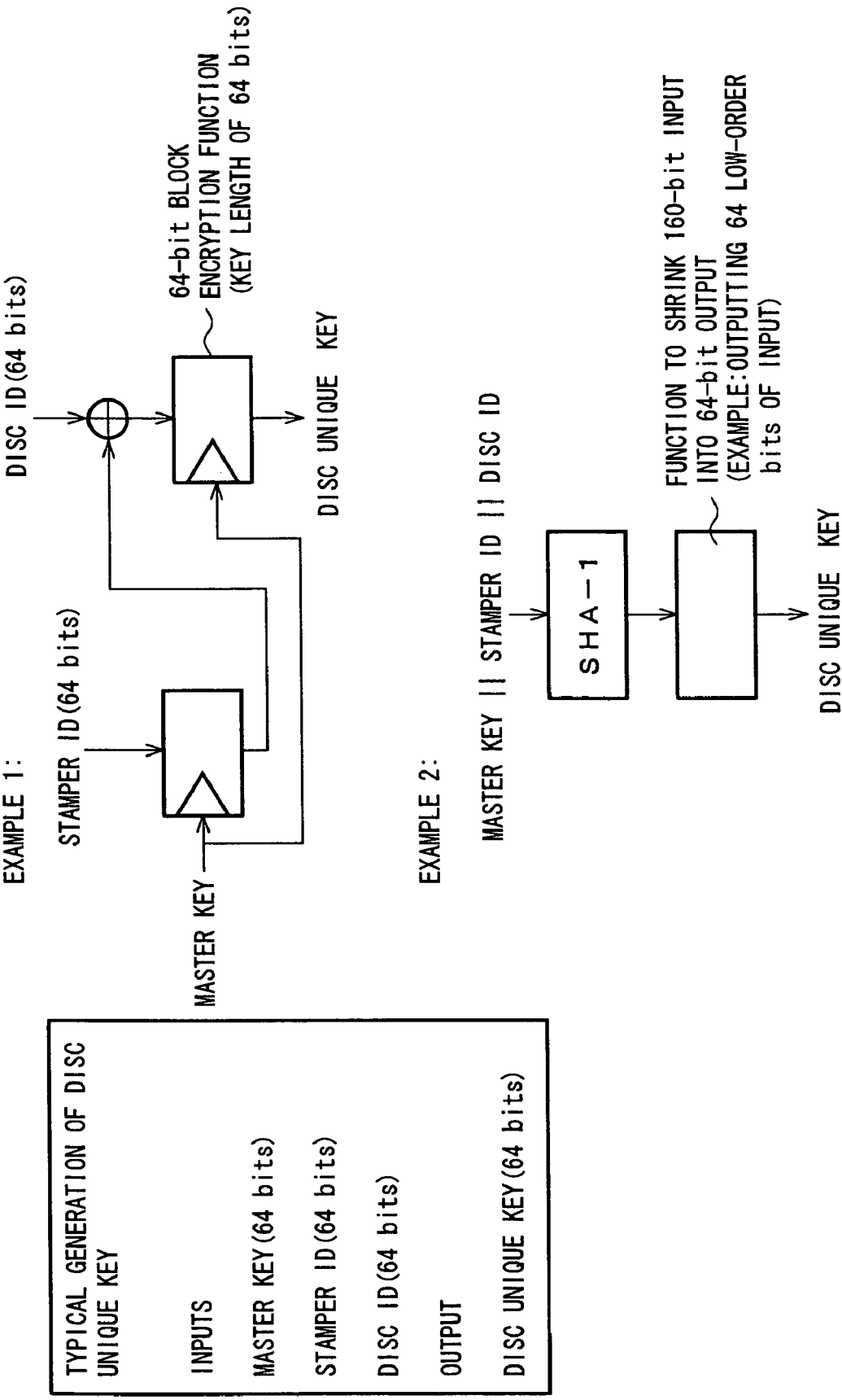
FIG. 21 is an explanatory block diagram showing a typical process to generate a disc unique key in the recording/reproduction apparatus provided by the present invention.

The master key 1601, the stamper ID 1680 serving as secret information and the disc ID 1603 are used for generating a disc unique key by adopting either of two concrete key generation methods explained by referring to FIG. 21. As shown in FIG. 21, in accordance with one of the key generation methods, the master key, the stamper ID and the disc ID are input to a hash function including a block encryption function to generate a disc unique key. In accordance with the second key generation method, on the other hand, data obtained as a result of bit concatenation of the master key, the stamper ID and the disc ID is input to a hash function SHA-1 conforming to FIPS 180-1 specifications to produce a 160-bit result. Then, a disc unique key with a required length is extracted from the 160-bit result.

As described above, the stamper ID 1680 has been recorded on the optical disc 1620 in advance as highly secret information. A process to read out the stamper ID 1680 from the optical disc 1620, a process to generate a disc unique key from the stamper ID 1680 and other processes are carried out by the cryptographic processing means 150 in order to keep the confidentiality. That is to say, secret information read out from the optical disc 1620 is securely protected in the cryptographic processing means 150.

As described above, the present invention provides a configuration in which only a valid recording/reproduction apparatus is capable of letting the cryptographic processing means 150 implemented by typically an LSI for generating a highly protected encrypted key carry out a process to generate a key, which is to be used for cryptographic processing for contents, under secured protection. Thus, the configuration provided by the present invention is capable of effectively preventing a process to generate illegal contents from being carried out.

Then, in the recording/reproduction apparatus 1600, the cryptographic processing means 150 shown in FIG. 1 or 2 generates a title key 1604, which is unique to recorded contents, at random or by adopting a predetermined technique such as a random-number generation method in a generation process 1604 and records the generated title key onto the optical disc 1620.

The recording/reproduction apparatus 1600 further acquires the generation number of the master key to be used, that is, the generation number 1650 of the master key stored by the recording/reproduction apparatus 1600 itself or recording-time generation #n, and stores the acquired generation number onto the recording medium 1620 as a recording-time generation number 1651.

The optical disc 1620 includes a data management file for storing information indicating which data composes what title. This file can be used for storing a title key 1605, a recording-mode flag 1635 and the generation number 1651 of the master key, that is, recording-time generation #n.

It is to be noted that, in the recording medium 1620, a pre-recording generation number has been stored in advance. The configuration provided by the present invention reproduces only contents recorded in a state of being encrypted by using a master key of a generation as recent as or more recent than the pre-recording generation number.

Then, a title unique key is generated from either a combination of the disc unique key, the title key and the cognizant key or a combination of the disc unique key, the title key and the non-cognizant key.

If the recording mode is the cognizant mode, a title unique key is generated from a combination of the disc unique key, the title key and the cognizant key. If the recording mode is the non-cognizant mode, on the other hand, a title unique key is generated from a combination of the disc unique key, the title key and the non-cognizant key.

As described above, only a recording/reproduction apparatus capable of carrying out recording and reproduction operations in the cognizant mode is allowed to own the cognizant key used as a key for generation of an encryption/decryption key to serve as secret information in a recording operation carried out in the cognizant mode. On the other hand, only a recording/reproduction apparatus capable of carrying out recording and reproduction operations in the non-cognizant mode is allowed to own the non-cognizant key used as a key for generation of an encryption/decryption key to serve as secret information in a recording operation carried out in the non-cognizant mode. Thus, in a recording/reproduction apparatus designed for only the cognizant or non-cognizant mode, contents are recorded by selecting only the cognizant or non-cognizant mode. Thus, the operation to record the contents is limited to the use of either only the cognizant key or only the non-cognizant key.

In a recording/reproduction apparatus that has both the cognizant key as well as the non-cognizant key stored therein and is capable of carrying out recording and reproduction operations in the cognizant and non-cognizant modes, however, it is necessary to carry out a process to make a decision as to which mode a recording operation is to be performed in. This mode-determining process, that is, a process to make a decision as to whether the cognizant or non-cognizant mode is to be selected to carry out an operation to record contents is explained by referring to a flowchart shown in FIG. 22.

Basically, it is desirable to carry out an operation to record contents in the cognizant mode. This is because, if an operation to record contents is carried out in the cognizant mode, it is possible to avoid the aforementioned mismatch between the EMI and the embedded CCI. As described above, nevertheless, it is quite within the bounds of possibility that a data analysis error or the like is generated due to, among other causes, introduction of a new data format. In such a case, contents are recorded in the non-cognizant mode.

Figure 22:
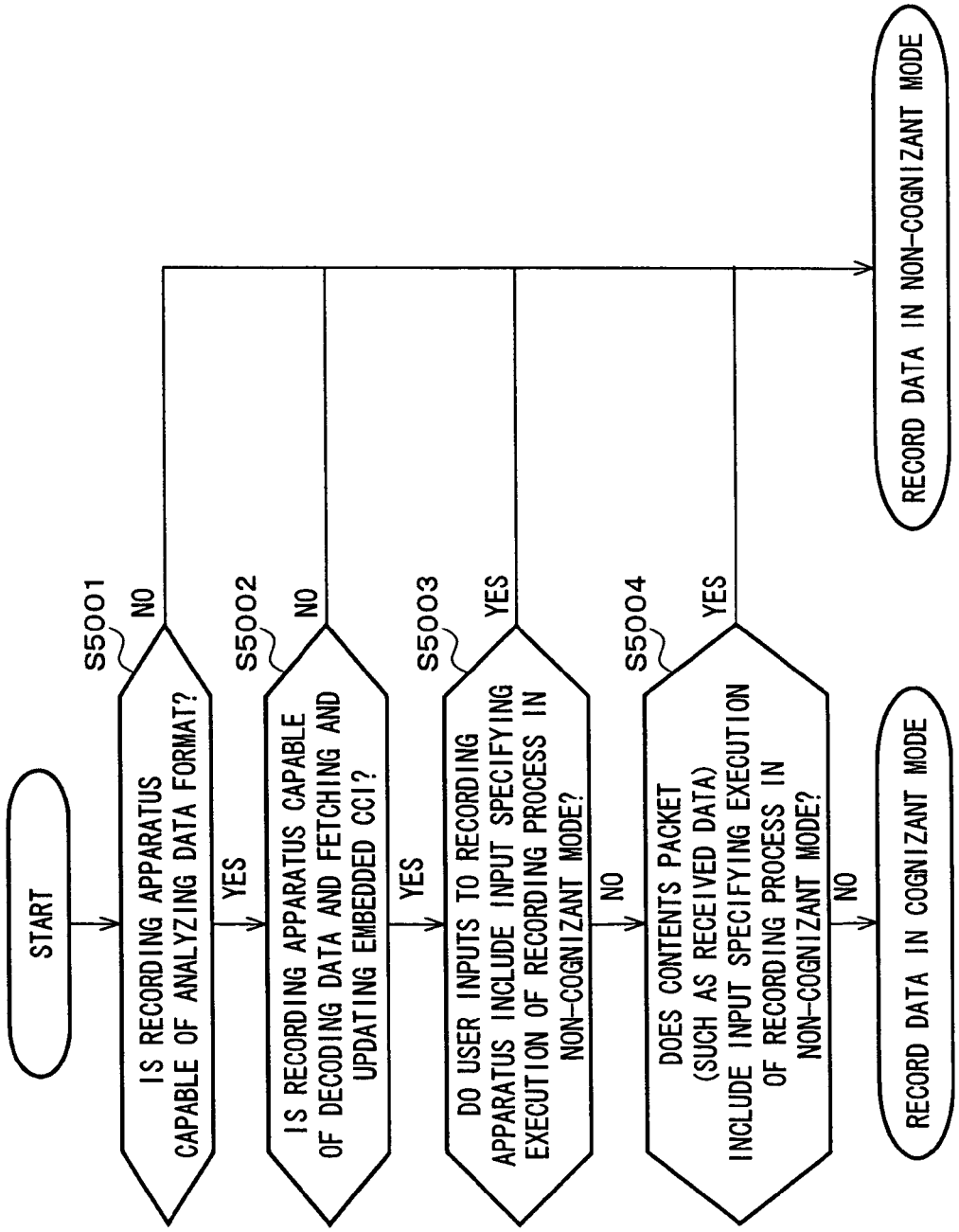
FIG. 22 shows an explanatory flowchart representing a process carried out by the recording/reproduction apparatus of the present invention to make a decision as to whether an operation to record contents is to be performed in a cognizant or non-cognizant mode.

Next, steps of the flowchart shown in FIG. 22 are explained. The flowchart begins with a step S5001 at which the recording apparatus forms a judgment as to whether or not a data format can be analyzed. As described above, embedded CCI is embedded in the contents. Thus, if the data format cannot be analyzed, the embedded CCI cannot be fetched. In this case, the contents are recorded in the non-cognizant mode.

If the data format can be analyzed, the flow of the process goes on to a step S5002 to form a judgment as to whether or not it is possible to carry out a process to decode data (contents) and a process to fetch and update the embedded CCI. Normally, the contents and the embedded CCI have been encoded so that it is necessary to decode the embedded CCI in the process to fetch the embedded CCI. In the case of a multi-channel simultaneous recording operation, for example, the recording apparatus is not capable of carrying out a decoding process in some cases due to the fact that a decoding circuit of the recording apparatus is being used for another purpose. In this case, the embedded CCI cannot be fetched. For this reason, the contents are recorded in the non-cognizant mode.

If the result of the judgment formed at the step S5002 indicates that it is possible to carry out a process to decode contents and a process to fetch and update the embedded CCI, the flow of the process goes on to a step S5003 to form a judgment as to whether or not an input supplied by the user to the recording apparatus specifies that contents are to be recorded in the non-cognizant mode. This judgment is formed only by an apparatus allowing a recording mode to be selected by specifying the selected recording mode in an input supplied by the user. In an ordinary apparatus not allowing a recording mode to be selected by specifying the selected recording mode in an input supplied by the user, this judgment is not formed. If an input supplied by the user to the recording apparatus specifies that contents are to be recorded in the non-cognizant mode, the contents are recorded in the non-cognizant mode.

If an input supplied by the user to the recording apparatus does not specify that contents are to be recorded in the non-cognizant mode, on the other hand, the flow of the process goes on to a step S5004 to form a judgment as to whether or not contents packet such as the received data specifies that contents are to be recorded in the non-cognizant mode. If the contents packet specifies that contents are to be recorded in the non-cognizant mode, the contents are recorded in the non-cognizant mode. If no contents packet such as the received data specifies that contents are to be recorded in the non-cognizant mode, on the other hand, the contents are recorded in the cognizant mode.

In an apparatus allowing either a contents-recording operation in the cognizant mode or a contents-recording operation in the non-cognizant mode to be carried out selectively, the process to determine a recording mode as described above is performed to make a decision as to which recording mode is to be selected in the operation to record contents. As is obvious from the processing flowchart shown in FIG. 21, however, a process to record contents in the cognizant mode is basically carried out if it is possible to perform the process to record contents in the cognizant mode.

As described above, if the cognizant mode is selected as the recording mode, a title unique key is generated from a combination of the disc unique key, the title key and the cognizant key. If the non-cognizant mode is selected as the recording mode, on the other hand, a title unique key is generated from a combination of the disc unique key, the title key and the non-cognizant key.

Figure 23:
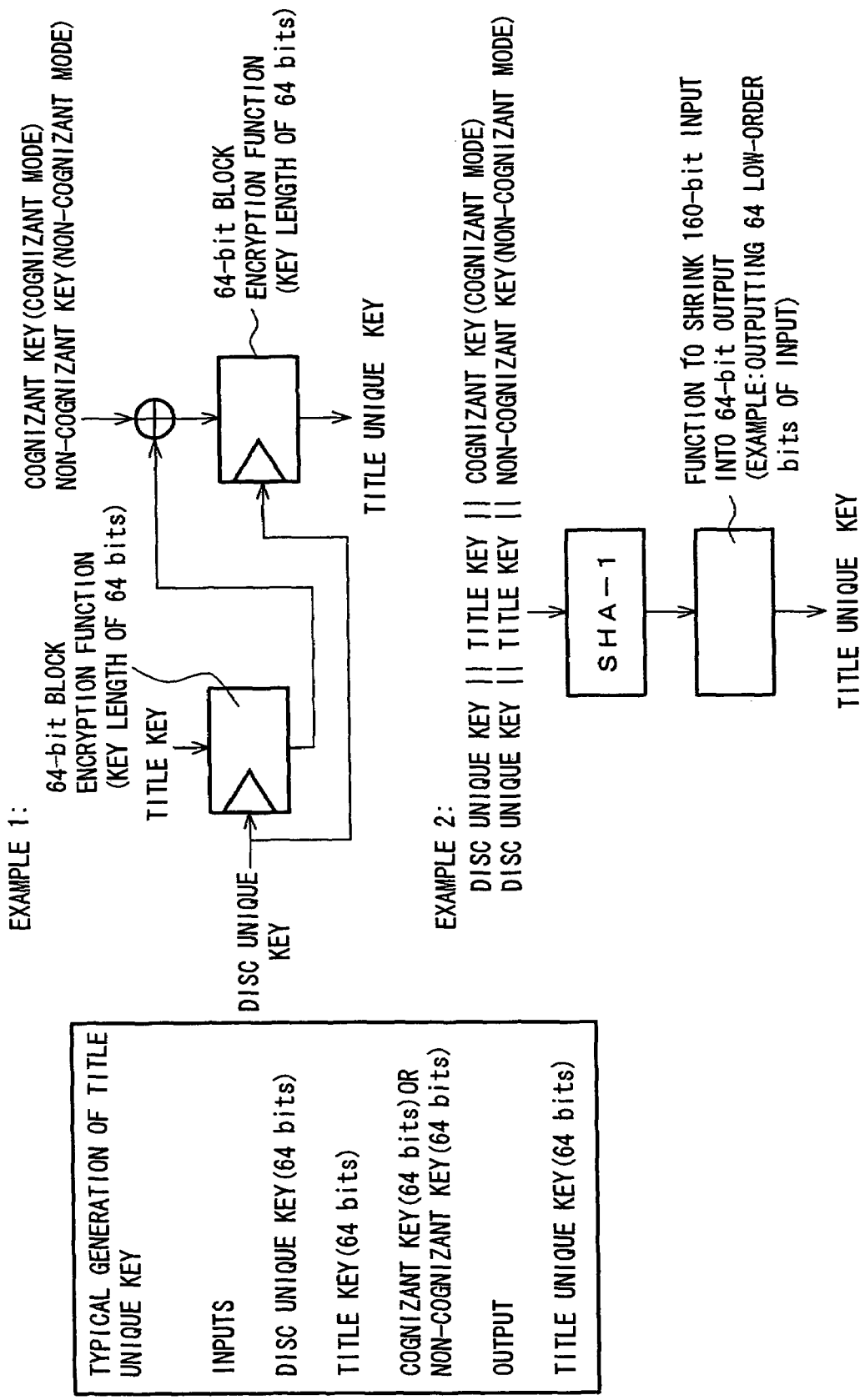
FIG. 23 is a block diagram showing a typical process to generate a title unique key in the recording/reproduction apparatus provided by the present invention to record data.

FIG. 23 is a diagram showing two concrete key generation methods for generating a title unique key. As shown in FIG. 23, in accordance with one of the key generation methods, the title key, the disc unique key and the cognizant key are input to a hash function including a block encryption function to generate a title unique key if the cognizant mode is selected as the recording mode, or the title key, the disc unique key and the non-cognizant key are input to the hash function including the block encryption function to generate a title unique key if the non-cognizant mode is selected as the recording mode. In accordance with the second key generation method, on the other hand, data is input to a hash function SHA-1 conforming to FIPS 180-1 specifications to produce a 160-bit result. Then, a title unique key with a required length is extracted from the 160-bit result. If the cognizant mode is selected as the recording mode, the data input to the hash function SHA-1 is obtained as a result of bit concatenation of the title key, the disc unique key and the cognizant key. If the non-cognizant mode is selected as the recording mode, on the other hand, the data input to the hash function SHA-1 is obtained as a result of bit concatenation of the title key, the disc unique key and the non-cognizant key.

As described above, a disc unique key is generated from a master key, a stamper ID and a disc ID, and then used for generating a title unique key in conjunction with a title key and a cognizant key in the case of the cognizant mode selected as the recording mode or a non-cognizant key in the case of the non-cognizant mode selected as the recording mode. It is to be noted, however, that a title unique key can also be generated directly from a master key, a disc ID, a title key and a cognizant key in the case of the cognizant mode selected as the recording mode or a non-cognizant key in the case of the non-cognizant mode selected as the recording mode without generating a disc unique key. As an alternative, a key equivalent to a title unique key can also be generated from a master key, a disc ID, and a cognizant key in the case of the cognizant mode selected as the recording mode or a non-cognizant key in the case of the non-cognizant mode selected as the recording mode without using a title key.

Assume for example that one of transmission formats prescribed by the 5C-DTCP specifications mentioned above is used. In this case, data may be transmitted as TS packets conforming to the MPEG2 specifications. For instance, when an STB (Set Top Box) receiving a satellite broadcast passes on the broadcast to a recording apparatus in conformity with the 5C-DTCP specifications, the STB transmits MPEG2 TS packets received from a satellite-broadcast communication line to the recording apparatus through an IEEE-1394 bus in a desirable way of transmission requiring no conversion of data.

The recording/reproduction apparatus 1600 receives the TS packets of contents to be recorded. The TS-processing means 300 adds an ATS, which is information indicating a time a TS packet is received, to each of the packets. It is to be noted that, as described earlier, a block seed to be added to block data may have a value representing a combination of an ATS, copy control information and other information.

As shown in FIG. 5, one block is composed of X TS packets each including an additional ATS where X is typically 32. As shown at the bottom of FIG. 19 or 20, a selector 1608 separates the first to fourth bytes at the head of a block of input data to be encrypted from the block to produce a 32-bit block seed including an ATS. A block key is then generated in a process 1607 from the block seed and the title unique key generated earlier. The generated block key is used for encrypting the data of the block.

FIG. 24 is a diagram showing two typical methods for generating a block key having a size of 64 bits. In accordance with either of the methods shown in FIG. 24, a block key having a size of 64 bits is generated from a block seed with a size of 32 bits and a title unique key with a size of 64 bits.

In accordance with the first typical key generation method, a block encryption function is used to generate a block key. A title unique key is supplied to the block encryption function as the key of the block encryption function. A value created as a result of concatenating a block seed with a constant having a size of 32 bits is input to the block encryption function to generate a block key as a result of encryption.

In accordance with the second typical key generation method, on the other hand, a hash function SHA-1 conforming to FIPS 180-1 specifications is used. A value created as a result of concatenating a block seed with a title unique key is input to the hash function SHA-1 to generate an output with a size of 160 bits. The output with a size of 160 bits is then shrunk to a block key having a size of 64 bits. Typically, the 64 low-order bits of the output with a size of 160 bits are extracted and used as the block key.

In the example described above, a disc unique key, a title unique key and a block key are each generated sequentially one key after another. It is to be noted, however, that a disc unique key and a title unique key do not have to be generated for example. In this case, a block key is generated for each block directly from a master key, a stamper ID, a disc ID, a title key, a block seed and a cognizant key for a cognizant mode or a non-cognizant key for a non-cognizant mode.

After a block key is generated for a block, the generated block key is used to encrypt the data of the block. As shown at the bottom of FIG. 19 or 20, the block data's first to m-th bytes including a block seed are separated from the block by a selector 1608, where m is typically 8. The separated bytes are not used as an object of encryption. The (m+1)th to last bytes of the block are encrypted in an encryption process 1609. It is to be noted that the m unencrypted bytes include the first to fourth bytes composing the block seed. The block data's (m+1)th to last bytes separated by the selector 1608 are encrypted by the cryptographic processing means 150 in an encryption process 1609 based on an encryption algorithm set in advance. An example of the encryption algorithm is a DES (Data Encryption Standard) prescribed by FIPS 46-2 specifications.

In addition, a block seed may include CCI (Copy Control Information) as described above. In the case of a recording operation carried out in the cognizant mode, copy control information representing embedded CCI is included. As described earlier, the embedded CCI is copy control information embedded in contents. In the case of a recording operation carried out in the non-cognizant mode, on the other hand, copy control information reflecting an EMI (Encryption Mode Indicator) placed at the packet head explained earlier by referring to FIG. 20 is included.

That is to say, in the case of an information-recording operation carried out in the cognizant mode, a process is carried out to generate information to be recorded by adding a block seed including copy control information based on embedded CCI contained in contents to a block comprising one or more packets. In the case of an information-recording operation carried out in the non-cognizant mode, on the other hand, a process is carried out to generate information to be recorded by adding a block seed including copy control information based on an EMI (Encryption Mode Indicator) serving as copy control information contained in contents to a block comprising one or more packets.

If the block length (or the input/output data size) of the encryption algorithm in use is 8 bytes as is the case with the DES, X is set typically at 32 and m is set typically at a multiple of 8. In this way, all the (m+1) and subsequent bytes of the block data can be encrypted without leaving bytes unencrypted.

To put it in detail, the (m+1)th and subsequent bytes of the block data can be encrypted without leaving bytes unencrypted by setting X, m and L at values that satisfy the following equation:

$$192*X=m+n*L$$

where notation X denotes the number of TS packets included in a block, notation L denotes the encryption algorithm's input/output data size expressed in terms of bytes, and notation n denotes any arbitrary natural number.

The encrypted (m+1)th to last bytes of the block data are joined by the selector 1610 to the block data's first to m-th bytes excluded from the encryption process to form encrypted contents 1612 to be recorded onto the recording medium 1620.

In addition, in the recording/reproduction apparatus provided by the present invention, copyright information is generated for contents involved in a recording operation. Furthermore, a MAC (Message Authentication Code) to be used as a falsification check value of the copyright information is generated in a process 1651 to form copyright information & MAC 1652 to be recorded onto the disc 1620.

As described above, examples of the copyright information are information on an input source, information on the digital-watermark generation of the recording apparatus, information on a recording mode, strictest copy control information or copy control information at a variation point or a packet number corresponding to the variation point. One or more of the information on an input source, the information on the digital-watermark generation of the recording apparatus, the information on a recording mode, the strictest copy control information and the copy control information at a variation point or a packet number corresponding to the variation point are recorded on the recording medium as copyright information. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents.

Figure 25:
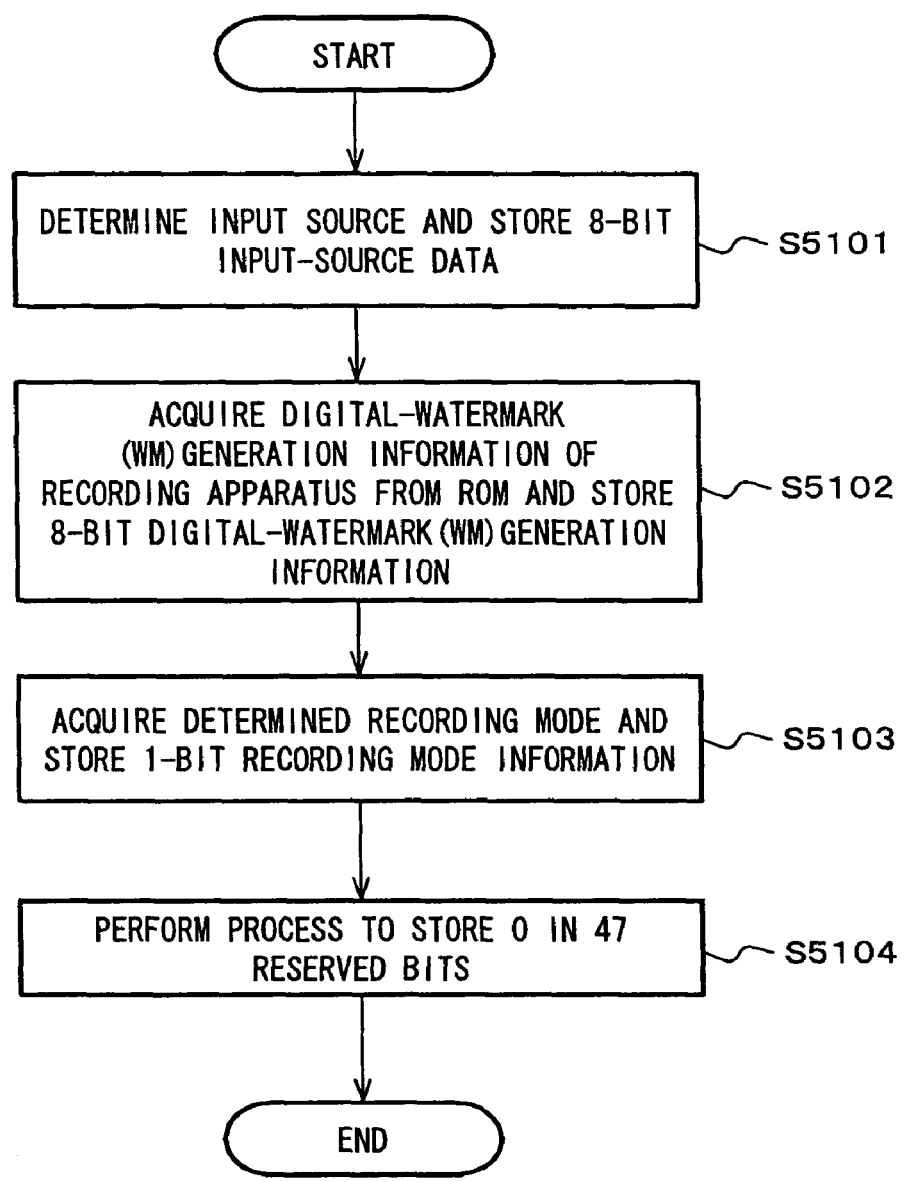
FIG. 25 shows a flowchart representing a first typical process of storing copyright information in the recording/reproduction apparatus provided by the present invention.
Figure 26:
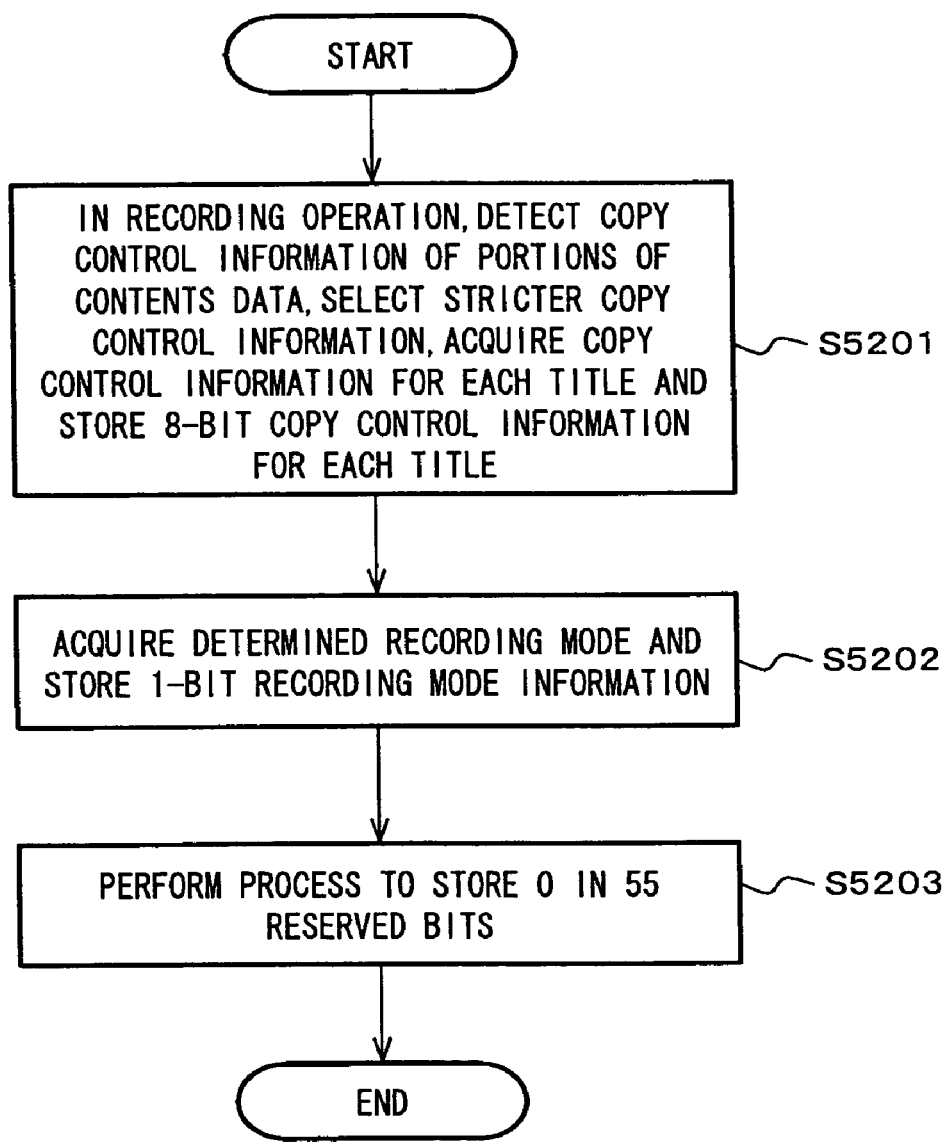
FIG. 26 shows a flowchart representing a second typical process of storing copyright information in the recording/reproduction apparatus provided by the present invention.
Figure 27:
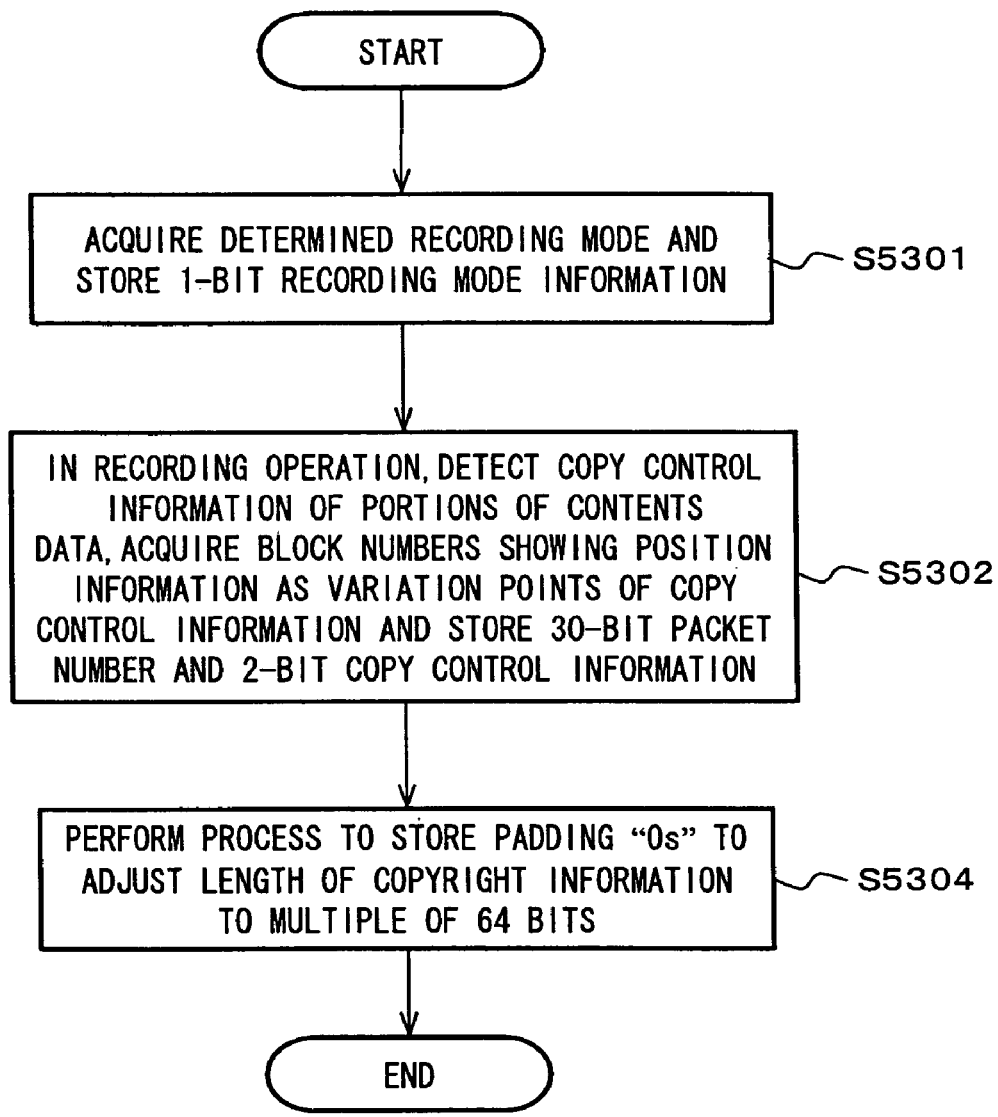
FIG. 27 shows a flowchart representing a third typical process of storing copyright information in the recording/reproduction apparatus provided by the present invention.

A variety of processes each carried out to generate various kinds of copyright information is explained by referring to flowcharts shown in FIGS. 25, 26 and 27. In particular, FIG. 25 is a diagram showing a typical process for generating and storing information on an input source, information on the digital-watermark generation of the recording apparatus and information on a recording mode. The information on a recording mode indicates that the mode of an operation to record information is the cognizant or non-cognizant mode.

The flowchart shown in FIG. 25 begins with a step S5101 at which an input source is identified. Then, 8-bit information on the identified input source is generated and stored. The information on the input source indicates that the input contents are received from an input source conforming to the 5C-DTCP specifications, contents transmitted by way of a satellite such as a BS or CS contents, ground-wave digital contents, ground-wave analog contents or other contents. Typical values of the information on an input source and their meanings are listed below.

Information on an input source:

0x00: IEEE 1394 with 5C

0x01: IEEE 1394 without 5C

0x02: USB with 5C

0x03: USB without 5C

0x04: Embedded BS tuner

0x05: Embedded CS tuner

0x06: Embedded ground-wave tuner

0x07: Analog

0x08 to 0xff: Reserved

Then, at the next step S5102, a digital watermark having a size of 8 bits is acquired from the recording apparatus's own ROM. As described above, the information on the digital-watermark generation of the recording apparatus is information indicating one of the first, second and third generations described above, that is, information on the apparatus for recording the contents. Typical values of the information on the digital-watermark generation of the recording apparatus and their meanings are listed below.

Information on the digital-watermark generation of the recording apparatus:

0x00: first generation

0x01: second generation

0x02: third generation

0x03 to 0xff: Reserved

Subsequently, at the next step S5103, information on a recording mode of the contents is acquired. The information on a recording mode of the contents is 1-bit information indicating that the adopted recording mode is the cognizant or non-cognizant mode. Typical values of the information on a recording mode and their meanings are listed below.

Information on a recording mode:

0: Cognizant mode

1: Non-cognizant mode

Then, at the next step S5104, in order to extend the copyright information to 64 bits, the 47 remaining bits allocated to reserved data are all set to 0. In this way, copyright information having a size of 64 bits is generated.

FIG. 26 shows a flowchart representing a typical process to select strictest copy control information, as copyright information, among pieces of CCI acquired from blocks of contents to be recorded, store the selected strictest copy control information as copy control information provided for each title and further store information on a recording mode. The information on a recording mode of the contents is information indicating that the adopted recording mode is the cognizant or non-cognizant mode.

The flowchart shown in FIG. 26 begins with a step S5201 at which copy control information (CCI) of each block of contents is examined while the contents are being recorded and strictest copy control information is selected among pieces of CCI. Pieces of copy control information are arranged in an order starting with the strictest one and ending with the most lenient one as follows: Copy Prohibited, One Generation Copy Allowed, No More Copies and Copy Free. The selected copy control information is used as 8-bit copy control information provided for each title. Typical values of the 8-bit copy control information provided for each title and their meanings are listed below.

Copy control information provided for each title:

0x00: Copy Free

0x01: No More Copies

0x02: One Generation Copy Allowed

0x03: Copy Prohibited

0x04 to 0xff: Reserved

Then, at the next step S5202, information on a recording mode is acquired. The information on a recording mode of the contents is information indicating that the adopted recording mode is the cognizant or non-cognizant mode.

Subsequently, at the next step S5203, in order to extend the copyright information to 64 bits, the 55 remaining bits allocated to reserved data are all set to 0. In this way, copyright information having a size of 64 bits is generated.

FIG. 27 shows a flowchart representing a process to store information on a recording mode and information on a variation of copy control information. As shown in the figure, the flowchart begins with a step S5301 at which information on recording mode of contents is acquired. The information on a recording mode of the contents to be recorded is information indicating that the adopted recording mode is the cognizant or non-cognizant mode.

Then, at the next step S5302, information on variation points of copy control information (CCI) acquired from blocks composing the contents is obtained. To be more specific, packet numbers each representing a variation point and copy control information at the variation points are obtained. Examples of packet numbers each representing a variation point and copy control information at the variation points are shown in FIG. 13. In these examples, a packet number representing a variation point has a size of 30 bits and copy control information at each variation point represented by a packet number has a size of 2 bits.

Subsequently, at the next step S5303, in order to extend the copyright information to 64 bits or a multiple of 64 bits, the remaining bits are all set to 0 in a padding process. In this way, copyright information having a size of 64 bits or a multiple of 64 bits is generated.

As described above, it is possible to provide a variety of data configurations to be stored as copyright information. Even though not explained in the description of the above examples, as the copyright information, it is possible to store information on an input source, information on the digital-watermark generation of the recording apparatus, information on a recording mode, strictest copy control information or copy control information at a variation point or a packet number corresponding to the variation point. As described above, the information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents.

Figure 28:
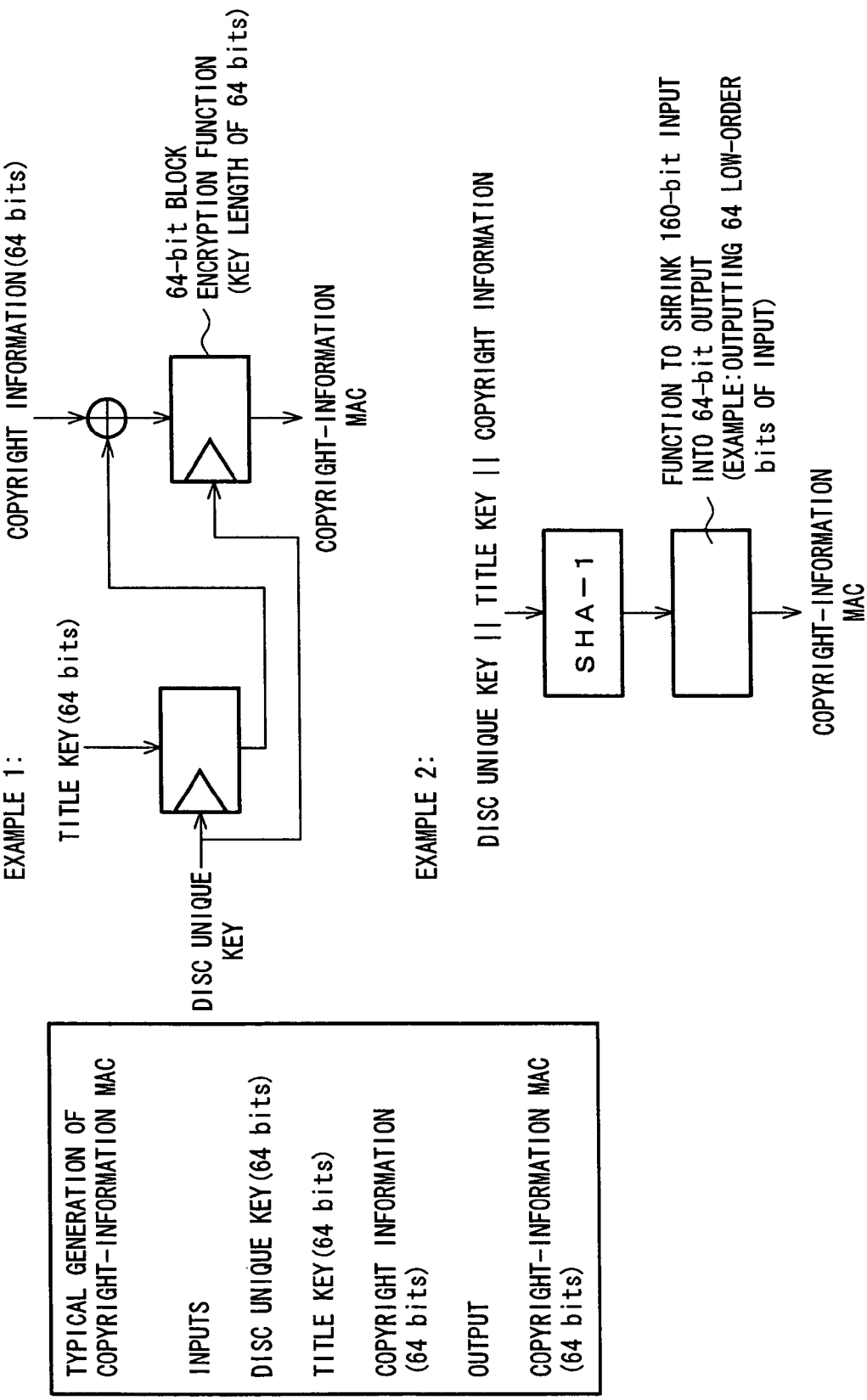
FIG. 28 is a diagram showing a typical process to compute copyright-information MAC (Message Authentication Code) in the recording/reproduction apparatus provided by the present invention.

For each of the various kinds of copyright information described above, a MAC is generated as a falsification inspection value. Copyright information is recorded in the recording medium along with a MAC generated for the copyright information. A typical process to generate a MAC is explained by referring to FIG. 28. FIG. 28 is a diagram showing two typical methods for generating a MAC. As shown in FIG. 28, in accordance with one of the two MAC generation methods, a disc unique key, a title key and copyright information are input to a hash function including a 64-bit block encryption function to generate a MAC. In accordance with the second key generation method, on the other hand, data obtained as a result of bit concatenation of the disc unique key, the title key and the copyright information is input to a hash function SHA-1 conforming to FIPS 180-1 specifications to produce a 160-bit result. Then, a copyright-information MAC with a required length is extracted from the 160-bit result.

By carrying the processes described above, before contents are recorded onto a recording medium, the contents are encrypted in block units by using a block key for each block. Each block key is generated from information such as a master key managed by generations and a block seed including an ATS. In addition, for the contents, copyright information and a MAC for checking falsification of the copy information are also recorded onto the recording medium.

As described above, in this configuration, contents encrypted by using a master key controlled by generations are recorded onto a recording medium. As a condition to be satisfied by another recording/reproduction apparatus for decrypting the contents and reproducing the contents from the recording medium, the other recording/reproduction apparatus shall hold at least the same generation as the generation of the master key used for encrypting the contents in the operation to record the contents onto the recording medium or hold a generation even more recent than the master key of the contents.

In addition, for encrypted contents recorded on a recording medium, copyright information is also recorded onto the recording medium and, without the need to decrypt the encrypted contents, the copyright information can be obtained from the recording medium, making it possible to correctly control reproduction and output operations. Furthermore, even when the recording medium is mounted on another reproduction apparatus for reproducing contents from the recording medium, by referring to copyright information for information on an input source or digital-watermark generation information, it is possible to correctly form a judgment on copy control information set in the recording apparatus for recording the contents. Thus, correct control of the reproduction operation can be executed. It is to be noted that details of a process to reproduce contents will be described later.

Figure 29:
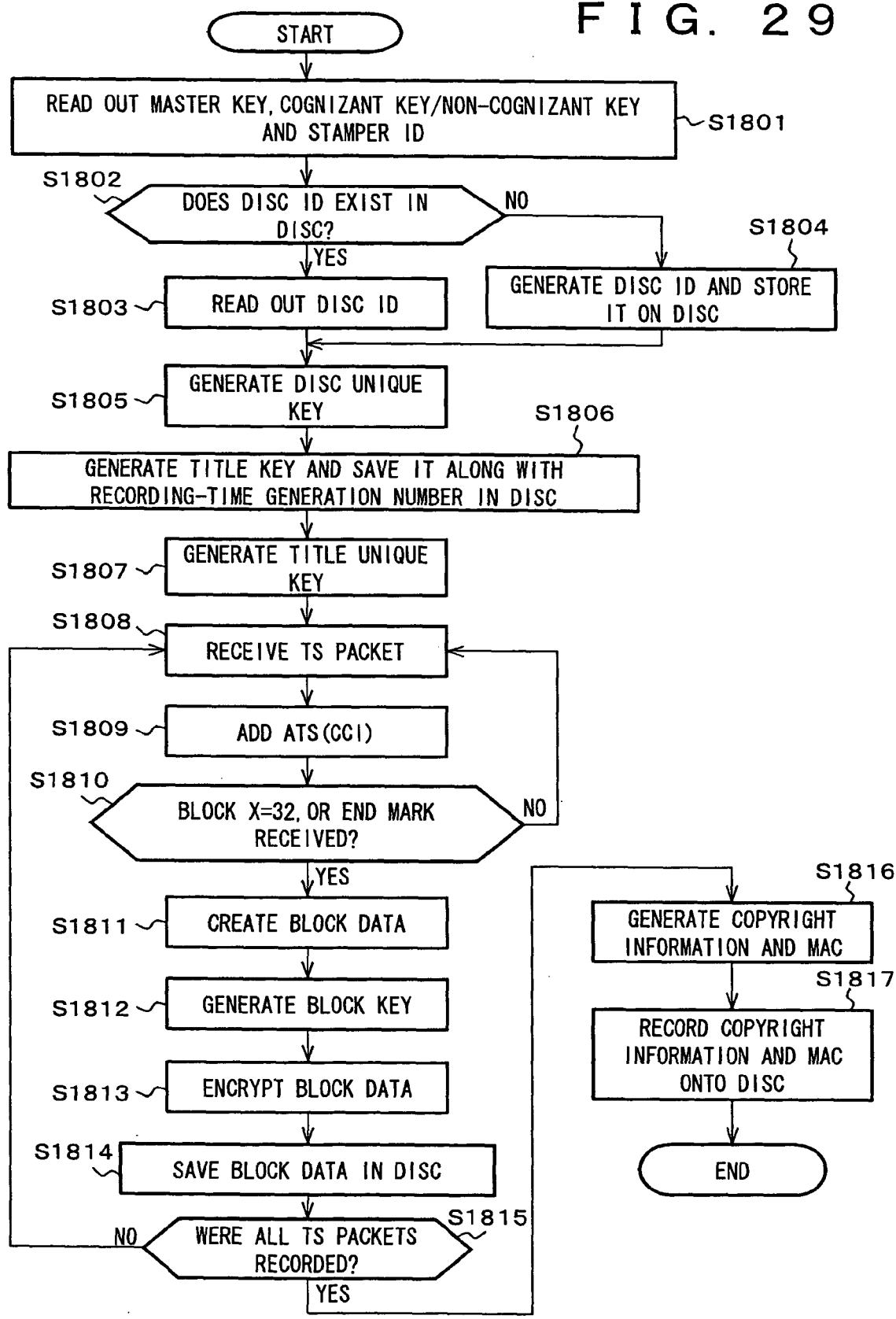
FIG. 29 shows an explanatory flowchart representing a process carried out by the recording/reproduction apparatus of the present invention to record data.

By referring to the flowchart shown in FIG. 29, the following description explains collectively a process carried out by the TS-processing means 300 to add ATS and CCI and a cryptographic process carried out by the cryptographic processing means 150 in an operation to record the contents. It is to be noted that a process is carried out by the digital-watermark (WM)-detecting and embedding means 185 in accordance with the digital-watermark generation of the apparatus in parallel to the processes represented by the flowchart shown in FIG. 29. To be more specific, an apparatus of the first generation neither detects nor embeds a digital watermark. An apparatus of the second generation detects a digital watermark but does not embed a digital watermark. An apparatus of the third generation detects and embeds a digital watermark. The flowchart shown in FIG. 29 is an explanatory flowchart collectively representing a process carried out by the TS-processing means 300 to add ATS and CCI and a cryptographic process carried out by the cryptographic processing means 150 in an operation to record the contents.

The flowchart shown in FIG. 29 begins with a step S1801 to read out a master key, a cognizant key in the case of the cognizant mode or a non-cognizant key in the case of the non-cognizant mode from the memory 180 employed in the recording/reproduction apparatus itself. In addition, a stamper ID is read out from the recording medium (disc).

Then, the flow of the process goes on to a step S1802 to form a judgment as to whether or not a disc ID has already been recorded on the recording medium as identification information. If a disc ID as identification information has already been recorded on the recording medium, the flow of the process goes on to a step S1803 at which this disc ID is read out from the recording medium. If no disc ID has been recorded on the recording medium, on the other hand, the flow of the process goes on to a step S1804 at which a disc ID is generated at random or by adoption of a key generation method determined in advance, and recorded onto the recording medium. Then, at the next step S1805, a disc unique key is generated by using the master key, the stamper ID and the disc ID. As explained earlier by referring to FIG. 21, the disc unique key is generated by adoption of a method using typically a SHA-1 hash function prescribed by the FIPS 180-1 specifications or a method using a hash function based on block encryption.

Subsequently, at the next step S1806, a title key is generated as a key unique to this particular recording operation and recorded onto the recording medium along with the generation number of the master key.

Then, at the next step S1807, a title unique key is generated from the disc unique key, the title key and the cognizant key in the case of the cognizant mode or the non-cognizant key in the case of the non-cognizant mode.

Figure 30:
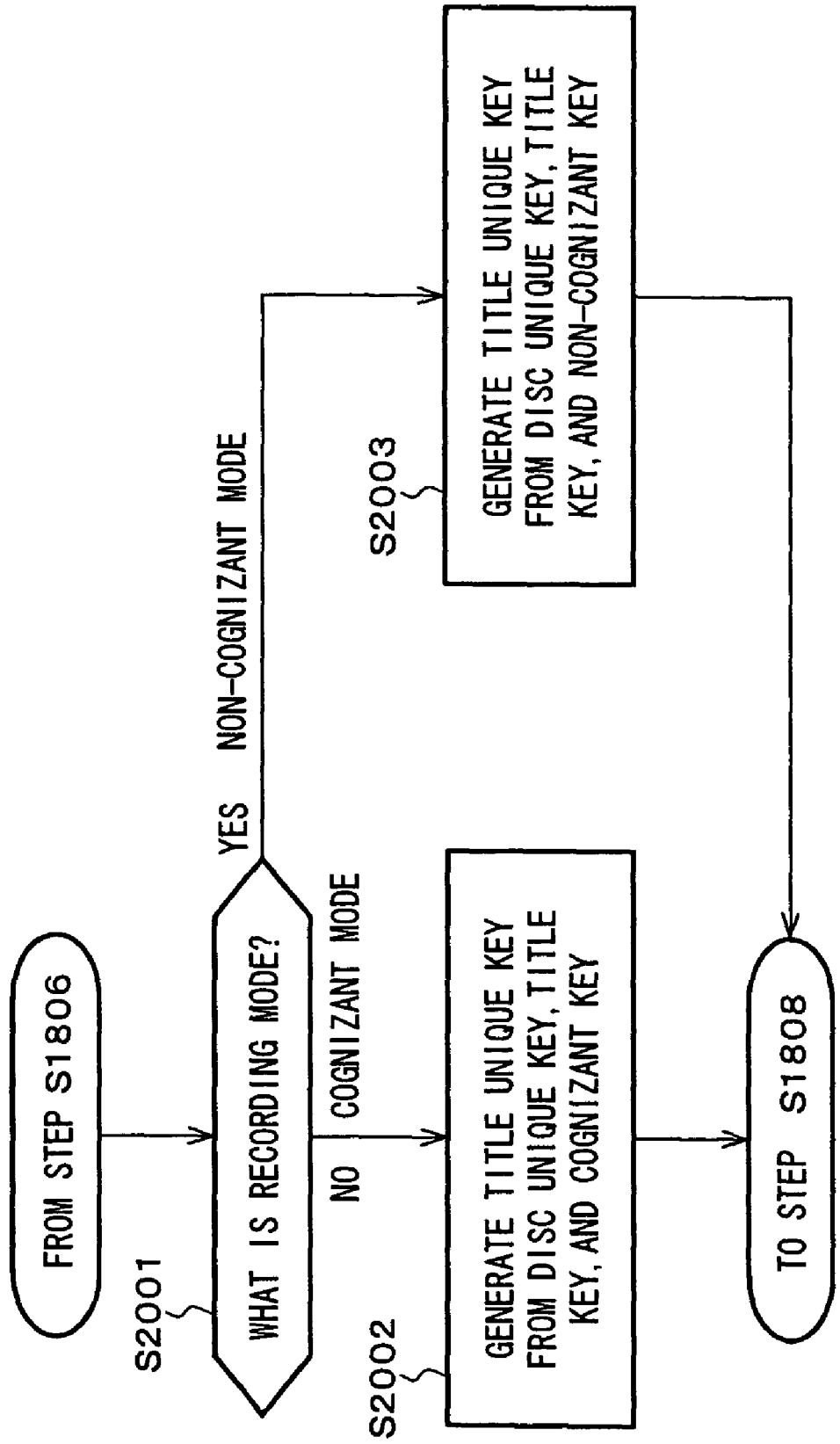
FIG. 30 shows an explanatory flowchart representing a process carried out by the recording/reproduction apparatus of the present invention to generate a title unique key.

A flowchart representing details of a process to generate a title unique key is shown in FIG. 30. The flowchart shown in FIG. 30 begins with a step S2001 at which the cryptographic processing means 150 makes a decision as to which step is to be executed in dependence on the recording mode. The decision is made on the basis a program of the recording/reproduction apparatus or a command entered by the user utilizing the recording/reproduction apparatus.

If the recording mode is recognized as the cognizant mode at the step S2001, that is, if the recording process is determined to be a cognizant recording operation, the flow of the process goes on to a step S2002 at which a title unique key is generated from the disc unique key, the title key and the cognizant key.

If the recording mode is recognized as the non-cognizant mode at the step S2001, that is, if the recording process is determined to be a non-cognizant recording operation, on the other hand, the flow of the process goes on to a step S2003 at which a title unique key is generated from the disc unique key, the title key and the non-cognizant key.

In either case, a title unique key is generated by adoption of a method using typically a SHA-1 hash function or a method using a hash function based on block encryption.

At a step S1808 of the flowchart shown in FIG. 29, the recording/reproduction apparatus receives the contents to be encrypted and recorded onto the recording medium as TS packets. Then, at the next step S1809, the TS-processing means 300 adds an ATS to each of the TS packets. An ATS is information indicating a time at which a TS packet is received. As an alternative, a combination of copy control information (CCI) such as an ATS and other information can also be added. Subsequently, the flow of the process goes on to a step S1810 to form a judgment as to whether or not the 32nd TS packet of a block or identification data indicating the last TS packet has arrived while the TS packets each including an ATS are being sequentially received. If the 32nd TS packet of a block or identification data indicating the last TS packet has arrived, the flow of the process goes on to a step S1811 at which X TS packets or TS packets ending with the last one are arranged to form a block where X=32.

Then, at the next step S1812, the cryptographic processing means 150 generates a block key from the block seed of the block and the title unique key generated at the step S1807. The block seed of a block has a size of 32 bits including an ATS at the head of the block. The block key is used as a key for encrypting the block.

Subsequently, at the next step S1813, the block data created at the step S1811 is encrypted by using the block key. It is to be noted that, as described before, the object of the encryption processing is data of only the (m+1)th to last bytes of the block. As an encryption algorithm, typically, the DES (Data Encryption Standard) prescribed by the FIPS 46-2 specifications is applied.

Then, at the next step S1814, the encrypted block data is recorded onto the recording medium. Subsequently, the flow of the process goes on to a step S1815 to form a judgment as to whether or not the entire data has been recorded onto the recording medium. If the entire data has been recorded onto the recording medium, the execution of the processing to record the data of the contents are ended. If the entire data has not been recorded onto the recording medium yet, on the other hand, the flow of the process goes back to the step S1808 to process the remaining data.

After the processing to record the data of the contents is ended, the flow of the process goes on to a step S1816 at which copyright information for the contents and a MAC to be used as a falsification check value for the copyright information are generated. Then, at the next step S1817, the copyright information and the MAC are recorded onto the recording medium. As described above, examples of the copyright information are information on an input source, information on the digital-watermark generation of the recording apparatus, information on a recording mode, strictest copy control information or copy control information at a variation point or a packet number corresponding to the variation point. One or more of the information on an input source, the information on the digital-watermark generation of the recording apparatus, the information on a recording mode, the strictest copy control information and the copy control information at a variation point or a packet number corresponding to the variation point are recorded on the recording medium as the copyright information. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents. The typical processes to generate copyright information have been described earlier by referring to FIGS. 25, 26 and 27. On the other hand, the processing to generate a MAC has been described above by referring to FIG. 28.

In the processing described above, copyright information associated with encrypted contents is recorded onto the recording medium. Thus, in an operation to reproduce and output the encrypted contents from the recording medium, the copyright information can be acquired without decrypting the encrypted contents, and the operation to reproduce and output the encrypted contents from the recording medium can therefore be carried out correctly. In addition, even when the recording medium is demounted from the contents-recording apparatus to be mounted on another recording/reproduction apparatus, it is possible to correctly identify copy control information set by the contents-recording apparatus by referring to the copyright information for the information on an input source or information on a digital-watermark generation. Thus, correct reproduction control can be executed.

Figure 31:
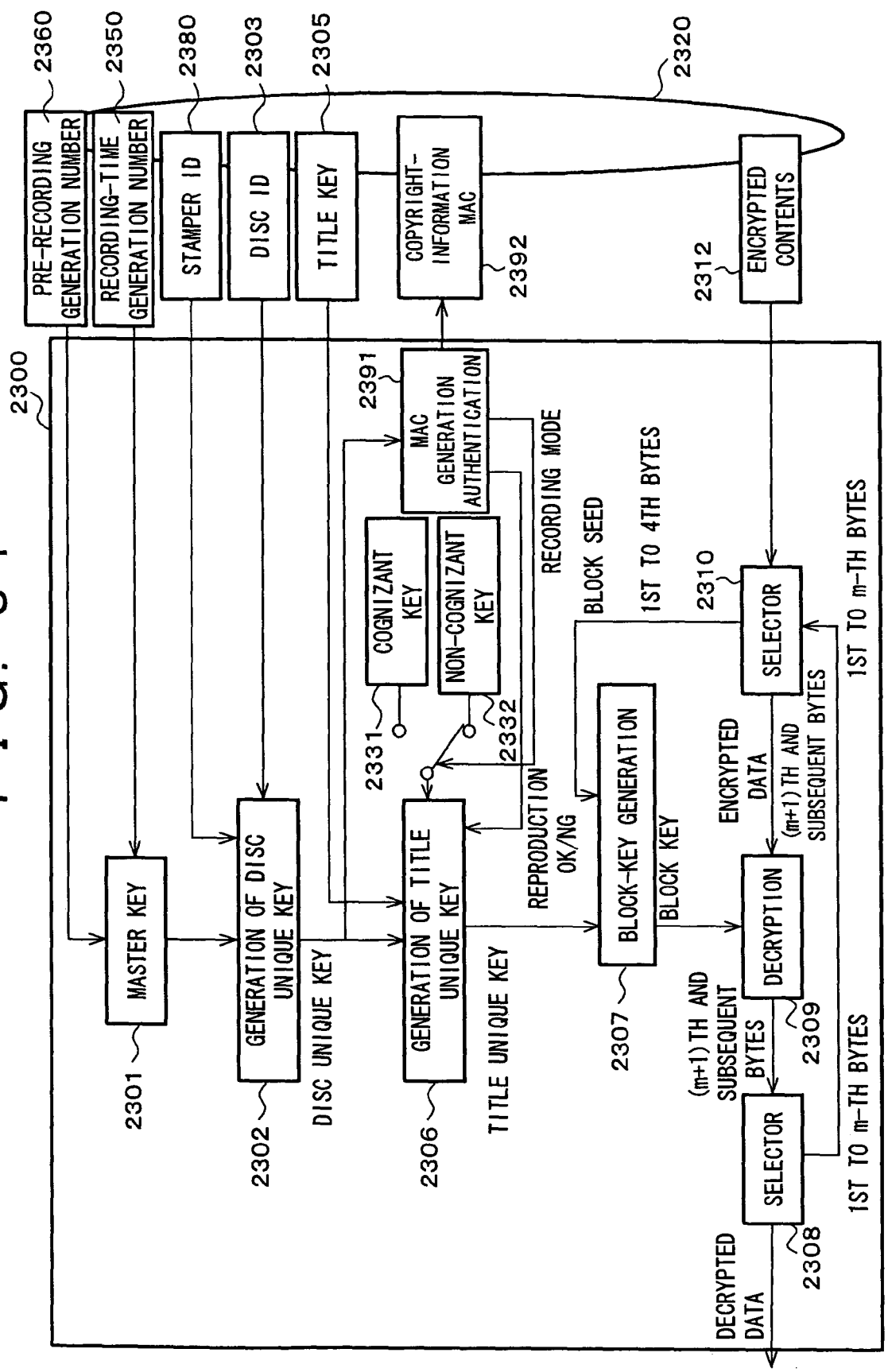
FIG. 31 is an explanatory block diagram showing a process to decrypt contents data in processing carried out by a recording/reproduction apparatus of the present invention to reproduce the data.
Figure 32:
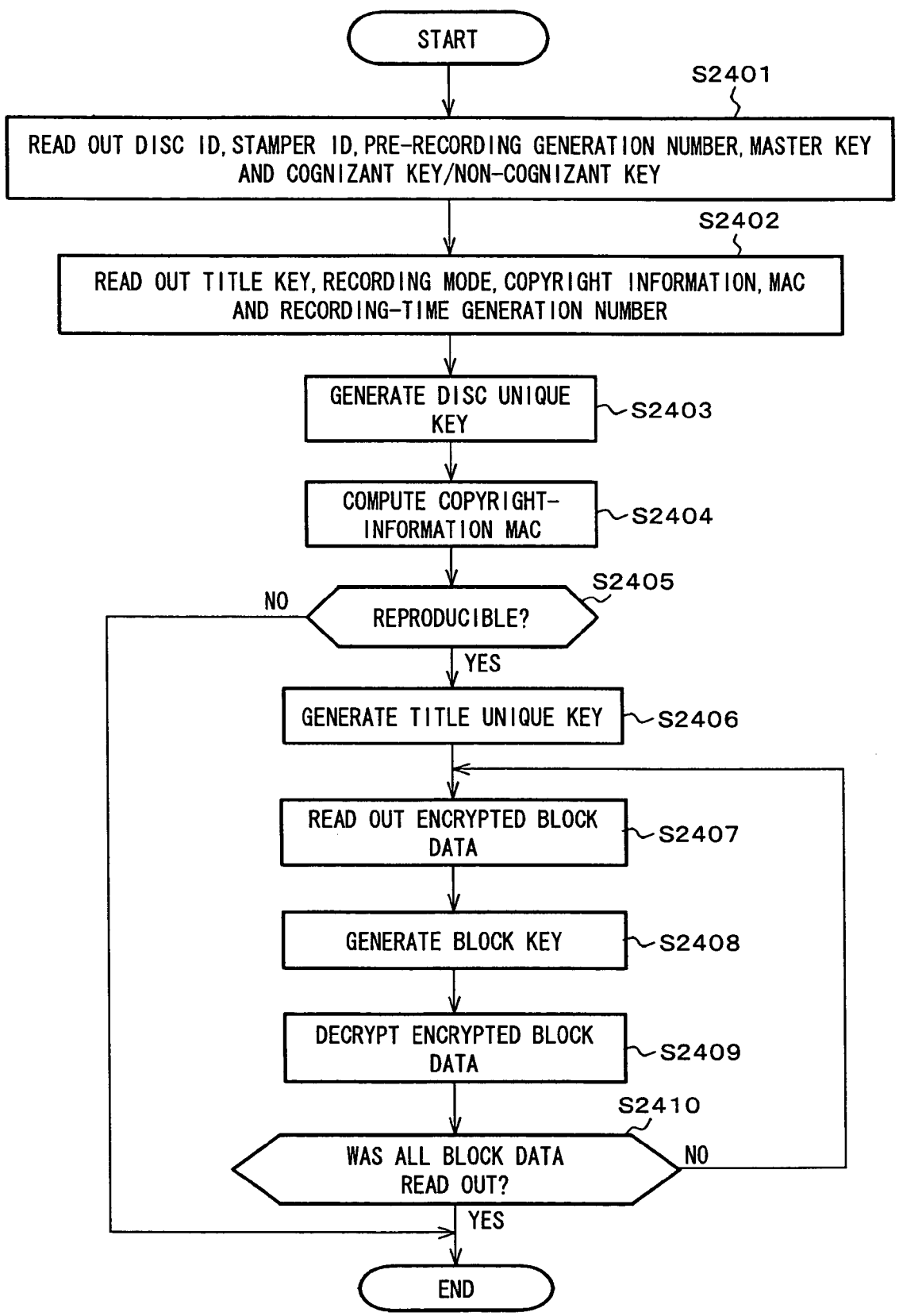
FIG. 32 shows an explanatory flowchart representing a process carried out by the recording/reproduction apparatus of the present invention to reproduce data.

By referring to a processing block diagram of FIG. 31 and a flowchart shown in FIG. 32, the following description explains a process to decrypt and reproduce encrypted contents recorded on a recording medium by using a master key as described above.

The flowchart shown in FIG. 32 represents the process to decrypt and reproduce encrypted contents recorded on a recording medium. As shown in FIG. 32, the flowchart begins with a step S2401 at which the recording/reproduction apparatus 2300 shown in FIG. 31 reads out a disc ID 2302, a pre-recording generation number 2360 and a stamper ID 2380 from a disc 2320 serving as the recording medium. In addition, the recording/reproduction apparatus 2300 also reads out a master key 2301 and a cognizant key 2331 in the case of the cognizant mode or a non-cognizant key 2332 in the case of the non-cognizant mode from a memory employed in the recording/reproduction apparatus 2300 itself. As is obvious from the previous explanation of the recording operation, the disc ID has been recorded on the disc 2320 in advance or, otherwise, the disc ID is generated by the recording/reproduction apparatus 2300 and then recorded on the disc 2320 as an identifier unique to the disc 2320.

The pre-recording generation number 2360 is disc-unique generation information recorded on the disc 2320. The pre-recording generation number 2360 is compared with a recording-time generation number 2350 to determine whether or not a reproduction operation can be carried out. The recording-time generation number 2350 is the generation number of a master key 2301 at a recording time. The master key 2301 is a secret key, which is subjected to generation management and stored in the memory of the recording/reproduction apparatus 2300 in a process represented by the flowchart shown in FIG. 17. The cognizant key 2331 in the case of the cognizant mode or the non-cognizant key 2332 in the case of the non-cognizant mode is also a secret key common to the system.

Then, at the next step S2402, the recording/reproduction apparatus 2300 reads out a title key of contents to be reproduced from the disc 2320, copyright information including an additional MAC used as a falsification check value and a generation number (generation #) of the master key 2301 used in an operation to record the contents. The generation number (generation #) of the master key 2301 used in an operation to record the contents is the generation number 2350 mentioned above. As described above, examples of the copyright information are information on an input source, information on the digital-watermark generation of the recording apparatus, information on a recording mode, strictest copy control information or copy control information at a variation point or a packet number corresponding to the variation point. One or more of the information on an input source, the information on the digital-watermark generation of the recording apparatus, the information on a recording mode, the strictest copy control information and the copy control information at a variation point or a packet number corresponding to the variation point are recorded on the recording medium as the copyright information. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents. In addition, in order to prevent the copyright information from being falsified with ease, a MAC (Message Authentication Code) to be used as a validity inspection code is added to the copyright information and recorded onto the recording medium 2320.

Then, at the next step S2403, a disc unique key is generated by using the disc ID, the master key and the stamper ID. This step corresponds to the process 2302 shown in FIG. 31. The disc unique key is generated by adoption of the methods explained earlier by referring to FIG. 21. As described above, in accordance with one of the key generation methods, the master key and the disc ID are input to a hash function including a block encryption function to generate a disc unique key. In accordance with the second key generation method, on the other hand, data obtained as a result of bit concatenation of the master key and the disc ID is input to a hash function SHA-1 conforming to FIPS 180-1 specifications to produce a 160-bit result. Then, a disc unique key with a required length is extracted from the 160-bit result. The master key used for generating the disc unique key has been read out from the recording medium 2320 at the step S2402 shown in FIG. 27. The master key is a particular master key of a generation representing a generation number at a recording time of the contents. If the recording/reproduction apparatus 2300 has a master key of a more recent generation than that of the particular master key, the disc unique key can be generated by using the master key of the more recent generation.

Then, at the next step S2404, a MAC of the copyright information is computed. FIG. 28 is a diagram showing two typical methods for generating a MAC having a size of 64 bits. As shown in FIG. 28, in accordance with one of the two MAC generation methods, a disc unique key, a title key and copyright information are input to a hash function including a 64-bit block encryption function to generate a MAC. In accordance with the second key generation method, on the other hand, data obtained as a result of bit concatenation of the disc unique key, the title key and the copyright information is input to a hash function SHA-1 conforming to FIPS 180-1 specifications to produce a 160-bit result. Then, a MAC with a required length is extracted from the 160-bit result.

If the MAC value stored in the recording medium 2320 along with the copyright information is equal to the MAC value newly generated on the basis of the copyright information read out from the recording medium 2320, the copyright information is determined to have not been falsified.

Then, the flow of the process goes on to a step S2405 to form a judgment as to whether or not the contents can be reproduced on the basis of a result of the judgment on the MAC value. Details of the judgment formed at the step S2405 are represented by a flowchart shown in FIG. 33.

Figure 33:
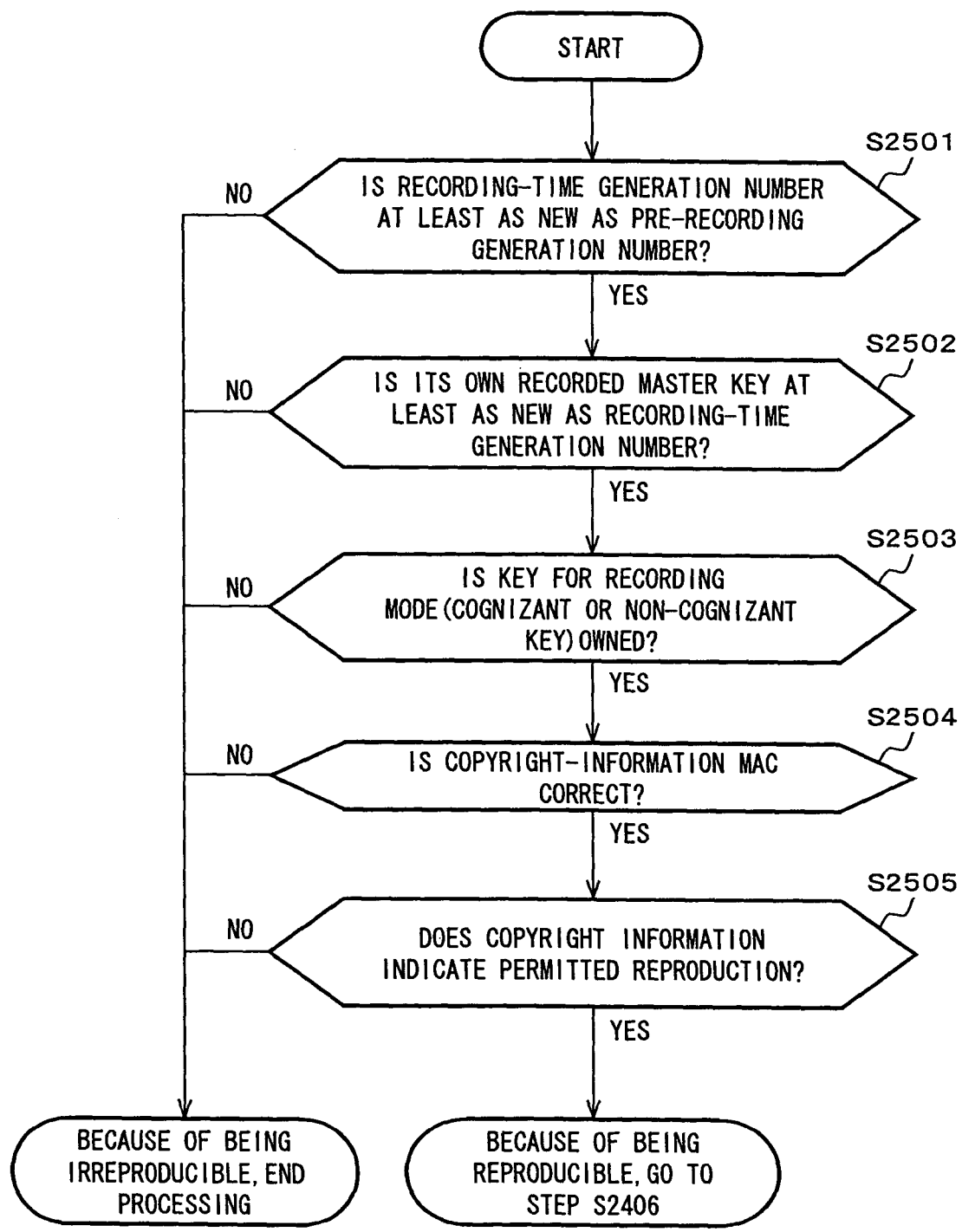
FIG. 33 shows a flowchart representing details of a process, to form a judgment on reproducibility of data, carried out by the recording/reproduction apparatus of the present invention to reproduce the data.

As shown in FIG. 33, the flowchart begins with a step S2501 at which the recording/reproduction apparatus 2300 compares the pre-recording generation number (pre-recording generation information) read out at the step S2401 with the recording-time generation number (recording-time generation information) to form a judgment as to which generation number is more recent. If the recording-time generation number represents a generation not the same as or a generation not later than a generation represented by the pre-recording generation information, that is, if the recording-time generation number represents a generation less recent than a generation represented by the pre-recording generation information, the contents are determined to be irreproducible. In this case, the execution of the process is ended without carrying out the reproduction operation by skipping a step S2406 of the flowchart shown in FIG. 32 and the subsequent steps. That is to say, if the contents recorded on the recording medium 2320 have been encrypted by using of a generation, of a master key, less recent than the generation represented by the pre-recording generation information, the reproduction of the contents are not permitted and the contents are thus not reproduced.

That is to say, an illegality is detected in the judgment formed at the step S2501. This illegality may be caused by the fact that the contents have been encrypted by an illegal recording apparatus to which a master key of the most recent generation can no longer be provided. In other words, the contents were encrypted by using a master key of an old generation and recorded on the recording medium 2320. Contents recorded by such an illegal recording apparatus onto the recording medium 2320 are not reproduced. In this way, the use of an illegal recording apparatus can be avoided.

If the outcome of the judgment formed at the step S2501 of the flowchart shown in FIG. 33 indicates that the recording-time generation number represents the same generation as or a generation later than a generation represented by the pre-recording generation information, that is, if the recording-time generation number represents a generation not less recent than a generation represented by the pre-recording generation information, on the other hand, the contents are determined to have been encrypted by using a master key of the same generation as or a generation later than a generation represented by the pre-recording generation information and thus determined to be contents not irreproducible. In this case, the flow of the process goes on to a step S2502 at which the recording/reproduction apparatus 2300 acquires the generation information of an encrypted master key C from the memory employed in the recording/reproduction apparatus 2300 itself. Then, the recording/reproduction apparatus 2300 compares the generation information of the encrypted master key C with the recording-time generation number in order to form a judgment as to which generation is more recent.

If the outcome of the judgment formed at the step S2502 indicates that the encrypted master key C's generation stored in the memory is not the same as or not later than the generation represented by the recording-time generation information, that is, the encrypted master key C's generation stored in the memory is less recent than the generation represented by the recording-time generation information, the contents are determined to be irreproducible. In this case, the execution of the process is ended without carrying out the reproduction operation by skipping the step S2406 of the flowchart shown in FIG. 32 and the subsequent steps.

If the outcome of the judgment formed at the step S2502 indicates that the encrypted master key C's generation stored in the memory is the same as or more recent than the generation represented by the recording-time generation information, that is, the encrypted master key C's generation stored in the memory is not less recent than the generation represented by the recording-time generation information, on the other hand, the flow of the process goes on to a step S2503 to form a judgment as to whether or not a key for a mode at a recording time is owned by the reproduction apparatus itself. The key for a mode at a recording time is a cognizant or non-cognizant key.

If the outcome of the judgment formed at the step S2503 indicates that a cognizant or non-cognizant key used as a key for a mode at a recording time is owned by the reproduction apparatus itself, the contents are determined to be reproducible. If the outcome of the judgment formed at the step S2503 indicates that a cognizant or non-cognizant key used as a key for a mode at a recording time is not owned by the reproduction apparatus itself, on the other hand, the contents are determined to be irreproducible. In this case, the execution of the process is ended without carrying out the reproduction operation by skipping the step S2406 of the flowchart shown in FIG. 32 and the subsequent steps.

If the outcome of the judgment formed at the step S2503 indicates that a cognizant or non-cognizant key used as a key for a mode at a recording time is owned by the reproduction apparatus itself, the flow of the process goes on to a step S2504 to form a judgment as to whether or not the MAC computed at the step S2404 of the flowchart shown in FIG. 32 is correct, that is, whether or not the MAC computed at the step S2404 of the flowchart shown in FIG. 32 is equal to the MAC stored in the recording medium. If the MACs are equal to each other, the flow of the process goes on to a step S2505. If the MACs are not equal to each other, on the other hand, the copyright information is determined to have been falsified. In this case, the execution of the process is ended without carrying out the reproduction operation.

At the step S2505, the copyright information read out from the recording medium is analyzed and used as a basis for forming a judgment as to whether or not the contents are reproducible.

Figure 34:
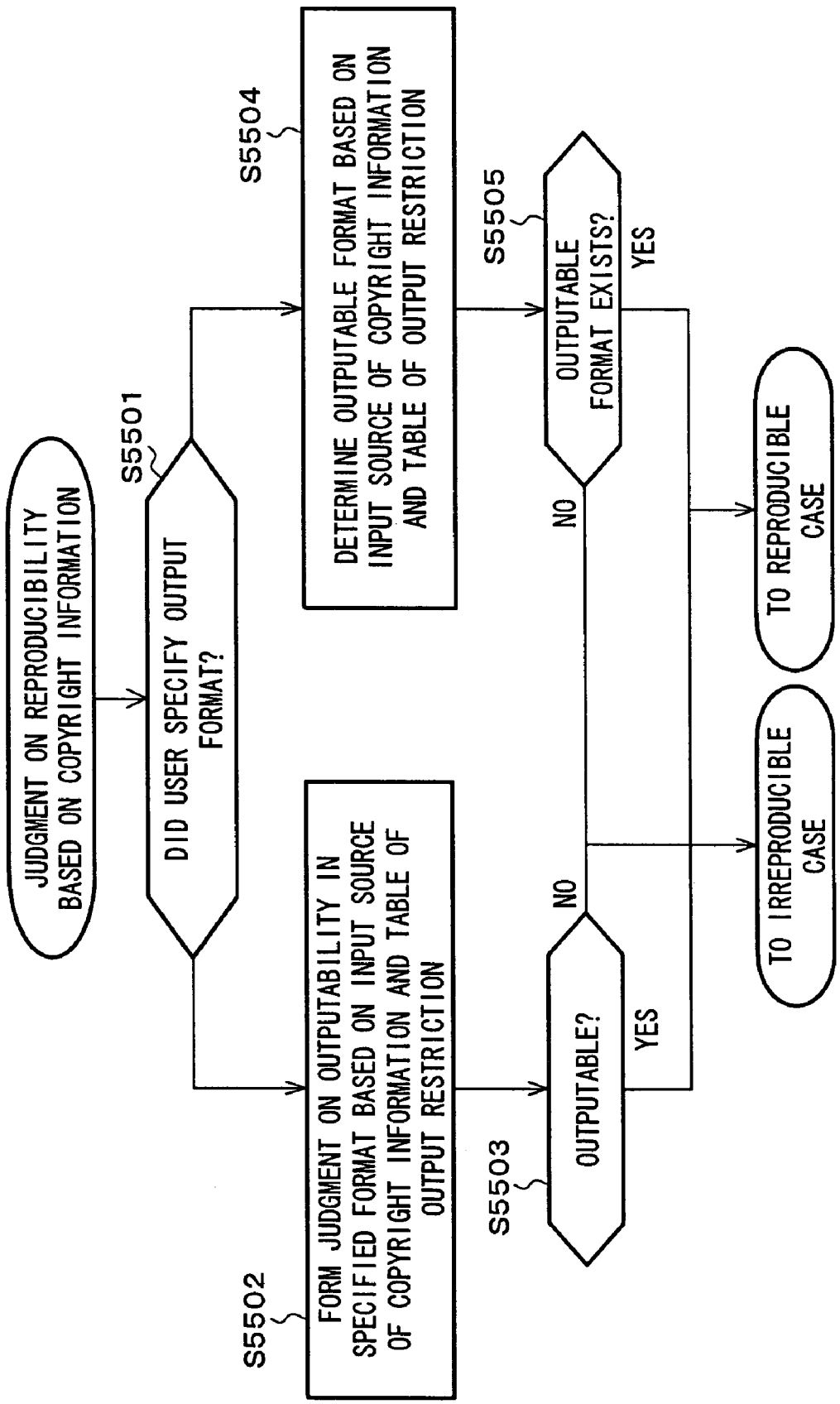
FIG. 34 shows a flowchart representing a first typical process to form a judgment on reproducibility of data on the basis of copyright information carried out by the recording/reproduction apparatus of the present invention to reproduce the data.
Figure 35:
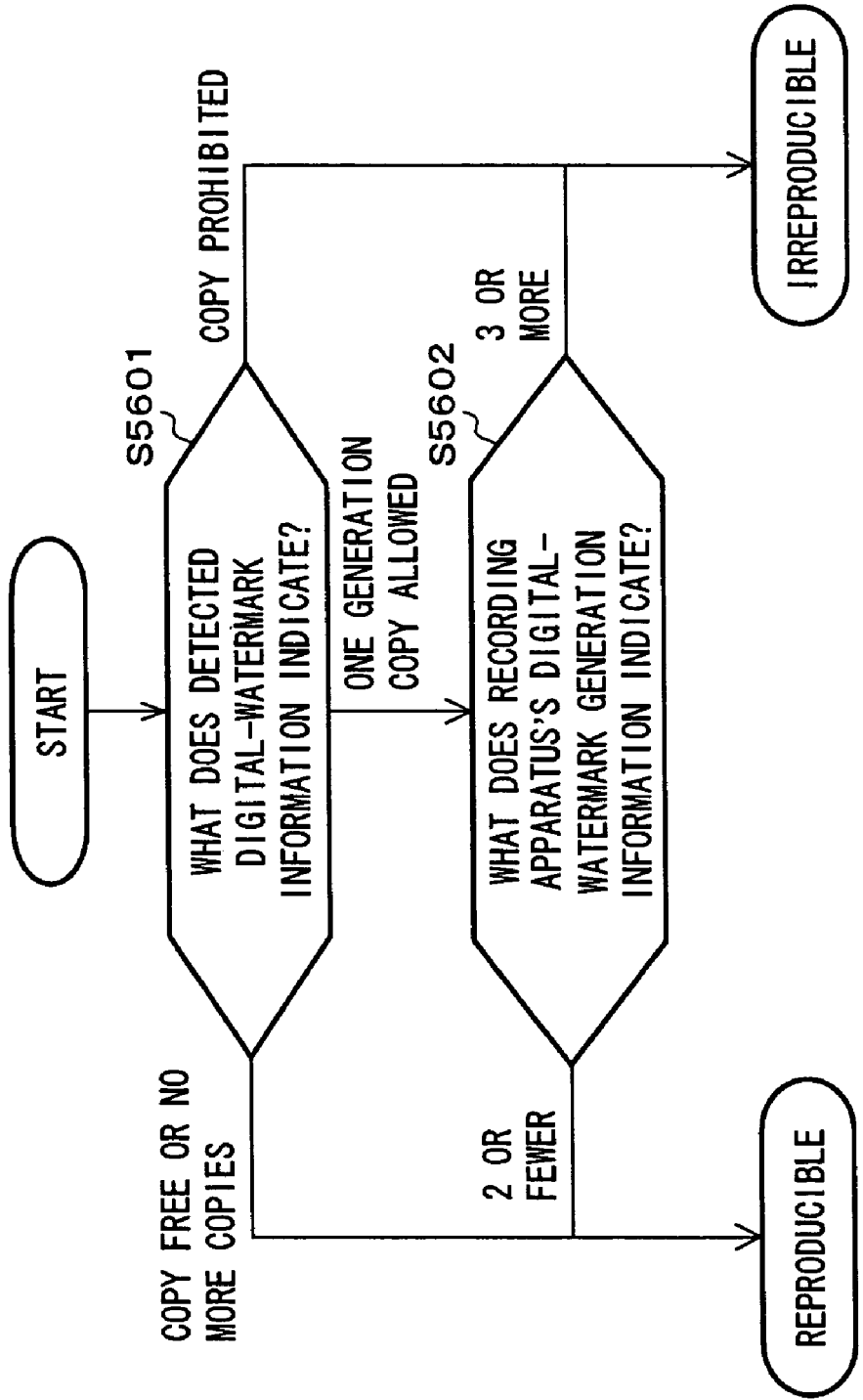
FIG. 35 shows a flowchart representing a second typical process to form a judgment on reproducibility of data on the basis of copyright information carried out by the recording/reproduction apparatus of the present invention to reproduce the data.
Figure 36:
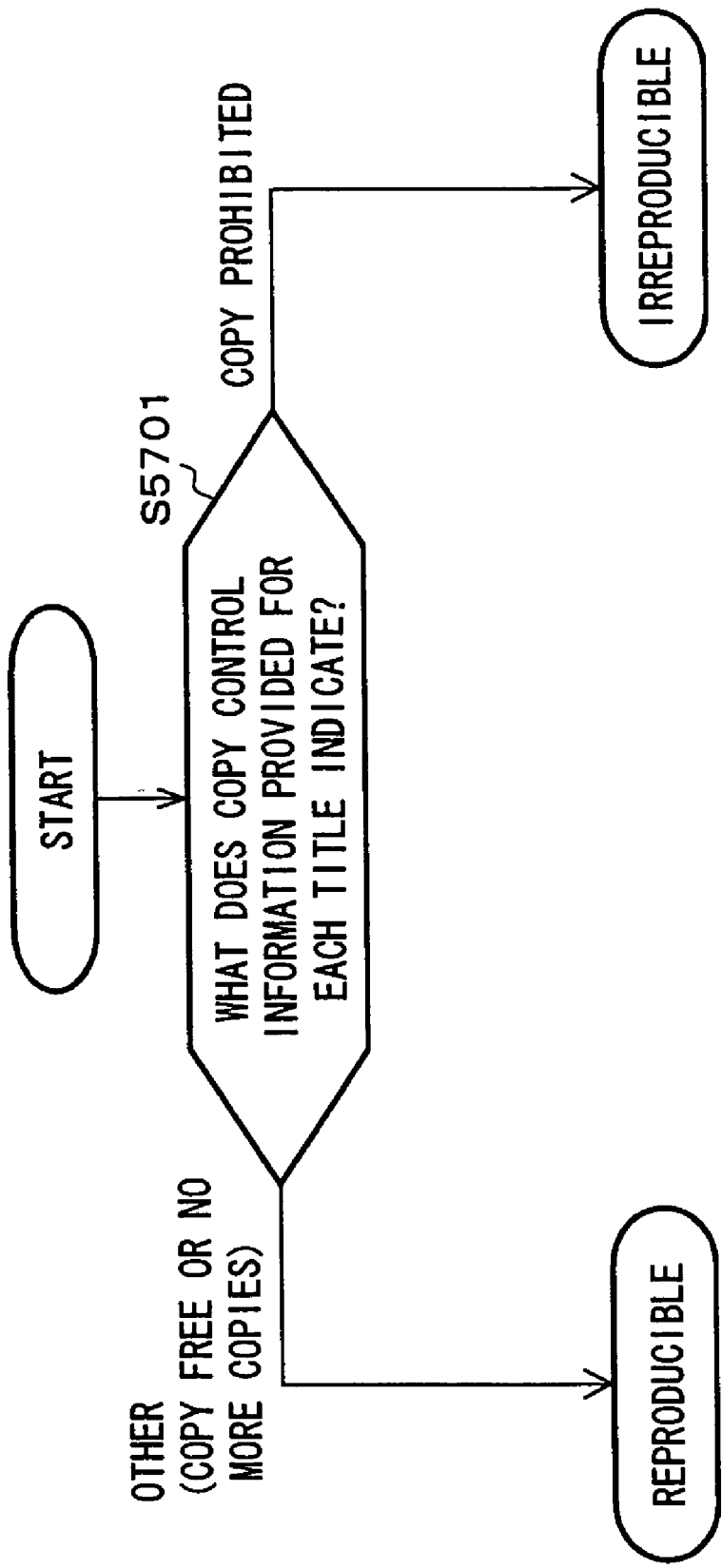
FIG. 36 shows a flowchart representing a third typical process to form a judgment on reproducibility of data on the basis of copyright information carried out by the recording/reproduction apparatus of the present invention to reproduce the data.

As described above, the copyright information can include any ones of various kinds of information, and a variety of judgments on the reproducibility of contents can be formed in dependence on the kind of the copyright information. FIG. 34 shows a processing flowchart representing a judgment on the reproducibility of contents, which is formed on the basis of information on an input source included in the copyright information. FIG. 35 shows a processing flowchart representing a judgment on the reproducibility of contents, which is formed on the basis of information on a digital-watermark generation included in the copyright information. FIG. 36 shows a processing flowchart representing a judgment on the reproducibility of contents, which is formed on the basis of the copyright information's copy control information provided for each title. A judgment on the reproducibility of contents is formed in accordance with one or more flowcharts selected among those shown in FIGS. 34, 35 and 36 in dependence on which information is included in the copyright information.

First of all, a judgment on the reproducibility of contents is explained by referring to the flowchart shown in FIG. 34. As described above, FIG. 34 shows a processing flowchart representing a judgment on the reproducibility of contents, which is formed on the basis of information on an input source included in the copyright information. The flowchart begins with a step S5501 to form a judgment as to whether or not the user has specified an output format. Examples of the output format are a digital output through an IEEE-1394 I/F, an output conforming to the 5C-DTCP specifications, a digital output through a USB I/F and an analog output through an analog I/F.

If the user has specified an output format, the flow of the judgment procedure goes on to a step S5502 at which the copyright information for the contents to be reproduced from the recording medium 2320 is referred to for information on an input source. The information on an input source is examined in order to form a judgment as to whether or not an output can be generated on the basis of information on restrictions imposed on the output for the input source. The information on restrictions imposed on the output for the input source has been stored in advance in a memory employed in the recording/reproduction apparatus 2300. The output-restriction information stored in advance in the memory is similar to the information on restrictions imposed on outputs for input sources, which has been explained earlier by referring to the table shown in FIG. 11.

Assume for example that the output specified by the user is an output conforming to the 5C-DTCP specifications. If the input-source information included in the copyright information of the contents to be reproduced (or output) indicates an input source conforming to the 5C-DTCP specifications, the restriction on the output is described on the first row of the table shown in FIG. 11. In this case, since the output specified by the user satisfies the output restriction described on the first row of the table shown in FIG. 11, an operation to output the reproduced contents is permitted. As another example, assume that the output specified by the user is a digital output. If the input-source information included in the copyright information of the contents to be reproduced (or output) indicates a BS input source, the restriction on the output is described on the second row of the table shown in FIG. 11. Since the second row of the table shown in FIG. 11 describes a rule prohibiting a digital output, the contents are not reproduced.

At a step S5503, a restriction on an output for the input source included in the copyright information is examined in order to form a judgment as to whether or not it is possible to output the reproduced contents.

If the outcome of the judgment formed at the step S5501 indicates that the user specifies no output format, on the other hand, the flow of the judgment procedure goes on to a step S5504 at which the copyright information for the contents to be reproduced from the recording medium 2320 is referred to for information on an input source. Then, at the next step S5505, information on an input source is examined in order to form a judgment as to whether or not an output can be generated on the basis of the information on restrictions imposed on the output for the input source. As described above, the information on restrictions imposed on outputs for the input source has been stored in advance in a memory employed in the recording/reproduction apparatus 2300, and is similar to the information on restrictions imposed on outputs for input sources, which has been explained earlier by referring to the table shown in FIG. 11. If the information on restrictions imposed on outputs indicates existence of a possible output for the input source, the outcome of the judgment formed at the step S5505 is Yes. In this case, an operation to output the reproduced contents is permitted. If the information on restrictions imposed on outputs indicates no possible output for the input source, on the other hand, the outcome of the judgment formed at the step S5505 is No. In this case, the contents are not reproduced.

Next, a judgment on the reproducibility of contents is explained by referring to the flowchart shown in FIG. 35. As described above, FIG. 35 shows a processing flowchart representing a judgment on the reproducibility of contents, which is formed on the basis of information on a digital-watermark generation included in the copyright information. The information on a digital-watermark generation indicates the generation of the recording apparatus, which was used for recording the contents to be reproduced. As described above, the generation of the recording apparatus can be the first generation indicating that the recording apparatus is an apparatus of the first generation, the second generation indicating that the recording apparatus is an apparatus of the second generation or the third generation indicating that the recording apparatus is an apparatus of the third generation. The information on a digital-watermark generation was included in the copyright information for the contents in an operation to record the contents.

It is to be noted that this judgment is effective for an apparatus, which detects a digital watermark from contents. This judgment is formed only by a recording/reproduction apparatus of the so-called second or third generation described earlier as the digital-watermark generation. In the case of such an apparatus, which detects and embeds a digital watermark from and into decrypted contents instead of encrypted contents, the judgment process represented by the flowchart shown in FIG. 35 is carried out after a step S2409 of the flowchart shown in FIG. 32, at which data of a block is decrypted. In the case of an apparatus, which detects and embeds a digital watermark from and into encrypted contents, on the other hand, the judgment process represented by the flowchart shown in FIG. 35 is carried out at the step S2405 of the flowchart shown in FIG. 32, at which a judgment on reproducibility of the contents is formed.

The flowchart shown in FIG. 35 begins with a step S5601 to form a judgment as to whether the detected digital watermark indicates copy control information of Copy Prohibited, One Generation Copy Allowed, or other status, which is Copy Free or No More Copies. If the detected digital watermark indicates the copy control information of Copy Prohibited, the operations to reproduce and output the contents are determined to be prohibited operations. If the detected digital watermark indicates the copy control information of Copy Free or No More Copies, the contents are determined to be reproducible. If the detected digital watermark indicates the copy control information of One Generation Copy Allowed, the flow of the judgment process goes on to a step S5602 at which information on the digital-watermark generation of the recording apparatus used for recording the contents is fetched from the copyright information. If the information on the digital-watermark generation of the recording apparatus used for recording the contents reveals the second generation or an earlier generation, the contents are determined to be reproducible. If the information on the digital-watermark generation of the recording apparatus used for recording the contents reveals the third generation or a later generation, on the other hand, the operations to reproduce and output the contents are determined to be prohibited operations.

The judgment formed at the step S5602 is based on the following rational. In the case of contents recorded by a recording apparatus of the second generation, the digital watermark of the contents is not updated. Thus, a primary mark of 10 in the contents copied to a user-writable recording medium remains unchanged as it is, indicating the copy control information of One Generation Copy Allowed. In the case of contents recorded by a recording apparatus of the third generation, on the other hand, the digital watermark of the contents is updated. That is to say, a primary mark of 10 indicating the copy control information of One Generation Copy Allowed for the contents copied to a user-writable recording medium is updated to 101 indicating the copy control information of Copy Prohibited.

As described above, the reproduction apparatus for reproducing contents is capable of knowing what recording process was carried out by the recording apparatus on the contents by obtaining information on the digital-watermark generation of the recording apparatus used for recording the contents from the copyright information. If the information on the digital-watermark generation of the recording apparatus used for recording the contents is determined to be information revealing the second generation, for example, the reproduction apparatus reproduces the contents. The processing to form a judgment on the generation of a recording apparatus allows accurate copy control to be executed on the basis of digital-watermark information even if the contents are recorded and to be reproduced by apparatus of different generations.

Next, a judgment on the reproducibility of contents is explained by referring to the flowchart shown in FIG. 36. As described above, FIG. 36 shows a processing flowchart representing a judgment on the reproducibility of contents, which is formed on the basis of the copyright information's copy control information provided for each title. As explained earlier, the copyright information's copy control information provided for each title is strictest CCI among pieces of copy control information obtained from the contents.

The flowchart shown in FIG. 36 begins with a step S5701 at which the copy control information provided for each title is obtained from the copyright information of the contents to be reproduced and used as a basis for forming a judgment on reproducibility of the contents. If the copy control information provided for each title reveals the control status of Copy Prohibited, the contents are determined to be irreproducible. If the copy control information provided for each title reveals the control status other than the control status of Copy Prohibited, on the other hand, the contents are determined to be reproducible.

As described above, the flowcharts shown in FIGS. 34, 35 and 36 are each a flowchart representing individually a judgment process based on only a type of information included in the copyright information. If the copyright information recorded on a recording medium, being associated with contents to be reproduced from the recording medium includes a plurality of information types, however, it is possible to provide a configuration in which judgment processes each based on a type of information can be carried out sequentially or concurrently to determine whether contents are reproducible or irreproducible, and the contents are eventually determined to be reproducible only if all the judgment processes each result in an outcome indicating reproducible contents. If even only one of the judgment processes results in an outcome indicating irreproducible contents, on the other hand, the contents are determined to be irreproducible.

The flowcharts shown in FIGS. 34, 35 and 36 each represent details of the judgment on reproducibility of the contents, which is formed at the step S2505 of the flowchart shown in FIG. 33 on the basis of copyright information. The flowchart shown in FIG. 33 in turn represents details of the judgment on reproducibility of the contents, which is formed at the step S2405 of the flowchart shown in FIG. 32. If all the judgment processes represented by the flowcharts shown in FIGS. 33, 34, 35 and 36 each result in an outcome indicating reproducible contents, the flow of the process goes on from the step S2405 to a step S2406 of the flowchart shown in FIG. 32. It is to be noted that, in the case of a digital watermark detected from decrypted contents, the judgment on reproducibility based on the digital watermark is carried out after the step S2409 of the flowchart shown in FIG. 32, at which data of a block is decrypted.

Figure 37:
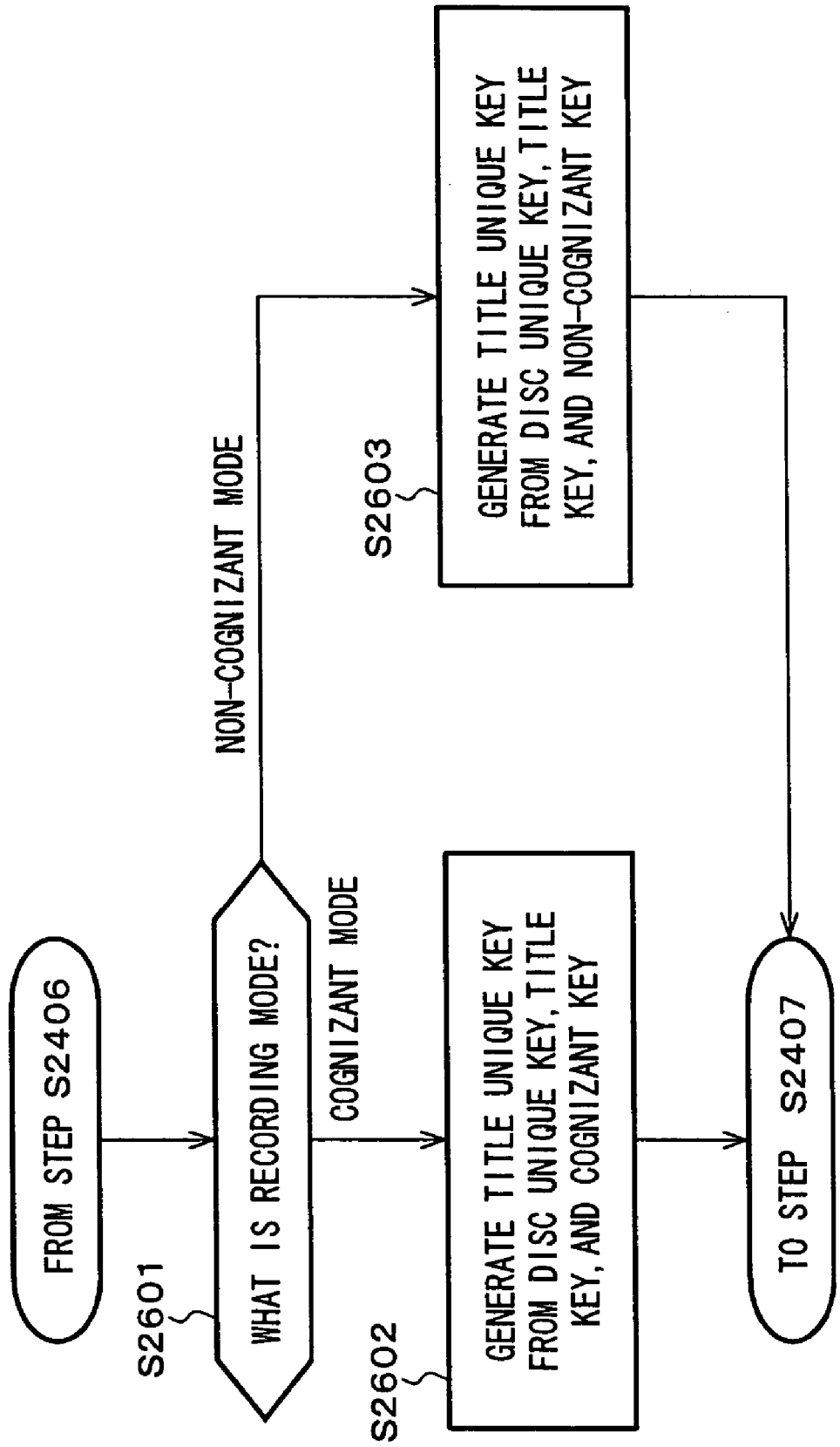
FIG. 37 is an explanatory block diagram showing a process to generate a title unique key in processing carried out by the recording/reproduction apparatus of the present invention to reproduce the data.

Refer back to the flowchart shown in FIG. 32. The explanation of the process to reproduce contents is continued. At the step S2406, a title unique key is generated. Details of a process to generate a title unique key are represented by a flowchart shown in FIG. 37. As shown in the figure, the flowchart begins with a step S2601 at which the cryptographic processing means 150 forms a judgment as to whether the recording mode of the recording/reproduction apparatus is the cognizant or non-cognizant mode. The judgment is based on a recording mode included in the copyright information read out from the disc.

If the outcome of the judgment formed at the step S2601 reveals that the recording mode of the recording/reproduction apparatus is the cognizant mode, the flow of the process goes on to a step S2602 at which the title unique key is generated from the disc unique key, the title key and the cognizant key.

If the outcome of the judgment formed at the step S2601 reveals that the recording mode of the recording/reproduction apparatus is the non-cognizant mode, on the other hand, the flow of the process goes on to a step S2603 at which the title unique key is generated from the disc unique key, the title key and the non-cognizant key.

In either case, a title unique key is generated by adoption of a method using typically a SHA-1 hash function or a method using a hash function based on block encryption.

As described above, a disc unique key is generated from a master key, a stamper ID and a disc ID, and then used for generating a title unique key in conjunction with a title key and a cognizant key in the case of the cognizant mode selected as the recording mode or a non-cognizant key in the case of the non-cognizant mode selected as the recording mode. It is to be noted, however, that a title unique key can also be generated directly from a master key, a stamper ID, a disc ID, a title key and a cognizant key in the case of the cognizant mode selected as the recording mode or a non-cognizant key in the case of the non-cognizant mode selected as the recording mode without generating a disc unique key. As an alternative, a key equivalent to a title unique key can also be generated from a master key, a stamper ID, a disc ID, and a cognizant key in the case of the cognizant mode selected as the recording mode or a non-cognizant key in the case of the non-cognizant mode selected as the recording mode without using a title key.

Then, at a step S2407, block data is read out from the encrypted contents 2312 stored on the disc. Subsequently, at the next step S2408, a selector 2310 separates a block seed from the block. As described earlier, the block seed is data of the 4 bytes at the head of the block. A block key is then generated from the block seed and the title unique key generated at the step S2406.

The block key is generated by adoption of either of the methods shown in FIG. 24. In accordance with either of the methods, a block key having a size of 64 bits is generated from the block seed with a size of 32 bits and the title unique key also having a size of 64 bits.

In the example described above, a disc unique key, a title unique key and a block key are each generated sequentially one key after another. It is to be noted, however, that a disc unique key and a title unique key do not have to be generated for example. In this case, a block key is generated for each block directly from a master key, a stamper ID, a disc ID, a title key, a block seed and a cognizant key for a cognizant mode or a non-cognizant key for a non-cognizant mode.

Subsequently, at the next step S2409, the block data extracted at the step S2407 is decrypted by using the block key in a process 2309 and data obtained as a result of decryption is output by way of a selector 2308. It is to be noted that the result of decryption includes an ATS added to each of transport packets composing a transport stream of the contents. In the TS-processing means 300 described earlier, a stream process based on the ATS is carried out. Finally, data obtained as a result of the stream process is used typically for displaying a picture and reproducing music.

As described above, it is possible to decrypt contents encrypted in block units and recorded on a recording medium in a reproduction process in block units by using block keys each generated on the basis of a block seed including an ATS. After the block data is decrypted by using the block key, the flow of the process goes on to a step S2410 to form a judgment as to whether or not all block data of the contents has been processed. If all block data of the contents has been processed, the execution of the process is completed. If all block data of the contents has not been processed, on the other hand, the flow of the process goes back to the step S2407.

As shown in FIG. 31, the recording/reproduction apparatus described above has a typical configuration allowing both a cognizant key for encryption and decryption processes in the cognizant mode and a non-cognizant key for encryption and decryption processes in the non-cognizant mode to be used selectively. It is to be noted, however, that in the case of a recording/reproduction apparatus having only one of the keys, that is, in the case of a recording/reproduction apparatus having only either a cognizant key or a non-cognizant key, on the other hand, only the cognizant mode or the non-cognizant mode that corresponds to the stored key is executed to generate a block key to be used for decrypting the contents.

As described above, the reproduction apparatus serving as the information-processing apparatus provided by the present invention forms a judgment as to whether or not contents can be reproduced and output in a reproduction operation. The judgment is based on copyright information generated for the contents and stored. As explained earlier, examples of the copyright information are information on an input source, information on the digital-watermark generation of the recording apparatus, information on a recording mode, strictest copy control information or copy control information at a variation point or a packet number corresponding to the variation point. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents. One or more of the information on an input source, the information on the digital-watermark generation of the recording apparatus, the information on a recording mode, the strictest copy control information and the copy control information at a variation point or a packet number corresponding to the variation point are used for forming the judgment as to whether or not the contents can be reproduced.

In addition, by using the copyright information's copy control information provided for each title, the process to copy contents can be carried out with a high degree of efficiency. That is to say, in the reproduction process described above, each of block data is decrypted and output. If the entire contents are in the status of Copy Free, however, the contents can be copied to another apparatus without the need to detect copy control information (CCI) added to each block and a digital watermark of the contents without raising any problems.

By using the stored copyright information's copy control information provided for each title, it is possible to form a judgment as to whether or not the entire contents to be reproduced is in the status of Copy Free. As described above, the stored copyright information's copy control information provided for each title is strictest CCI among pieces of copy control information obtained from the contents. Thus, if the stored copyright information's copy control information provided for each title reveals the status of Copy Free, the entire contents can be copied with a high degree of freedom. As a result, the contents can be copied to another apparatus without the need to detect copy control information (CCI) added to each of block data.

Figure 38:
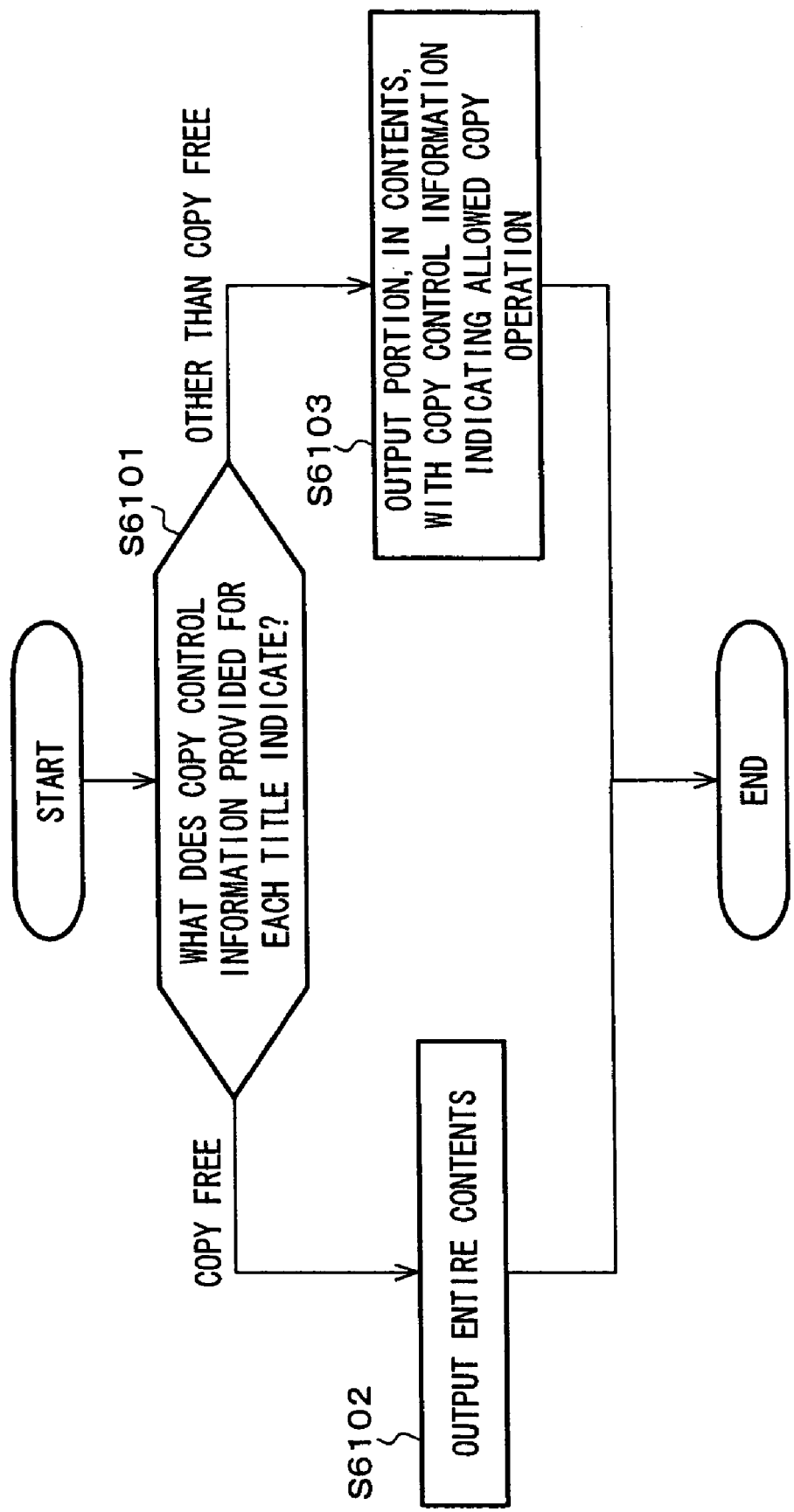
FIG. 38 shows a flowchart representing a first typical process carried out by the recording/reproduction apparatus of the present invention to reproduce the data on the basis of copyright information.

FIG. 38 shows a flowchart representing a process to reproduce and output contents by examining copy control information provided for each title. As shown in FIG. 38, the flowchart begins with a step S6101 at which copy control information provided for each title is obtained from the copyright information provided for the contents to be reproduced, and examined to form a judgment as to whether or not the copy control information provided for each title reveals the status of Copy Free. If the copy control information provided for each title reveals the status of Copy Free, the flow of the process goes on to a step S6102 at which the entire contents are reproduced and output. In this case, a judgment on the CCI for each of block data is not required. Thus, the decryption process can also be eliminated as well. If the copy control information provided for each title does not reveal the status of Copy Free, on the other hand, the flow of the process goes on to a step S6103 at which only portions, of the contents, allowed to be copied are extracted and output. In this case, it is necessary to carry out predetermined processes such as detection of each piece of CCI and a digital watermark.

In addition, in order to allow contents including various kinds of copy control information to be copied at a high speed, variation-point information of the contents is included in the copyright information of the contents. As described earlier by referring to FIG. 13, the variation-point information of the contents is copy control information at variation points or TS packet numbers corresponding to the variation points.

Figure 39:
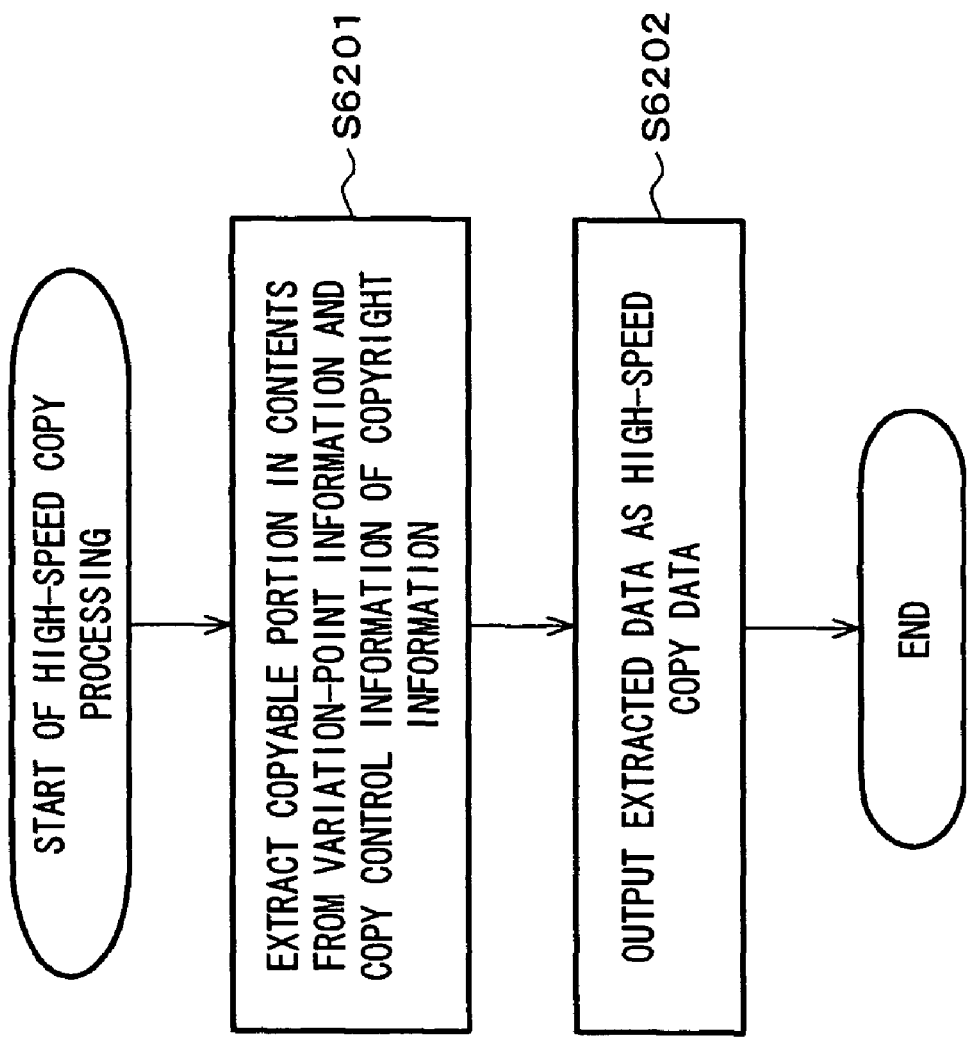
FIG. 39 shows a flowchart representing a second typical process carried out by the recording/reproduction apparatus of the present invention to reproduce the data on the basis of copyright information.

FIG. 39 shows a flowchart representing a process to reproduce and output contents by examining copy control information at variation points. As shown in FIG. 39, the flowchart begins with a step S6201 at which copy control information at variation points is obtained from the copyright information provided for the contents to be reproduced. The portions, of the contents, allowed to be copied are determined on the basis of the obtained copy control information at variation points and extracted from the contents. An example of the portions allowed to be copied is the portions each indicated by the status of Copy Free. To put it concretely, the portions allowed to be copied are extracted from the contents on the basis of packet numbers.

Then, at the next step S6202, the portions allowed to be copied, which are extracted from the contents at the step S6201, are output selectively. In this case, since the extracted portions are each clearly allowed to be copied, a judgment on the CCI for each of block data is not required. Thus, the decryption process can also be eliminated as well. However, a process to update CCI or a digital watermark may be carried out if necessary.

As described above, the copy control status of contents can be determined by obtaining copy control information provided for each title and/or obtaining copy control information at variation points from copyright information provided for the contents. Thus, the process to reproduce and output the contents can be carried out with a high degree of efficiency.

8: Recording and Reproduction of Contents by Cryptographic Processing by Using Media Key The embodiment described above implements a recording/reproduction apparatus in a system having a configuration in which a master key is distributed to apparatus in the system by transmitting an EKB (Enabling Key Block) to the apparatus and used in operations to record and reproduce data.

A master key for a point of time is a key effective for all operations to record data at the point of time. A recording/reproduction apparatus capable of obtaining a master key for a point of time is capable of decrypting data recorded in the system at the point of time or a time prior to the point of time. Since a master key has a property of being effective for the entire system, however, there is raised a problem that exposure of a master key to a hacker will have a bad effect also on the entire system.

In place of a master key with a property of being effective for the entire system, a media key effective only for a recording medium can be distributed to apparatus employing the recording medium in the system by transmitting an EKB (Enabling Key Block) to the apparatus in order to reduce the effect of an exposed key on the system. A second embodiment described below implements a system in which a media key is used as a substitute for a master key. However, only the second embodiment's differences from the first embodiment are explained.

Figure 40:
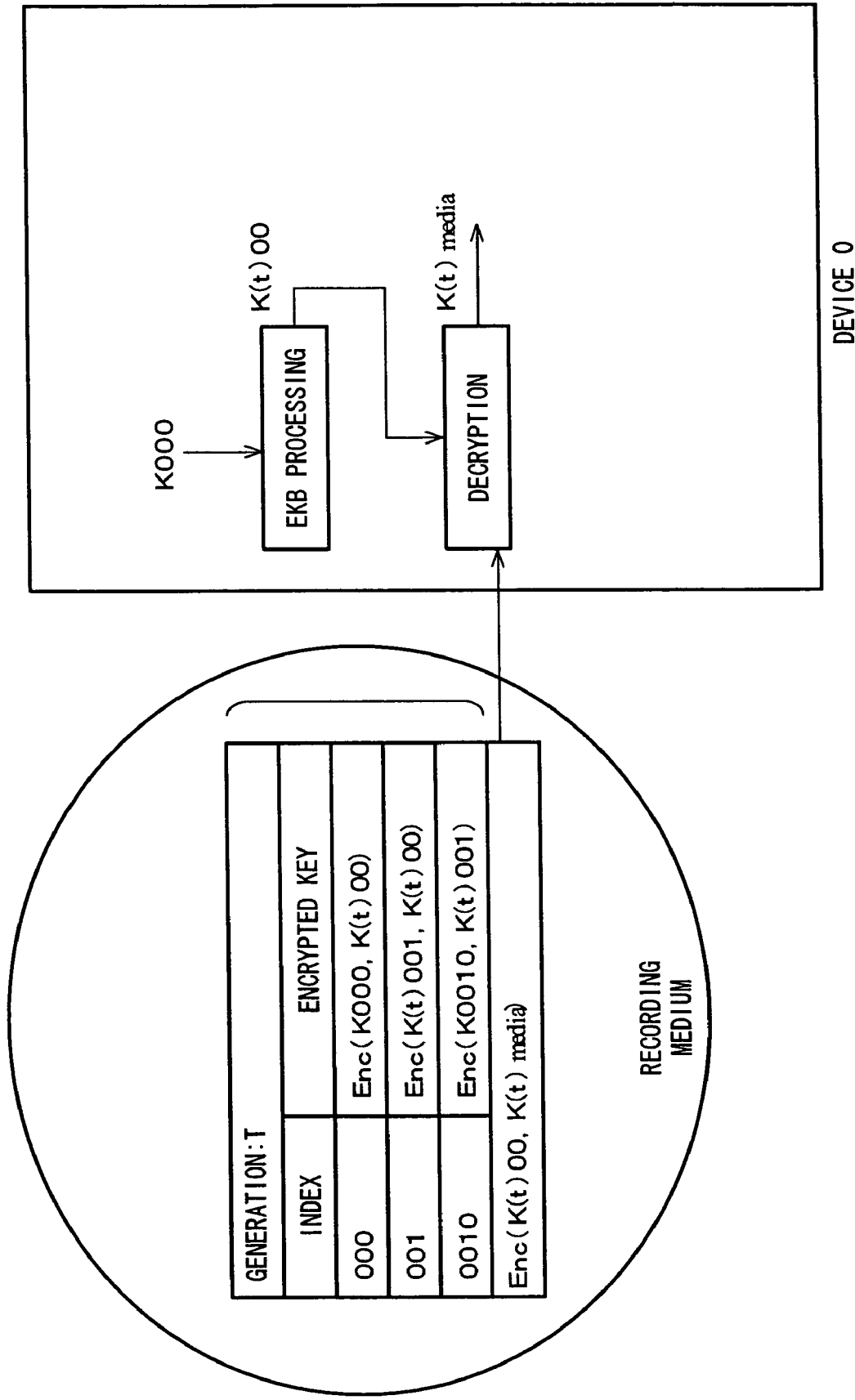
FIG. 40 shows a diagram representing a process carried out by the recording/reproduction apparatus of the present invention to decrypt a media key by using an enabling key block (EKB) distributed to the recording/reproduction apparatus.

Much like FIG. 16, FIG. 40 shows a process carried out by a device 0 to obtain a new media key K(t)media from an EKB at a generation t by using a leaf key K0000 as well as node keys K000 and K00. The leaf key K0000 as well as node keys K000 and K00 have been stored in a memory employed by the device 0 itself. To put it in detail, the leaf key K0000 as well as node keys K000 and K00 are used for obtaining a renewed node key K(t)00, which is then used to obtain the new media key K(t)media. The new media key K(t)media is used for recording and reproducing data onto and from a recording medium associated with the new media key K(t)media.

It is to be noted that a pre-recording generation number (Generation #n) in the media key shown in FIG. 40 is not mandatory since, unlike the case of the master key, there is no concept of more and less recent generations. That is to say, the pre-recording generation number (Generation #n) is merely set as an option.

When a recording medium is mounted on a recording/reproduction apparatus for the purpose of recording or reproducing data onto or from the recording medium, the recording/reproduction apparatus finds a media key K(t)media by carrying out a process represented by a flowchart shown in FIG. 41 and uses the media key for making an access to the recording medium later.

Figure 41:
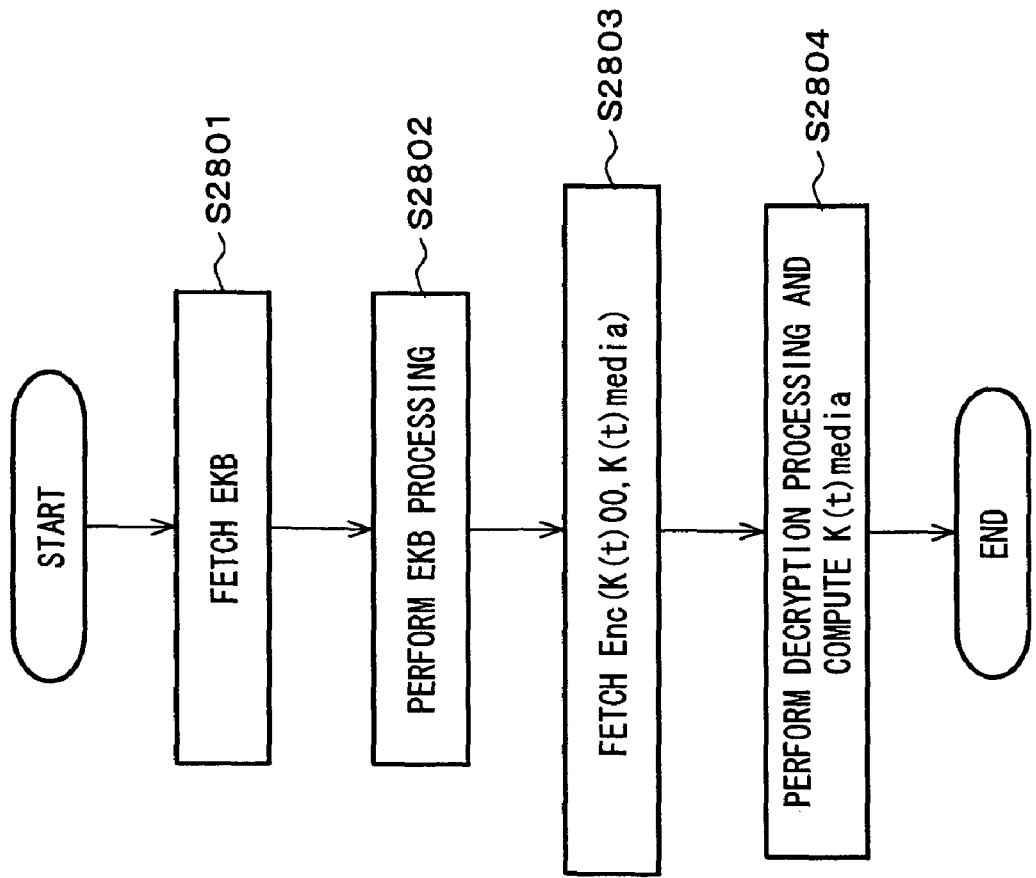
FIG. 41 shows a flowchart representing a process carried out by the recording/reproduction apparatus of the present invention to decrypt a media key by using an enabling key block (EKB)

An EKB is fetched and an EKB process is carried out at respectively steps S2801 and S2802 of the flowchart shown in FIG. 41 in the same way as respectively the steps S1403 and S1404 of the flowchart shown in FIG. 17.

Then, at the next step S2803, the recording/reproduction apparatus reads out encrypted data Enc(K(t)00, K(t)media) from the recording medium. As described earlier, the encrypted data Enc(K(t)00, K(t)media) is a result of encrypting the media key K(t)media by using a node key K(t)00. Subsequently, at the next step S2804, the recording/reproduction apparatus decrypts the encrypted data Enc(K(t)00, K(t)media) to produce the media key K(t)media. If the recording/reproduction apparatus has been deleted or revoked from the group in the tree shown in FIG. 14, the recording/reproduction apparatus will not be capable of obtaining the media key K(t)media and thus incapable of recording and reproducing data onto and from a recording medium associated with the media key K(t)media.

Figure 42:
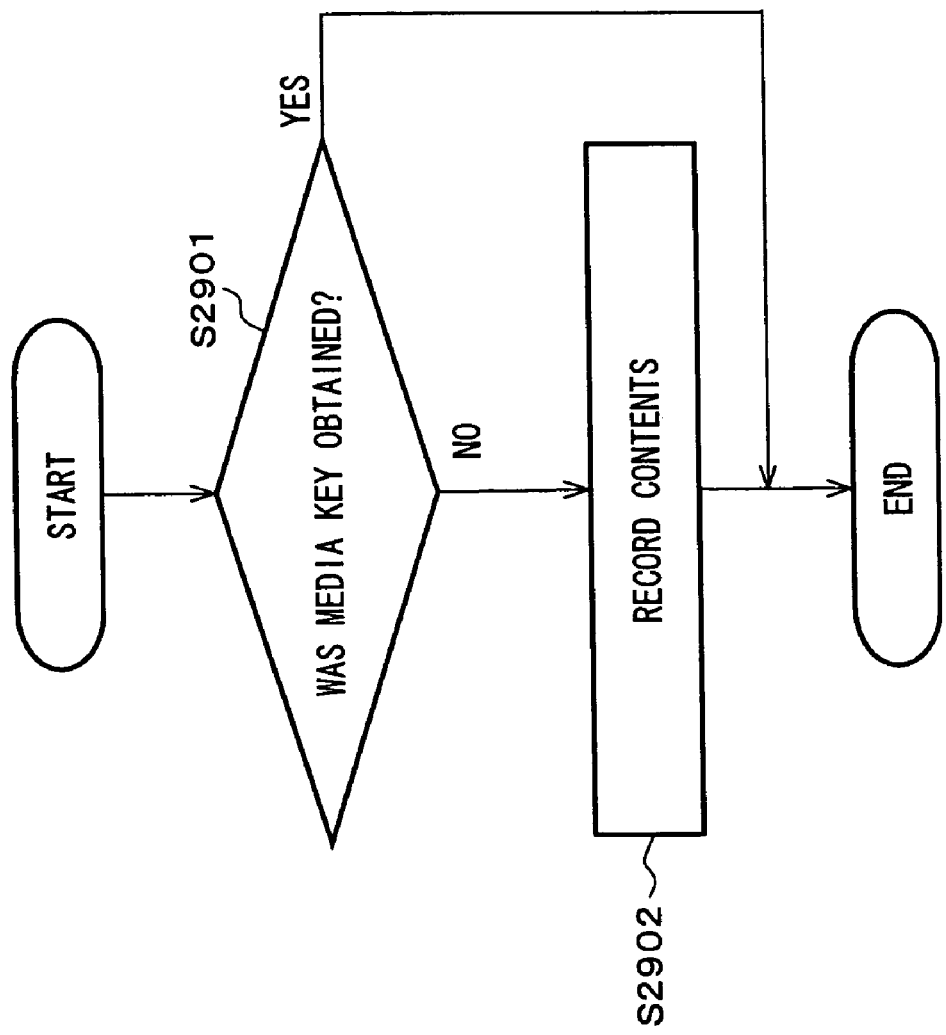
FIG. 42 shows a flowchart representing a process carried out by the recording/reproduction apparatus of the present invention to record contents using a media key.

The following description explains a process to generate a key by using a media key and apply the generated key to operations to encrypt contents and record the encrypted contents onto a recording medium. Unlike the case of a master key, however, there is no concept of more and less recent generations in the media key. Thus, the recording/reproduction apparatus implemented by the second embodiment does not form a judgment on recordability of the encrypted contents as the recording/reproduction apparatus implemented by the first embodiment does by comparing a pre-recording generation number with a master key's generation number stored in the recording/reproduction apparatus' own memory in the first embodiment of the flowchart shown in FIG. 18. Instead, if a media key can just be obtained in a process shown in FIG. 41, the contents are determined to be a recordable contents. To put it concretely, the flowchart shown in FIG. 42 begins with a step S2901 to form a judgment as to whether or not a media key has been obtained. Only if a media key has been obtained, does the flow of the process go on to a step S2902 at which the contents are recorded onto the recording medium.

Figure 43:
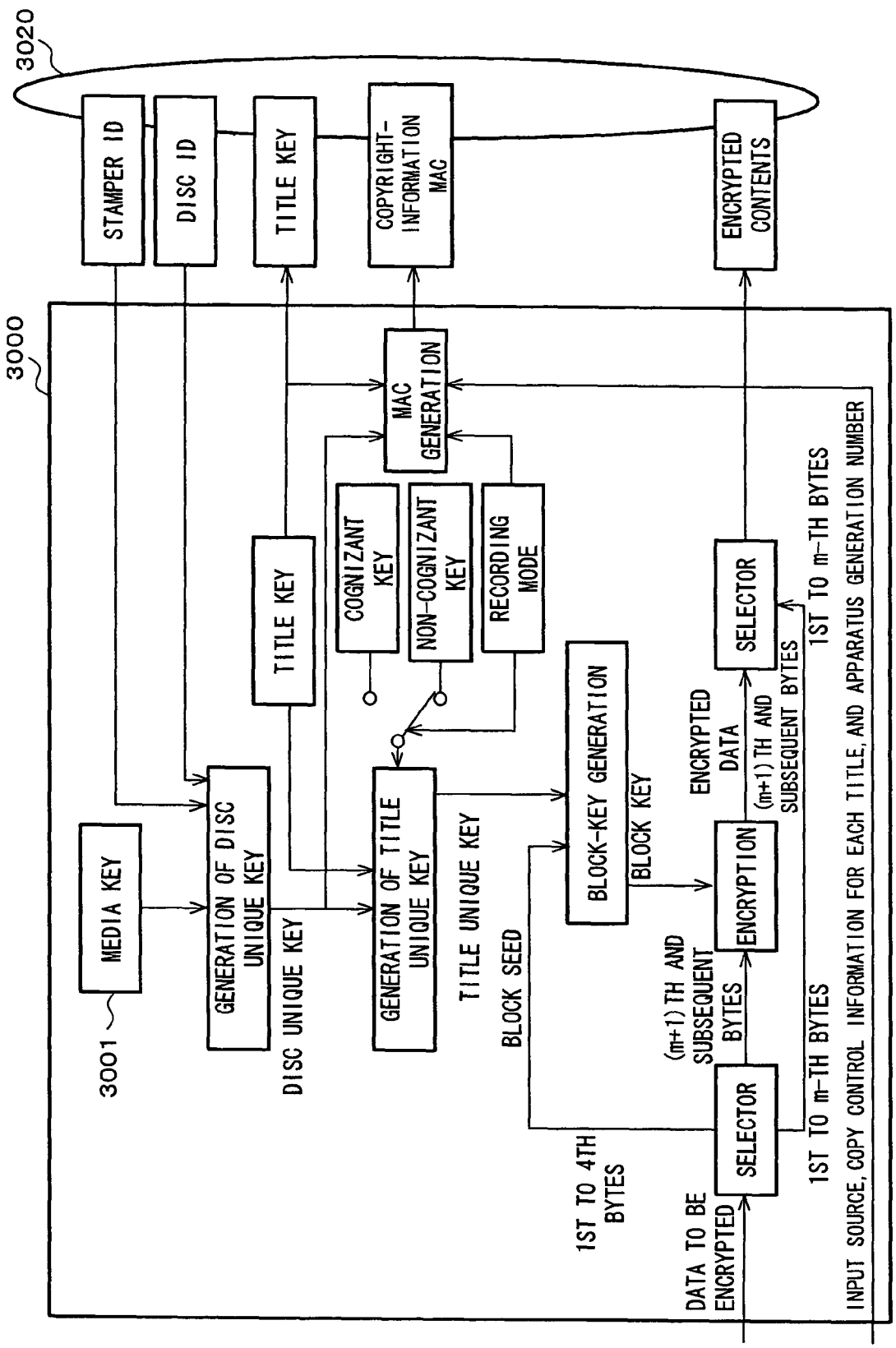
FIG. 43 is an explanatory block diagram showing first encryption processing carried out by a recording/reproduction apparatus of the present invention to record data by using a media key.
Figure 44:
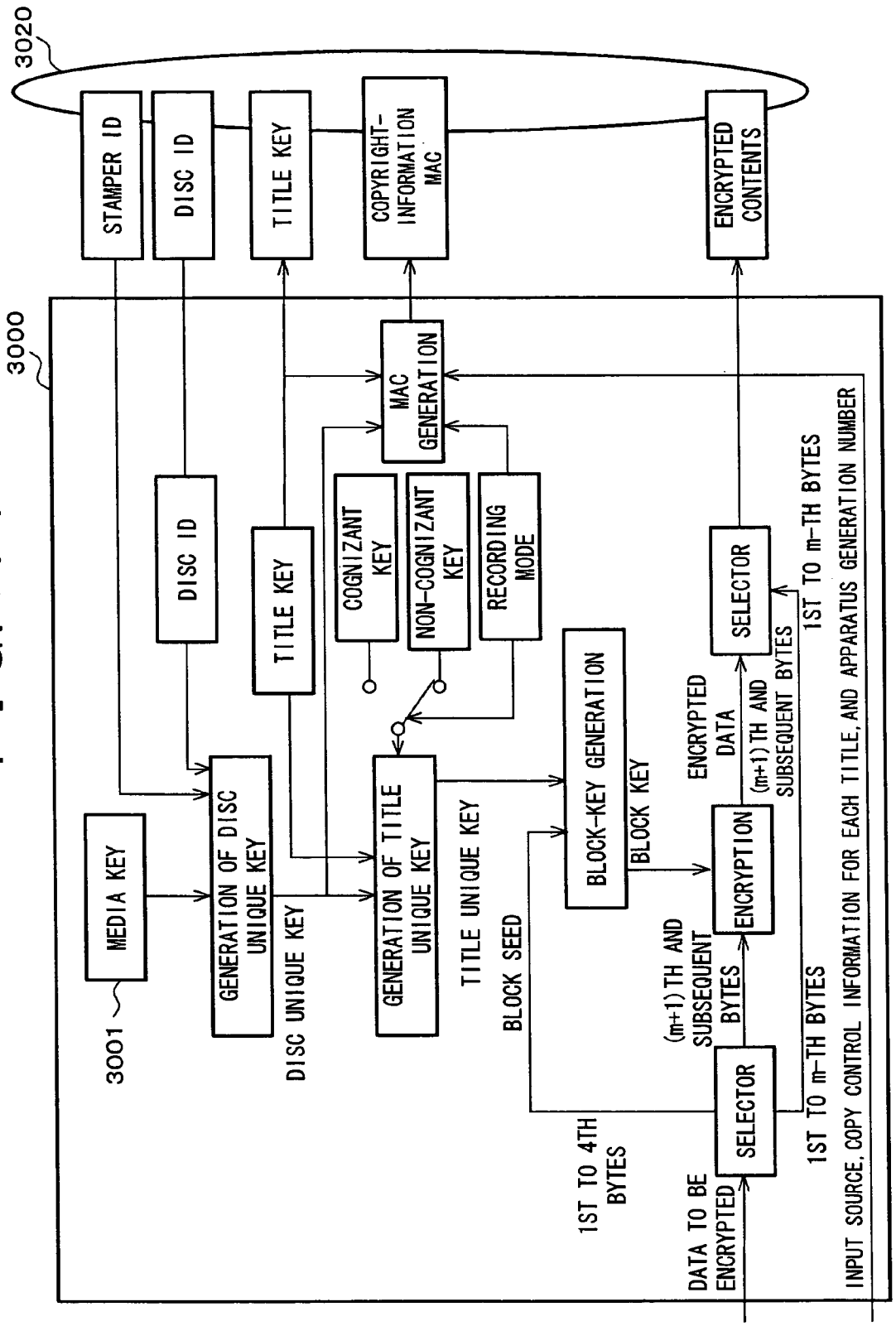
FIG. 44 is an explanatory block diagram showing second encryption processing carried out by the recording/reproduction apparatus of the present invention to record data by using a media key.
Figure 45:
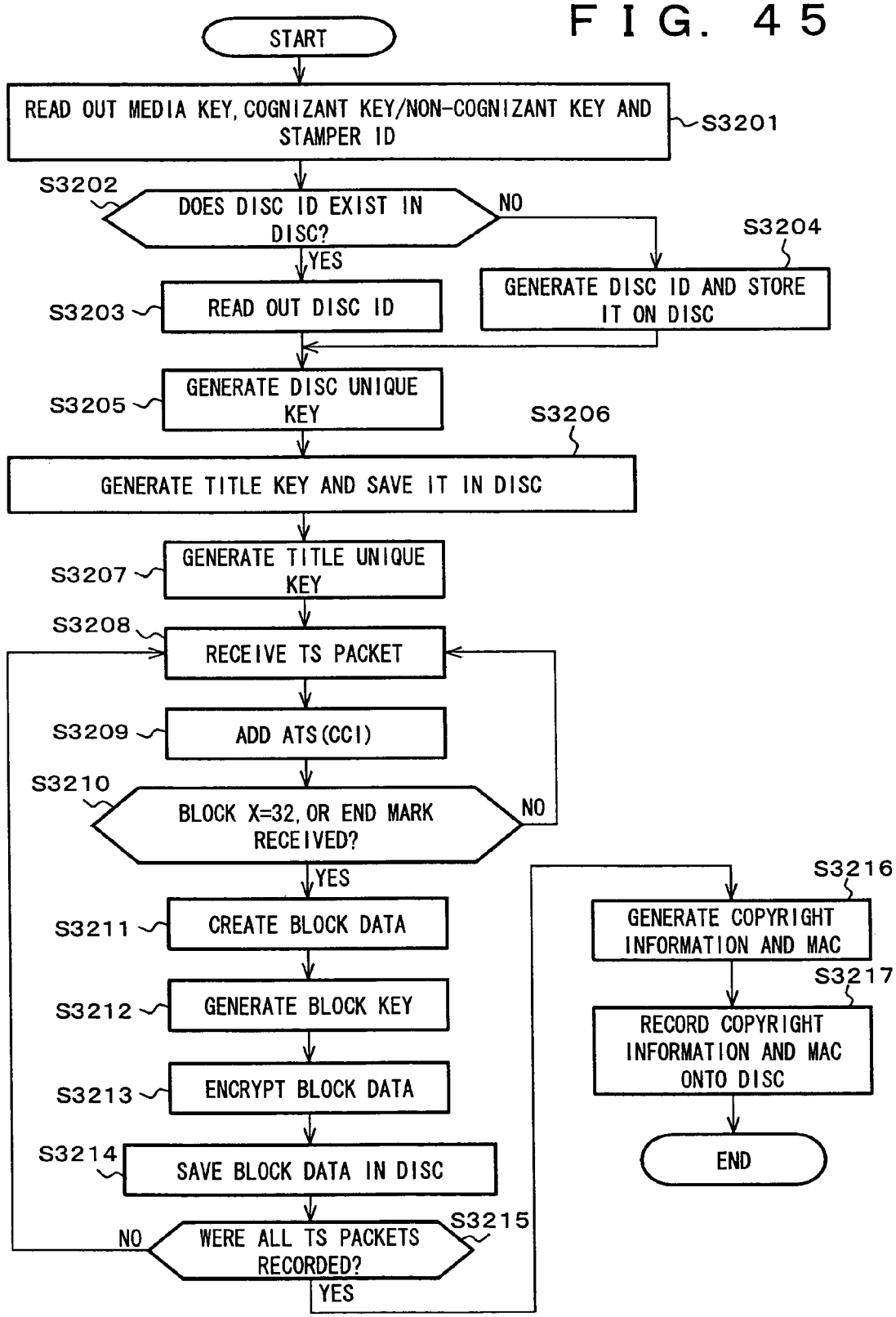
FIG. 45 shows an explanatory flowchart representing a process carried out by the recording/reproduction apparatus of the present invention to record data by using a media key.

By referring to block diagrams of FIGS. 43 and 44 as well as a flowchart shown in FIG. 45, the following description explains a process to record contents by encrypting the contents by using a media key.

Much like the first embodiment, the second embodiment employs an optical disc as the recording medium. Also much like the first embodiment, in the second embodiment, in order to prevent a bit-by-bit copy operation from being carried out on contents recorded on the recording medium, a disc ID serving as identification information unique to the recording medium is also used as information having an effect on a key for encrypting the contents.

The block diagrams of FIGS. 43 and 44 are similar to those of FIGS. 19 and 20 respectively, except that, in the case of the block diagrams of FIGS. 43 and 44, a media key is used as a substitute for a master key. In addition, the block diagrams of FIGS. 43 and 44 are also different from those of FIGS. 19 and 20 respectively in that, in the case of the block diagrams of FIGS. 43 and 44, no recording-time generation number (generation #) of the media key is used. The difference between the block diagrams shown in FIGS. 43 and 44 is that, in the case of the block diagram shown in FIG. 43, a disc ID has been recorded on the recording medium while, in the case of the block diagram shown in FIG. 44, a new disc ID is generated and recorded onto the recording medium as the block diagram shown in FIG. 19 is different from the block diagram shown in FIG. 20.

FIG. 45 shows a flowchart representing a process carried out in the second embodiment to record contents onto a recording medium by using a media key. The flowchart shown in FIG. 45 corresponds to the flowchart shown in FIG. 29 for the first embodiment. The flowchart shown in FIG. 45 is explained by focusing on differences between these flowcharts.

The flowchart shown in FIG. 45 begins with a step S3201 to read out a cognizant key in the case of the cognizant mode or a non-cognizant key in the case of the non-cognizant mode from a memory employed in the recording/reproduction apparatus 3000 itself and a media key K(t)media computed at the step S2804 of the flowchart shown in FIG. 41 also from the memory. The recording/reproduction apparatus 3000 also reads out a stamper ID from the optical disc 3020 used as the recording medium.

Then, at the next step S3202, the recording/reproduction apparatus 3000 examines the optical disc 3020 to determine whether or not a disc ID has already been recorded on the optical disc 3020 as identification information. If a disc ID has already been recorded on the optical disc 3020, the flow of the process goes on to a step S3203 at which the disc ID is read out from the optical disc 3020. This operation to read out the disc ID from the optical disc 3020 corresponds to the case shown in the block diagram of FIG. 43. If a disc ID has not been recorded on the optical disc 3020 yet, on the other hand, the flow of the process goes on to a step S3204 at which a disc ID is generated at random or by adoption of a method determined in advance and recorded on the optical disc 3020. These operations to generate a disc ID and record the generated disc ID onto the optical disc 3020 corresponds to the case shown in the block diagram of FIG. 44. Since the optical disc 3020 requires only one disc ID, the disc ID is stored typically in a lead-in area or the like. In either case, the flow of the process goes on to the next step S3205.

At the step S3205, a disc unique key is generated by using the media key and the stamper ID, which were read out from the optical disc 3020 at the step S3201, and the disc ID. The first embodiment's method to generate a disc unique ID can be adopted in the second embodiment. In the case of the second embodiment, however, a media key is used as a substitute for the master key.

Then, at the next step S3206, a title key is generated at random or by adoption of a method determined in advance as a key unique to this particular recording operation and recorded onto the recording medium 3020.

The optical disc 3020 includes a data management file for storing information indicating which data composes what title. This file can be used for storing the title key.

Steps S3207 to S3215 are identical with respectively the steps S1807 to S1815 of the flowchart shown in FIG. 29, making it unnecessary to repeat the explanation thereof.

At a step S3216, copyright information for the recorded contents and a MAC to be used as a falsification check value for the copyright information are generated. Then, at the next step S3217, the copyright information and the MAC are recorded onto the recording medium 3020. As described above, examples of the copyright information are information on an input source, information on the digital-watermark generation of the recording apparatus, information on a recording mode, strictest copy control information or copy control information at a variation point or a packet number corresponding to the variation point. One or more of the information on an input source, the information on the digital-watermark generation of the recording apparatus, the information on a recording mode, the strictest copy control information and the copy control information at a variation point or a packet number corresponding to the variation point are recorded on the recording medium as the copyright information. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents. The typical processes to generate copyright information have been described earlier by referring to FIGS. 25, 26 and 27. On the other hand, the processing to generate a MAC has been described above by referring to FIG. 28.

In the processing described above, copyright information associated with encrypted contents is recorded onto the recording medium. Thus, in an operation to reproduce and output the encrypted contents from the recording medium, the copyright information can be acquired without decrypting the encrypted contents, and the operation to reproduce and output the encrypted contents from the recording medium can thus be carried out correctly. In addition, even when the recording medium is demounted from the contents-recording apparatus to be mounted on another recording/reproduction apparatus, it is possible to correctly identify copy control information set by the contents-recording apparatus by referring to the copyright information for the information on an input source or information on a digital-watermark generation. Thus, correct reproduction control can be executed.

As described above, a disc unique key is generated from a media key, a stamper ID and a disc ID, and then used for generating a title unique key in conjunction with a title key and a cognizant key in the case of the cognizant mode selected as the recording mode or a non-cognizant key in the case of the non-cognizant mode selected as the recording mode. It is to be noted, however, that a title unique key can also be generated directly from a media key, a stamper ID, a disc ID, a title key and a cognizant key in the case of the cognizant mode selected as the recording mode or a non-cognizant key in the case of the non-cognizant mode selected as the recording mode without generating a disc unique key. As an alternative, a key equivalent to a title unique key can also be generated from a media key, a stamper ID, a disc ID, and a cognizant key in the case of the cognizant mode selected as the recording mode or a non-cognizant key in the case of the non-cognizant mode selected as the recording mode without using a title key.

As described above, contents can be recorded onto a recording medium by using a media key.

Figure 46:
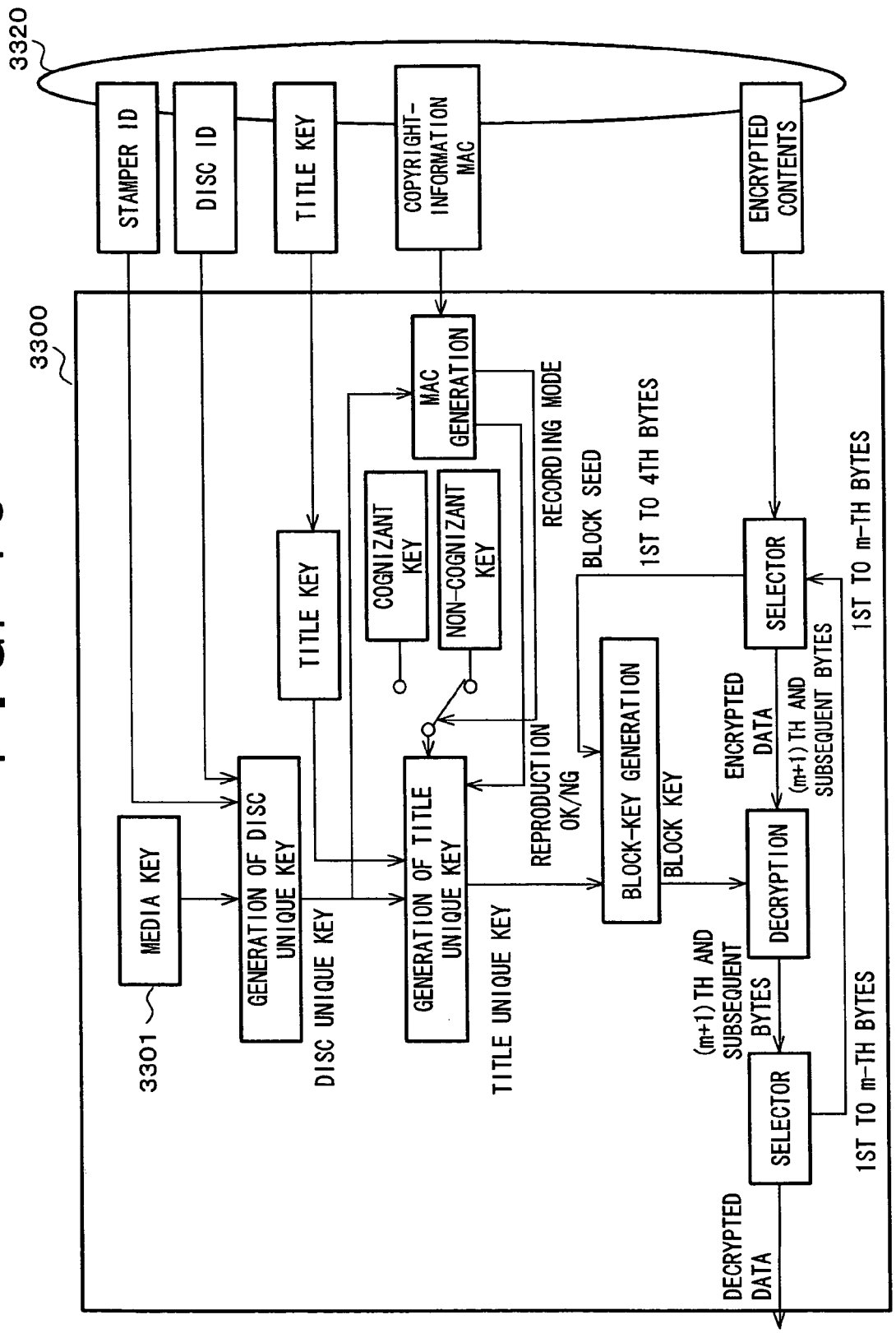
FIG. 46 is an explanatory block diagram showing encryption processing carried out by a recording/reproduction apparatus of the present invention to reproduce data by using a media key.
Figure 47:
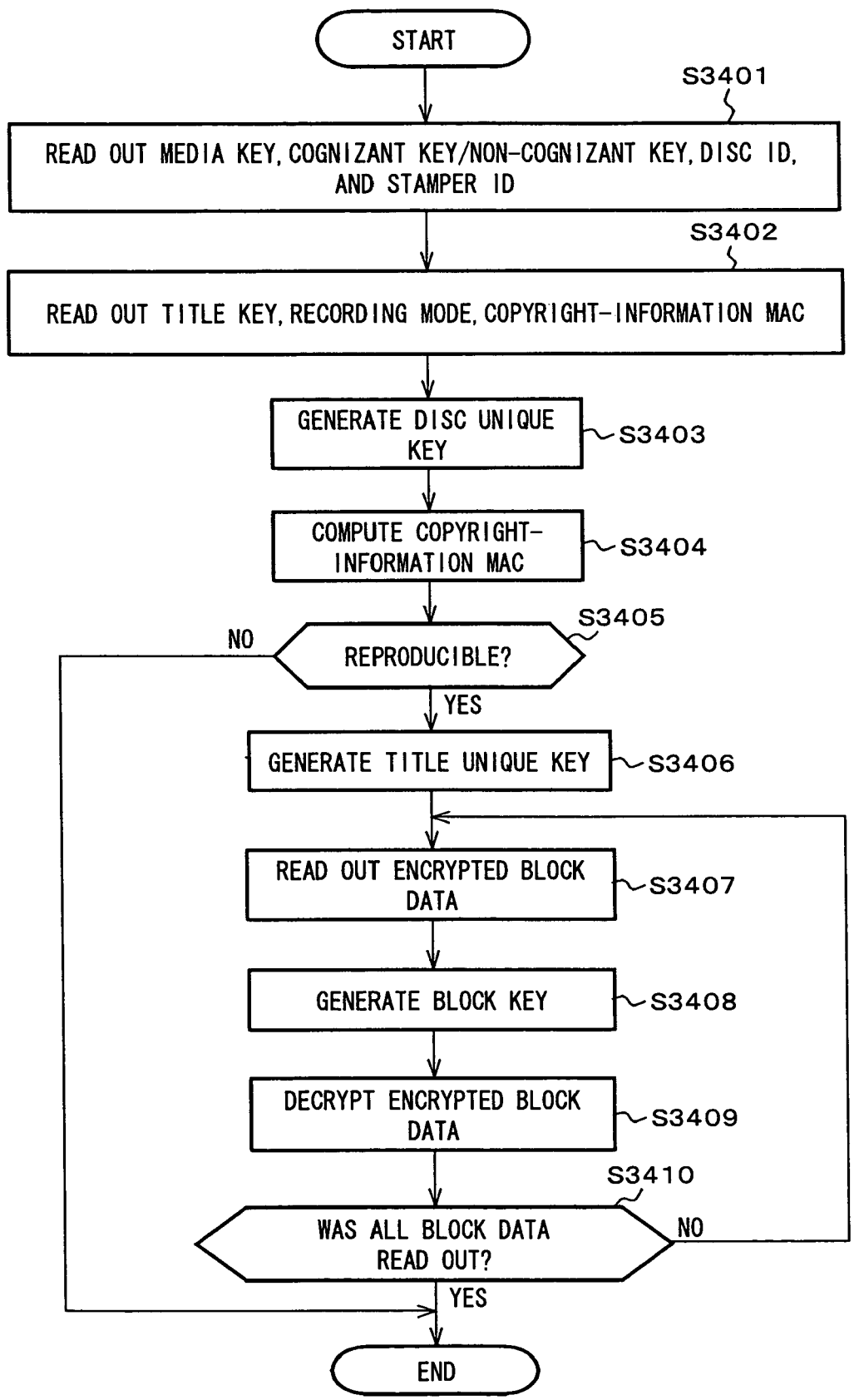
FIG. 47 shows an explanatory flowchart representing a process carried out by the recording/reproduction apparatus of the present invention to reproduce data by using a media key.

By referring to a processing block diagram of FIG. 46 and a flowchart shown in FIG. 47, the following description explains a process to decrypt and reproduce encrypted contents recorded on a recording medium by using a media key as described above.

The block diagram of FIG. 46 corresponds to the first embodiment's block diagram of FIG. 31 except that, in the case of the block diagram of FIG. 46, a media key is used as a substitute for a master key so that the recording-time generation number (generation #) becomes unnecessary.

As shown in FIG. 47, the flowchart begins with a step S3401 at which the recording/reproduction apparatus 3400 reads out a disc ID and a stamper ID from the optical disc 3420 serving as the recording medium. In addition, the recording/reproduction apparatus also reads out a media key and a cognizant key in the case of the cognizant mode or a non-cognizant key in the case of the non-cognizant mode from a memory employed in the recording/reproduction apparatus itself. The media key has been computed in a process S2804 shown in FIG. 41 and stored temporarily in the memory.

It is to be noted that, when the recording medium was mounted on the recording/reproduction apparatus, the processing shown in FIG. 41 was carried out. If the media key was not obtained in this processing, the execution of the process represented by the flowchart shown in FIG. 47 is ended.

Then, at the next step S3402, the recording/reproduction apparatus reads out a title key of contents to be reproduced from the optical disc and copyright information including an additional MAC used as a falsification check value. The copyright information was recorded on the optical disc, being associated with the contents. As described above, examples of the copyright information are information on an input source, information on the digital-watermark generation of the recording apparatus, information on a recording mode, strictest copy control information or copy control information at a variation point or a packet number corresponding to the variation point. One or more of the information on an input source, the information on the digital-watermark generation of the recording apparatus, the information on a recording mode, the strictest copy control information and the copy control information at a variation point or a packet number corresponding to the variation point are recorded on the recording medium as the copyright information. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents. In addition, in order to prevent the copyright information from being falsified with ease, a MAC (Message Authentication Code) to be used as a validity inspection code is added to the copyright information and recorded onto the recording medium.

Then, at the next step S3403, a disc unique-key is generated by using the disc ID, the media key and the stamper ID. The disc unique key is generated by adoption of the methods explained earlier by referring to FIG. 21 except that the media key is used as a substitute for the master key. As described above, in accordance with one of the two key generation methods, the media key and the disc ID are input to a hash function including a block encryption function to generate a disc unique key. In accordance with the second key generation method, on the other hand, data obtained as a result of bit concatenation of the media key and the disc ID is input to a hash function SHA-1 conforming to FIPS 180-1 specifications to produce a 160-bit result. Then, a disc unique key with a required length is extracted from the 160-bit result.

Then, at the next step S3404, a copyright-information MAC is computed. FIG. 28 is a diagram showing two typical methods for generating a MAC. As shown in FIG. 28, in accordance with one of the two MAC generation methods, a disc unique key, a title key and copyright information are input to a hash function including a 64 bit block encryption function to generate a MAC. In accordance with the second MAC generation method, on the other hand, data obtained as a result of bit concatenation of the disc unique key, the title key and the copyright information is input to a hash function SHA-1 conforming to FIPS 180-1 specifications to produce a 160-bit result. Then, a MAC with a required length is extracted from the 160-bit result and used as a copyright-information MAC value.

If the MAC value stored in the recording medium along with the copyright information is equal to the MAC value newly generated on the basis of the copyright information read out, the copyright information is determined to have not been falsified.

Then, the flow of the process goes on to a step S3405 to form a judgment as to whether or not the contents can be reproduced on the basis of a result of the judgment on the MAC value. Details of the judgment formed at the step S3405 are represented by a flowchart shown in FIG. 48.

Figure 48:
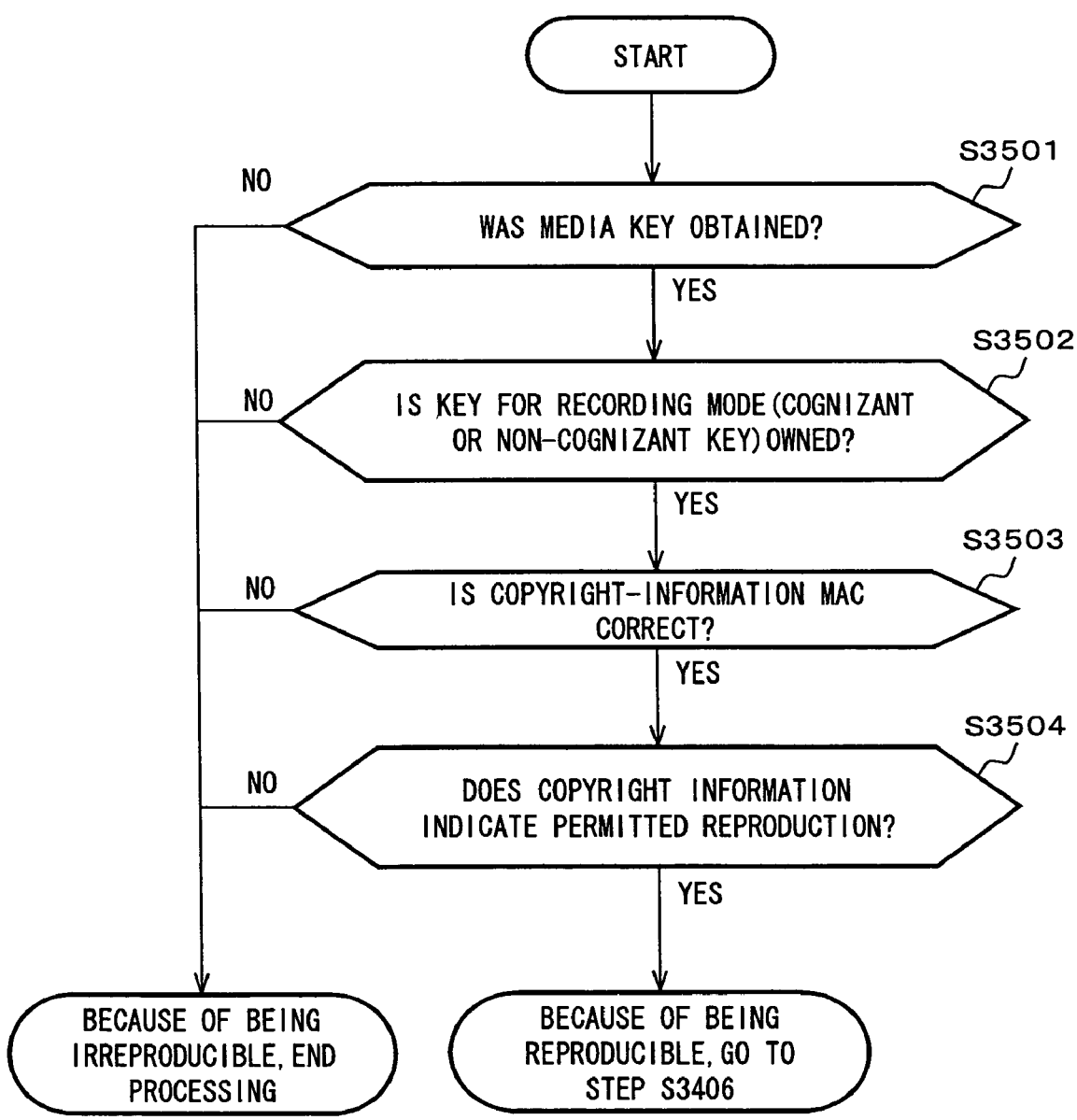
FIG. 48 shows a flowchart representing details of a process, to form a judgment on reproducibility of data by using a media key, carried out by the recording/reproduction apparatus of the present invention to reproduce the data.

As shown in FIG. 48, the flowchart begins with a step S3501 to form a judgment as to whether or not the media key has been obtained. If the media key has not been obtained, the contents are determined to be irreproducible. If the media key has been obtained, on the other hand, the flow of the process goes on to a step S3502 to form a judgment as to whether or not a key for a mode at a recording time is owned by the reproduction apparatus itself as is the case with the step S2503 of the flowchart shown in FIG. 33. The key for a mode at a recording time is a cognizant or non-cognizant key. If the outcome of the judgment formed at the step S3502 indicates that a cognizant or non-cognizant key used as a key for a mode at a recording time is owned by the reproduction apparatus itself, the flow of the process goes on to a step S3503.

At the step S3503, the MAC computed at the step S3404 of the flowchart shown in FIG. 32 is examined to form a judgment as to whether or not the MAC is correct, that is, whether or not the MAC computed at the step S3404 of the flowchart shown in FIG. 32 is equal to the MAC stored in the recording medium. If the MACs are equal to each other, the flow of the process goes on to a step S3505. If the MACs are not equal to each other, on the other hand, the copyright information is determined to have been falsified. In this case, the contents are determined to be irreproducible.

At the step S3505, the copyright information read out from the recording medium is analyzed and used as a basis for forming a judgment as to whether or not the contents are reproducible.

As described above, the copyright information can include any ones of various kinds of information, and a variety of judgments on the reproducibility of contents can be formed in dependence on the kind of the copyright information. That is, any one of the three processes: a process of a judgment on the reproducibility of contents, which is formed on the basis of information on an input source included in the copyright information shown in FIG. 34; a process of a judgment on the reproducibility of contents, which is formed on the basis of information on a digital-watermark generation included in the copyright information shown in FIG. 35; and a process of a judgment on the reproducibility of contents, which is formed on the basis of the copyright information's copy control information provided for each title shown in FIG. 36, is executed. If the copyright information recorded on a recording medium, being associated with contents to be reproduced from the recording medium includes a plurality of information types, however, it is possible to provide a configuration in which judgment processes each based on a type of information can be carried out sequentially or concurrently to determine whether or not contents are reproducible, and the contents are eventually determined to be reproducible only if all the judgment processes each result in an outcome indicating reproducible contents. If even only one of the judgment processes results in an outcome indicating irreproducible contents, on the other hand, the contents are determined to be irreproducible.

The step S3504 is the last step of the flowchart shown in FIG. 48 to represent a process to form a judgment on reproducibility of the contents. To be more specific, if all the judgment processes represented by the flowcharts shown in FIGS. 33, 34, 35 and 36 each result in an outcome indicating reproducible contents, the flow of the process goes on from the step S3405 to a step S3406 of the flowchart shown in FIG. 47. It is to be noted that, in the case of a digital watermark detected from decrypted data, the judgment process based on the digital watermark is carried out after the step S3409 of the flowchart shown in FIG. 47, at which data of a block is decrypted.

Operations carried out at the subsequent step S3406 to a step S3410 of the flowchart shown in FIG. 47 are identical with those carried out respectively at the steps S2406 to S2410 of the flowchart shown in FIG. 32, making it unnecessary to repeat the explanation thereof.

As described above, a disc unique key is generated from a media key, a stamper ID and a disc ID, and then used for generating a title unique key in conjunction with a title key and a cognizant key in the case of the cognizant mode selected as the recording mode or a non-cognizant key in the case of the non-cognizant mode selected as the recording mode. It is to be noted, however, that a title unique key can also be generated directly from a media key, a stamper ID, a disc ID, a title key and a cognizant key in the case of the cognizant mode selected as the recording mode or a non-cognizant key in the case of the non-cognizant mode selected as the recording mode without generating a disc unique key. As an alternative, a key equivalent to a title unique key can also be generated from a media key, a stamper ID, a disc ID, and a cognizant key in the case of the cognizant mode selected as the recording mode or a non-cognizant key in the case of the non-cognizant mode selected as the recording mode without using a title key.

In the ways described above, it is possible to carry out operations to record and reproduce contents onto and from a recording medium.

As described above, the reproduction apparatus serving as the information-processing apparatus provided by the present invention forms a judgment as to whether or not contents can be reproduced from a recording medium and output in a reproduction operation. The judgment is based on copyright information generated for the contents and stored in the recording medium. As described above, examples of the copyright information are information on an input source, information on the digital-watermark generation of the recording apparatus, information on a recording mode, strictest copy control information or copy control information at a variation point or a packet number corresponding to the variation point. The information on the digital-watermark generation of the recording apparatus is information indicating one of the first, second and third generations described above. Provided for each title, the strictest copy control information is strictest CCI among pieces of copy control information obtained from the contents. The copy control information at a variation point or a packet number corresponding to the variation point shows a variation of the copy control information in the contents. One or more of the information on an input source, the information on the digital-watermark generation of the recording apparatus, the information on a recording mode, the strictest copy control information and the copy control information at a variation point or a packet number corresponding to the variation point are read out from the recording medium as the copyright information and used for forming the judgment as to whether or not the contents can be reproduced from the recording medium.

9: Hardware Configuration of Recording/Reproduction Apparatus

The description given so far includes an explanation of a typical configuration of an information-processing apparatus serving as a recording/reproduction apparatus for carrying out a series of processes enlightened above.

The processes explained by referring to the flowcharts and the block diagrams, which are given above, can be carried out by a combination of hardware and software. For example, the cryptographic processing means employed in the recording/reproduction apparatus can be implemented as an encryption/decryption LSI or a general-purpose computer. As an alternative, the cryptographic processing means can also be implemented by a program and a single-chip microcomputer for executing the program. By the same token, the TS-processing means can be implemented by execution of software to carry out the TS processing. If a sequence of processes is implemented by software, programs composing the software are installed in a general-purpose computer or a single-chip microcomputer. FIG. 49 is a diagram showing a typical configuration of an embodiment implementing a computer in which software programs are installed for later execution to carry out the sequence of processes described above.

A software program can be stored in advance in a recording medium embedded in the computer. Examples of the embedded recording medium are a hard disc 4205 and a ROM (Read-Only Memory) 4203. As an alternative, a program can be stored temporarily or permanently in a removable recording medium 4210 such as a floppy disc, a CD-ROM (Compact Disc Read-Only Memory), an MO (Magneto Optical) disc, a DVD (Digital Versatile Disc), a magnetic disc and a semiconductor memory. A program stored in the removable recording medium 4210 is presented to the user as the so-called package software.

It is to be noted that, in addition to the installation of a program from the removable recording medium 4210 into the computer, a program can also be downloaded into the computer from a download site by way of an artificial satellite for digital satellite broadcasting by radio communication or by way of a network such as a LAN (Local Area Network) or the Internet by wire communication. In the computer, the downloaded program is received by a communication unit 4208 to be installed in the embedded hard disc 4205.

The computer shown in FIG. 49 includes an embedded CPU (Central Processing Unit) 4202. The CPU 4202 is connected to an input/output interface 4211 by a bus 4201. The CPU 4202 executes a program stored in the ROM 4203 in advance in accordance with a command entered to the CPU 4202 via the input/output interface 4210 by the user by operating an input unit 4207 comprising a keyboard, a mouse and the like.

As an alternative, the CPU 4202 loads a program from the hard disc 4205 into a RAM (Random-Access Memory) 4204 for execution. The program is stored in the hard disc 4205 from the beginning, received by the communication unit 4208 from a satellite or a network and installed in the hard disc 4205 or read out from the removable recording medium 4210 mounted on a drive 4209 and installed in the hard disc 4205.

By executing such a program, the CPU 4202 carries out a process represented by any of the flowcharts described above in processing represented by any of the block diagrams explained above. The CPU 4202 outputs a result of the process to an output unit 4206 or the communication unit 4208 for transmission by way of the input/output interface 4211, or records the result into the hard disc 4205 if necessary. The output unit 4206 comprises an LCD (Liquid Crystal Display) and a speaker.

In this specification, the processing steps comprising a program executed by the computer to carry out any of the different processes do not have to be a sequence of steps along the time axis. Instead, the processes may each include pieces of processing to be carried out concurrently or individually. Examples of the processing to be carried out concurrently or individually are concurrent processing and object oriented processing.

In addition, a program can be carried out by a single computer or a plurality of computers in the so-called distributed processing. Furthermore, a program can be transferred to a remote computer to be executed thereby.

As described above, in the embodiments, the block for encrypting and decrypting contents is explained in a description focusing on a single-chip encryption/decryption LSI. It is to be noted, however, that the block for encrypting and decrypting contents can also be implemented as a single software module to be implemented by the CPU 170 shown in FIG. 1 or 2. By the same token, the TS-processing means 300 can also be implemented as a single software module to be implemented by the CPU 170 as well.

The preferred embodiments have been described so far. However, the scope of the present invention is not limited to the embodiments. That is to say, it is obvious that a person skilled in the art is capable of making a variety of changes and providing a variety of versions within a range of essentials of the present invention. The preferred embodiments of the present invention are merely a means for exemplifying the present invention and not to be interpreted as limitations imposed on the present invention. The scope of the present invention is defined only by claims appended to this specification.

INDUSTRIAL APPLICABILITY

As described above, in accordance with a configuration of the present invention, copyright information provided for contents stored in a recording medium is also stored in the recording medium, being associated with the contents. Since the copyright information includes information on the input source of the contents, the information on the input source of the recorded contents can be obtained in an operation to reproduce and output the contents from the recording medium. The information on the input source of the recorded contents is then used as a basis for forming a judgment as to whether or not the contents can be reproduced and output.

Furthermore, in accordance with another configuration of the present invention, copyright information provided for contents stored in a recording medium is also stored in the recording medium, being associated with the contents. In this configuration, the copyright information includes information on the input source of the contents, and the information on the input source of the contents are associated with information on restrictions imposed on outputs, which is stored in a memory employed in a recording/reproduction apparatus. Thus, a process to reproduce the contents can be controlled on the basis of the information on the input source of the contents. As a result, accurate control of operations to reproduce and output the contents can be executed in accordance with the input source of the contents.

In addition, in accordance with a further configuration of the present invention, copyright information provided for contents stored in a recording medium is also stored in the recording medium, being associated with the contents. Moreover, a MAC used as a value for checking falsification of the copyright information is also stored in the recording medium, being associated with the copyright information. Thus, the reliability of the copyright information can be sustained. A disc unique key serves as a key for generating the MAC used as a value for checking falsification of the copyright information. A key required for generating the disc unique key is distributed along with an EKB (Enabling Key Block) conforming to a key distribution system adopting a tree structure. Thus, by processing the received EKB, only a device having a proper license is capable of acquiring and using a master key or a media key. As a result, only a device having a proper license is capable of carrying out a verification process by using the MAC so that it is possible to implement a configuration in which contents can be used appropriately.

The invention claimed is:

1. An information recording apparatus, comprising:
an input interface operable to receive content data, said input interface being of a particular interface type that is one of a predetermined plurality of available interface types;
a processor operable to generate copyright information associated with the content data, the copyright information including input source information which indicates the particular interface type of the input interface through which the content data is received; and
a recording unit operable to record the content data and the associated copyright information onto a recording medium, the recorded input source information being readable from the recording medium to determine an output format restriction on the content data that is based on the particular interface type of said input interface,
wherein the copyright information indicates whether the content data includes copy control information, the copyright information indicates whether the content data is received as input to the information recording apparatus through an IEEE-1394 interface, the copyright information includes information indicating whether the content data include copy control information, and when the information included in the copyright information indicates that the content data include copy control information, the copyright information further includes information indicating whether the copy control information is added to each of a plurality of transport stream ("TS") packets containing the content data recorded on the recording medium or is added as a digital watermark to the content data recorded onto the recording medium.

2. The information recording apparatus as claimed in claim 1, wherein said processor is further operable to generate check data, the check data being usable to determine whether the copyright information is falsified, and said recording unit is further operable to record the check data onto the recording medium in association with the content data and the copyright information.

3. The information recording apparatus as claimed in claim 1, wherein said copyright information indicates whether the content data include digital data or analog data.

4. An information recording apparatus, comprising:
an input interface operable to receive content data, said input interface being of a particular interface type that is one of a predetermined plurality of available interface types;
a processor operable to generate copyright information associated with the content data, the copyright information including input source information which indicates the particular interface type of the input interface through which the content data is received;
a recording unit operable to record the content data and the associated copyright information onto a recording medium, the recorded input source information being readable from the recording medium to determine an output format restriction on the content data that is based on the particular interface type of said input interface; and
a memory operable to store a plurality of encryption keys, the plurality of encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses,
the processor being further operable to perform a process of decrypting an enabling key block ("EKB") containing one of the plurality of node keys to obtain one node key, the one node key having been encrypted using at least one of a second node key of the plurality of node keys or one of the plurality of leaf keys, the second node key being unique to a node of a layer of the hierarchical tree structure subordinate to the layer of the hierarchical tree structure to which the node of the one node key belongs,
the processor being further operable to decrypt the EKB to obtain check data, the check data being usable to determine whether the copyright information is falsified, and
the recording unit being further operable to record the check data on the recording medium in association with the copyright information.

5. An information recording apparatus, comprising:
an input interface operable to receive content data, said input interface being of a particular interface type that is one of a predetermined plurality of available interface types;
a processor operable to generate copyright information associated with the content data, the copyright information including input source information which indicates the particular interface type of the input interface through which the content data is received;
a recording unit operable to record the content data and the associated copyright information onto a recording medium, the recorded input source information being readable from the recording medium to determine an output format restriction on the content data that is based on the particular interface type of said input interface; and
a memory operable to store a plurality of encryption keys, the plurality of encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses, and
the processor being further operable to perform a process of decrypting an enabling key block ("EKB") containing one of the plurality of node keys to obtain one node key, the one node key having been encrypted using at least one of a second node key of the plurality of node keys or one of the plurality of leaf keys, the second node key being unique to a node of a layer of the hierarchical tree structure subordinate to the layer of the hierarchical tree structure to which the node of the one node key belongs, the processor being further operable to decrypt the EKB using the one node key to obtain check data, the check data being usable to determine whether the copyright information is falsified, and
the processor being further operable to encrypt the content data using the one node key to form encrypted content data, and
the recording unit being further operable to record the encrypted content data onto the recording medium.

6. An information reproduction apparatus, comprising:
a reading unit operable to read out content data and copyright information from a recording medium, the copyright information including input source information which indicates a particular interface type of an input interface through which the content data was received, the particular interface type being one of a predetermined plurality of available interface types; and
a processor operable to determine reproducibility of the content data in accordance with an output format restriction on the content data, the output format restriction being determined based on the particular interface type of the input interface as indicated by the read out input source information,
wherein the copyright information includes information indicating whether the content data includes copy control information and indicates whether the content data is received as input to the information recording apparatus through an IEEE-1394 interface, the copyright information includes information indicating whether the content data include copy control information, and when the information indicates that the content data include copy control information, the copyright information further includes information indicating whether the copy control information is added to each of a plurality of transport stream ("TS") packets containing the content data recorded on the recording medium or is added as a digital watermark to the content data recorded on the recording medium.

7. The information reproduction apparatus as claimed in claim 6, wherein said processor is further operable to generate check data from the copyright information read out from the recording medium, and compare the check data with a check value stored on the recording medium to produce a result indicating whether the copyright information has been falsified, and the processor is operable to reproduce the content data only when the result does not indicate that the copyright information has been falsified.

8. The information reproduction apparatus as claimed in claim 6, wherein the copyright information includes information indicating whether the content data include digital data or analog data.

9. An information reproduction apparatus, comprising:
a reading unit operable to read out content data and copyright information from a recording medium, the copyright information including input source information which indicates a particular interface type of an input interface through which the content data was received, the particular interface type being one of a predetermined plurality of available interface types;
a processor operable to determine reproducibility of the content data in accordance with an output format restriction on the content data, the output format restriction being determined based on the particular interface type of the input interface as indicated by the read out input source information; and
a memory operable to store a plurality of encryption keys, the plurality of encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses, and
the processor being further operable to perform a process of decrypting an enabling key block ("EKB") containing one of the plurality of node keys to obtain one node key, the one node key having been encrypted using at least one of a second node key of the plurality of node keys or one of the plurality of leaf keys, the second node key being unique to a node of a layer of the hierarchical tree structure subordinate to the layer of the hierarchical tree structure to which the node of the one node key belongs, the processor further being operable to decrypt the EKB using the one node key to obtain check data, the check data being usable to determine whether the copyright information is falsified.

10. An information reproduction apparatus, comprising:
a reading unit operable to read out content data and copyright information from a recording medium, the copyright information including input source information which indicates a particular interface type of an input interface through which the content data was received, the particular interface type being one of a predetermined plurality of available interface types;
a processor operable to determine reproducibility of the content data in accordance with an output format restriction on the content data, the output format restriction being determined based on the particular interface type of the input interface as indicated by the read out input source information; and
a memory operable to store a plurality of encryption keys, the encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses, and the processor being further operable to perform a process of decrypting an enabling key block ("EKB") containing one of the plurality of node keys to obtain the one node key, the one node key having been encrypted using at least one of a second node key of the plurality of node keys or one of the plurality of leaf keys, the second node key being unique to a node of a layer of the hierarchical tree structure subordinate to the layer of the hierarchical tree structure to which the node of the one node key belongs, and
the processor being further operable to reproduce the content data stored on the recording medium by decrypting the content data, using the one node key obtained by decrypting the enabling key block.

11. A method of recording information, comprising:
receiving content data through an input interface, said input interface being of a particular interface type that is one of a predetermined plurality of available interface types;
generating copyright information associated with the content data, the copyright information including input source information which indicates the particular interface type of the input interface through which the content data is received; and
recording the content data and the associated copyright information onto a recording medium, the recorded input source information being readable from the recording medium to determine an output format restriction on the content data that is based on the particular interface type of said input interface,
wherein the copyright information indicates whether the content data includes copy control information, and the copyright information indicates whether the content data is received as input to the information recording apparatus through an IEEE-1394 interface, the copyright information includes information indicating whether the content data include copy control information, and when the information included in the copyright information indicates that the content data include copy control information, the copyright information further includes information indicating whether the copy control information is added to each of a plurality of transport stream ("TS") packets containing the content data recorded on the recording medium or is added as a digital watermark to the content data recorded onto the recording medium.

12. The method of recording information as claimed in claim 11, further comprising:
generating check data, the check data being usable to determine whether the copyright information is falsified; and
recording the check data onto the recording medium in association with the content data and the copyright information.

13. The method of recording information as claimed in claim 11, wherein the copyright information indicates whether the content data include digital data or analog data.

14. A method of recording information, comprising:
receiving content data through an input interface, said input interface being of a particular interface type that is one of a predetermined plurality of available interface types;
generating copyright information associated with the content data, the copyright information including input source information which indicates the particular interface type of the input interface through which the content data is received;

recording the content data and the associated copyright information onto a recording medium, the recorded input source information being readable from the recording medium to determine an output format restriction on the content data that is based on the particular interface type of said input interface;

storing a plurality of encryption keys by an information recording apparatus operable to perform said method of recording information, the plurality of encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses;

performing a process of decrypting an enabling key block ("EKB") containing one of the plurality of node keys to obtain one node key, the one node key having been encrypted using at least one of a second node key of the plurality of node keys or one of the plurality of leaf keys, the second node key being unique to a node of a layer of the hierarchical tree structure subordinate to the layer of the hierarchical tree structure to which the node of the one node key belongs;

decrypting the EKB using the one node key to obtain check data, check data using the check data being usable to determine whether the copyright information is falsified; and recording the check data on the recording medium in association with the copyright information.

15. A method of recording information, comprising:

receiving content data through an input interface, said input interface being of a particular interface type that is one of a predetermined plurality of available interface types;

generating copyright information associated with the content data, the copyright information including input source information which indicates the particular interface type of the input interface through which the content data is received;

recording the content data and the associated copyright information onto a recording medium, the recorded input source information being readable from the recording medium to determine an output format restriction on the content data that is based on the particular interface type of said input interface;

storing a plurality of encryption keys by an information recording apparatus operable to perform said method of recording information, the plurality of encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses;

performing a process of decrypting an enabling key block ("EKB") containing one of the plurality of node keys to obtain one node key, the one node key having been encrypted using at least one of a second node key of the plurality of node keys or one of a plurality of leaf keys, the second node key being unique to a node of a layer of the hierarchical tree structure subordinate to the layer of the hierarchical tree structure to which the node of the one node key belongs;

decrypting the EKB using the one node key to obtain check data, the check data being usable to determine whether the copyright information is falsified;

encrypting the content data using the one node key to form encrypted content data; and recording the encrypted content data onto the recording medium.

16. A method of reproducing information, said method comprising:

reading out content data and copyright information from a recording medium, the copyright information including input source information which indicates a particular interface type of an input interface through which the content data was received, the particular interface type being one of a predetermined plurality of available interface types; and determining reproducibility of the read out content data in accordance with an output format restriction on the content data, the output format restriction being determined based on the particular interface type of the input interface as indicated by the read out input source information, wherein the copyright information includes information indicating whether the content data includes copy control information and indicates whether the content data is received as input to the information recording apparatus through an IEEE-1394 interface, the copyright information includes information indicating whether the content data include copy control information, and when the information indicates that the content data include copy control information, the copyright information further includes information indicating whether the copy control information is added to each of a plurality of transport stream ("TS") packets containing the content data recorded on the recording medium or is added as a digital watermark to the content data recorded on the recording medium.

17. The method of reproducing information as claimed in claim 16, further comprising:

generating check data from the copyright information read out from the recording medium, and comparing the check data with a check value stored on the recording medium to produce a result indicating whether the copyright information has been falsified, and reproducing the content data only when the result does not indicate that the copyright information has been falsified.

18. The method of reproducing information as claimed in claim 16, wherein the copyright information includes information indicating whether the content data include digital data or analog data.

19. A method of reproducing information, comprising:

reading out content data and copyright information from a recording medium, the copyright information including input source information which indicates a particular interface type of an input interface through which the content data was received, the particular interface type being one of a predetermined plurality of available interface types;

determining reproducibility of the read out content data in accordance with an output format restriction on the content data, the output format restriction being determined based on the particular interface type of the input interface as indicated by the read out input source information;

storing a plurality of encryption keys, the plurality of encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses;

performing a process of decrypting an enabling key block ("EKB") containing one of the plurality of node keys to obtain one node key, the one node key having been encrypted using at least one of a second node key of the plurality of node keys or one of the plurality of leaf keys, the second node key being unique to a node of a layer of the hierarchical tree structure subordinate to the layer of the hierarchical tree structure to which the node of the one node key belongs;

decrypting the enabling key block using the one node key to obtain check data, the check data being usable to determine whether the copyright information is falsified.

20. A method of reproducing information, comprising:

reading out content data and copyright information from a recording medium, the copyright information including input source information which indicates a particular interface type of an input interface through which the content data was received, the particular interface type being one of a predetermined plurality of available interface types;

determining reproducibility of the read out content data in accordance with an output format restriction on the content data, the output format restriction being determined based on the particular interface type of the input interface as indicated by the read out input source information;

storing a plurality of encryption keys, the encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses, and performing a process of decrypting at least one enabling key block ("EKB") containing one of the plurality of node keys, the one node key having been encrypted using at least one of a second node key of the plurality of node keys or a leaf key belonging to one of the leaves of the hierarchical tree structure, the second node key being unique to a node of a layer of the hierarchical tree structure subordinate to the layer of the hierarchical tree structure to which the node of the node key belongs, and reproducing the content data stored on the recording medium by decrypting the content data using the one node key obtained by decrypting the enabling key block.

21. A recording medium having information recorded thereon for performing a method of recording information, said method comprising:

receiving content data through an input interface, said input interface being associated with a particular interface type that is one of a predetermined plurality of available interface types;

generating copyright information associated with the content data, the copyright information including input source information which indicates the particular interface type of the input interface through which the content data is received; and recording the content data and the associated copyright information onto a recording medium, the recorded input source information being readable from the recording medium to determine an output format restriction on the content data that is based on the particular interface type of said input interface, wherein the copyright information indicates whether the content data includes copy control information, and the copyright information indicates whether the content data is received as input to the information recording apparatus through an IEEE-1394 interface, the copyright information includes information indicating whether the content data include copy control information, and when the information indicates that the content data include copy control information, the copyright information further includes information indicating whether the copy control information is added to each of a plurality of transport stream ("TS") packets containing the content data recorded on the recording medium or is added as a digital watermark to the content data recorded on the recording medium.

22. A recording medium having information recorded thereon for performing a method of reproducing information, said method comprising:

reading out content data and copyright information from a recording medium, the copyright information including input source information which indicates a particular interface type of an input interface through which the content data was received, the particular interface type being one of a predetermined plurality of available interface types; and determining reproducibility of the read out content data in accordance with an output format restriction on the content data, the output format restriction being determined based on the particular interface type of the input interface as indicated by the read out input source information, wherein the copyright information includes information indicating whether the content data includes copy control information, and indicates whether the content data is received as input to the information recording apparatus through an IEEE-1394 interface, the copyright information includes information indicating whether the content data include copy control information, and when the information indicates that the content data include copy control information, the copyright information further includes information indicating whether the copy control information is added to each of a plurality of transport stream ("TS") packets containing the content data recorded on the recording medium or is added as a digital watermark to the content data recorded on the recording medium.

23. A recording medium having information recorded thereon for performing a method of recording information, said method comprising:

receiving content data through an input interface, said input interface being of a particular interface type that is one of a predetermined plurality of available interface types;

generating copyright information associated with the content data, the copyright information including input source information which indicates the particular interface type of the input interface through which the content data is received;

recording the content data and the associated copyright information onto a recording medium, the recorded input source information being readable from the recording medium to determine an output format restriction on the content data that is based on the particular interface type of said input interface;

storing a plurality of encryption keys by an information recording apparatus operable to perform said method of recording information, the plurality of encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses;

performing a process of decrypting an enabling key block ("EKB") containing one of the plurality of node keys to obtain one node key, the one node key having been encrypted using at least one of a second node key of the plurality of node keys or one of the plurality of leaf keys, the second node key being unique to a node of a layer of the hierarchical tree structure subordinate to the layer of the hierarchical tree structure to which the node of the one node key belongs;

decrypting the EKB using the one node key to obtain check data, check data using the check data being usable to determine whether the copyright information is falsified; and recording the check data on the recording medium in association with the copyright information.

24. A recording medium having information recorded thereon for performing a method of recording information, said method comprising:

receiving content data through an input interface, said input interface being of a particular interface type that is one of a predetermined plurality of available interface types;

generating copyright information associated with the content data, the copyright information including input source information which indicates the particular interface type of the input interface through which the content data is received;

recording the content data and the associated copyright information onto a recording medium, the recorded input source information being readable from the recording medium to determine an output format restriction on the content data that is based on the particular interface type of said input interface;

storing a plurality of encryption keys by an information recording apparatus operable to perform said method of recording information, the plurality of encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses;

performing a process of decrypting an enabling key block ("EKB") containing one of the plurality of node keys to obtain one node key, the one node key having been encrypted using at least one of a second node key of the plurality of node keys or one of a plurality of leaf keys, the second node key being unique to a node of a layer of the hierarchical tree structure subordinate to the layer of the hierarchical tree structure to which the node of the one node key belongs;

decrypting the EKE using the one node key to obtain check data, the check data being usable to determine whether the copyright information is falsified;

encrypting the content data using the one node key to form encrypted content data; and recording the encrypted content data onto the recording medium.

25. A recording medium having information recorded thereon for performing a method of reproducing information, said method comprising:

reading out content data and copyright information from a recording medium, the copyright information including input source information which indicates a particular interface type of an input interface through which the content data was received, the particular interface type being one of a predetermined plurality of available interface types;

determining reproducibility of the read out content data in accordance with an output format restriction on the content data, the output format restriction being determined based on the particular interface type of the input interface as indicated by the read out input source information;

storing a plurality of encryption keys, the plurality of encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses;

performing a process of decrypting an enabling key block ("EKB") containing one of the plurality of node keys to obtain one node key, the one node key having been encrypted using at least one of a second node key of the plurality of node keys or one of the plurality of leaf keys, the second node key being unique to a node of a layer of the hierarchical tree structure subordinate to the layer of the hierarchical tree structure to which the node of the one node key belongs;

decrypting the enabling key block using the one node key to obtain check data, the check data being usable to determine whether the copyright information is falsified.

26. A recording medium having information recorded thereon for performing a method of reproducing information, said method comprising:

reading out content data and copyright information from a recording medium, the copyright information including input source information which indicates a particular interface type of an input interface through which the content data was received, the particular interface type being one of a predetermined plurality of available interface types;

determining reproducibility of the read out content data in accordance with an output format restriction on the content data, the output format restriction being determined based on the particular interface type of the input interface as indicated by the read out input source information;

storing a plurality of encryption keys, the encryption keys including a plurality of node keys and a plurality of leaf keys, each node key being unique to a node of a plurality of nodes of a network having a hierarchical tree structure, the plurality of nodes including a plurality of leaf nodes corresponding to each of a plurality of leaves of the hierarchical tree structure, each of the leaf nodes including a respective one of a plurality of information recording apparatuses, each of the leaf keys being unique to one of the plurality of information recording apparatuses, and performing a process of decrypting at least one enabling key block ("EKB") containing one of the plurality of node keys, the one node key having been encrypted using at least one of a second node key of the plurality of node keys or a leaf key belonging to one of the leaves of the hierarchical tree structure, the second node key being unique to a node of a layer of the hierarchical tree structure subordinate to the layer of the hierarchical tree structure to which the node of the node key belongs, and reproducing the content data stored on the recording medium by decrypting the content data using the one node key obtained by decrypting the enabling key block.

* * * * *